United States Patent
Piunova et al.

(10) Patent No.: US 12,157,811 B2
(45) Date of Patent: Dec. 3, 2024

(54) BIO-BASED, BIODEGRADABLE COMPOSITIONS AND ARTICLES MADE THEREFROM

(71) Applicant: Loliware, Inc., Beacon, NY (US)

(72) Inventors: Victoria A Piunova, Brookdale, CA (US); Chelsea F Briganti, Beacon, NY (US); Louis E Metzger, IV, Beacon, NY (US); Jose F Andrade, Tracy, CA (US); John T Maclin, Beacon, NY (US)

(73) Assignee: Loliware, Inc., Beacon, NY (US)

( * ) Notice: Subject to any disclaimer, the term of this patent is extended or adjusted under 35 U.S.C. 154(b) by 0 days.

(21) Appl. No.: 18/424,579

(22) Filed: Jan. 26, 2024

(65) Prior Publication Data

US 2024/0166853 A1    May 23, 2024

Related U.S. Application Data

(63) Continuation of application No. 18/086,519, filed on Dec. 21, 2022, now Pat. No. 11,912,856, which is a continuation-in-part of application No. PCT/US2022/033527, filed on Jun. 15, 2022.

(60) Provisional application No. 63/243,358, filed on Sep. 13, 2021, provisional application No. 63/213,887, filed on Jun. 23, 2021.

(51) Int. Cl.
| | |
|---|---|
| *C08L 5/04* | (2006.01) |
| *C08K 3/22* | (2006.01) |
| *C08K 5/053* | (2006.01) |
| *C08K 5/11* | (2006.01) |
| *C08L 5/00* | (2006.01) |

(52) U.S. Cl.
CPC ............ *C08L 5/04* (2013.01); *C08K 3/22* (2013.01); *C08K 5/053* (2013.01); *C08K 5/11* (2013.01); *C08L 5/00* (2013.01); *C08K 2003/2227* (2013.01); *C08K 2201/018* (2013.01); *C08L 2201/06* (2013.01); *C08L 2205/025* (2013.01); *C08L 2205/03* (2013.01); *C08L 2205/035* (2013.01)

(58) Field of Classification Search
None
See application file for complete search history.

(56) References Cited

U.S. PATENT DOCUMENTS

| | | |
|---|---|---|
| 3,541,587 A | 11/1970 | Washburn |
| 4,205,093 A | 5/1980 | Blake |
| 4,313,964 A | 2/1982 | Dembecki |
| 4,390,553 A | 6/1983 | Rubenstein et al. |
| 4,472,440 A | 9/1984 | Bank |
| 4,505,220 A | 3/1985 | Bank et al. |
| 4,603,051 A | 7/1986 | Rubenstein et al. |
| 4,795,652 A | 1/1989 | Cooper |
| 4,830,868 A | 5/1989 | Wade et al. |
| 4,853,236 A | 8/1989 | Langler |
| 5,162,126 A | 11/1992 | Thorner et al. |
| 5,188,861 A | 2/1993 | Mazin et al. |
| 5,223,286 A | 6/1993 | Selbak |
| 5,336,511 A | 8/1994 | Der Beek |
| 5,400,698 A | 3/1995 | Savage |
| 5,840,354 A | 11/1998 | Baumann et al. |
| 5,948,313 A | 9/1999 | Cahen |
| 6,068,866 A | 5/2000 | Petrini et al. |
| 6,235,326 B1 | 5/2001 | Kronenberger |
| 6,423,357 B1 | 7/2002 | Woods et al. |
| 6,586,590 B1 | 7/2003 | Renn et al. |
| 6,780,453 B1 | 8/2004 | Smith |
| 6,783,790 B1 | 8/2004 | Emsing et al. |
| 6,902,783 B1 | 6/2005 | Hammer et al. |
| 7,008,655 B1 | 3/2006 | Asianis |
| 7,211,283 B2 | 5/2007 | Jones et al. |
| 7,488,503 B1 | 2/2009 | Porzio et al. |
| 7,618,485 B2 | 11/2009 | Renn |
| 7,790,699 B2 | 9/2010 | Melvik et al. |
| 8,003,152 B1 | 8/2011 | Xiong |
| 8,382,888 B2 | 2/2013 | Dellinger et al. |
| 8,540,926 B2 | 9/2013 | Crawley et al. |
| 8,563,702 B2 | 10/2013 | Miraftab et al. |
| 9,339,979 B2 | 5/2016 | Crawley |
| 9,795,990 B2 | 10/2017 | Edwards et al. |

(Continued)

FOREIGN PATENT DOCUMENTS

| | | |
|---|---|---|
| CA | 2757662 A1 | 10/2010 |
| CN | 1149547 A | 5/1997 |

(Continued)

OTHER PUBLICATIONS

Saha et al, Hydrocolloids as thickening agents and gelling agents in food: a critical review, 2010, J Food Sci Technol vol. 47, pp. 587-597.

Oxford Dictionary, definition of cup, 2021.

Porto, S., Agargel Structure, Wayback machine—https://web.archive.org/web/20090106162904/http://www.agargel.com.br/agar-tec-en.html.

Porto, S., Agargel Carrageenan, Wayback machine—https://web.archive.org/web/20081121213041/http://www.agargel.com.br/carrageenan.html.

(Continued)

*Primary Examiner* — Robert T Butcher
(74) *Attorney, Agent, or Firm* — HelixIP LLP

(57) ABSTRACT

Disclosed herein are compositions and articles made therefrom, the compositions and articles comprising at least one hydrocolloid, at least one plasticizer, at least one filler and/or humectant and water. Typically, the components are derived from biological sources, such as seaweed, plants, or animals. Typically, the components are made from food quality ingredients, making the compositions and articles edible and/or biodegradable. The compositions are used to form articles, such as straws, and the articles have desirable flexibility and moisture barrier properties, such as swelling resistance, as well as biodegradability and/or compostability properties.

19 Claims, 2 Drawing Sheets

(56) References Cited

U.S. PATENT DOCUMENTS

| | | |
|---|---|---|
| 10,179,856 B2 | 1/2019 | Karrer et al. |
| 10,575,536 B2 | 3/2020 | Briganti et al. |
| 2001/0036499 A1 | 11/2001 | Ong |
| 2002/0076478 A1 | 6/2002 | Grazela et al. |
| 2003/0219514 A1 | 11/2003 | Jones |
| 2004/0013772 A1 | 1/2004 | Weiss et al. |
| 2004/0109932 A1 | 6/2004 | Chen et al. |
| 2004/0219271 A1 | 11/2004 | Belknap |
| 2005/0118326 A1 | 6/2005 | Anfinsen |
| 2005/0172835 A1 | 8/2005 | LaMaster |
| 2005/0260304 A1 | 11/2005 | Schaffer et al. |
| 2005/0260329 A1 | 11/2005 | Yusuf et al. |
| 2006/0013940 A1 | 1/2006 | Mueller |
| 2006/0024425 A1 | 2/2006 | Barkalow et al. |
| 2006/0034976 A1 | 2/2006 | Cotten et al. |
| 2006/0083841 A1 | 4/2006 | Casper |
| 2006/0159823 A1 | 7/2006 | Melvik |
| 2006/0182867 A1 | 8/2006 | Hill et al. |
| 2006/0198930 A1 | 9/2006 | Royo et al. |
| 2006/0286214 A1 | 12/2006 | Weiss et al. |
| 2007/0098868 A1 | 5/2007 | Venables |
| 2007/0178140 A1 | 8/2007 | Aimutis |
| 2007/0287777 A1 | 12/2007 | Kawamura et al. |
| 2007/0292643 A1 | 12/2007 | Renn |
| 2009/0162492 A1 | 6/2009 | Conway |
| 2009/0283608 A1 | 11/2009 | Crawley |
| 2010/0068350 A1 | 3/2010 | Shen et al. |
| 2010/0209569 A1 | 8/2010 | Pasini |
| 2010/0266744 A1 | 10/2010 | Dwivedi |
| 2010/0272863 A1 | 10/2010 | Griebel |
| 2010/0303997 A1 | 12/2010 | Fulton |
| 2011/0159154 A1 | 6/2011 | Ang |
| 2011/0217432 A1 | 9/2011 | Krnic et al. |
| 2012/0294997 A1 | 11/2012 | Lange |
| 2013/0022711 A1 | 1/2013 | Ichihara |
| 2013/0045246 A1 | 2/2013 | Edwards |
| 2014/0057024 A1 | 2/2014 | Briganti et al. |
| 2014/0113034 A1 | 4/2014 | Bartkowska et al. |
| 2014/0161944 A1 | 6/2014 | Briganti et al. |
| 2014/0170203 A1 | 6/2014 | Edwards |
| 2015/0030775 A1 | 1/2015 | Edwards |
| 2015/0147435 A1 | 5/2015 | Rettey |
| 2015/0216216 A1 | 8/2015 | Marga |
| 2016/0149452 A1 | 11/2016 | Briganti |
| 2016/0324207 A1 | 11/2016 | Briganti et al. |
| 2017/0142996 A1 | 5/2017 | Costello |
| 2017/0181458 A1 | 6/2017 | Mantius |
| 2017/0223982 A1 | 8/2017 | Yamabe |
| 2018/0133108 A1 | 5/2018 | Palazzi |
| 2018/0192803 A1 | 7/2018 | Juvina et al. |
| 2018/0317682 A1 | 11/2018 | Nguyen |
| 2019/0248989 A1 | 8/2019 | Raszewski |
| 2020/0113193 A1 | 4/2020 | Kong |
| 2020/0214484 A1 | 7/2020 | Briganti et al. |
| 2022/0289999 A1 | 9/2022 | Brown |

FOREIGN PATENT DOCUMENTS

| | | |
|---|---|---|
| CN | 101838405 A | 9/2010 |
| CN | 103087356 A | 5/2013 |
| CN | 111875853 A | 11/2020 |
| EP | 790777 B1 | 8/1994 |
| ES | 2545830 | 9/2015 |
| WO | WO 96/20604 | 7/1996 |
| WO | WO 98/42214 | 10/1998 |
| WO | WO 03/035026 | 5/2003 |
| WO | WO 2006/044342 | 4/2006 |
| WO | WO 2007/149452 | 12/2007 |
| WO | WO 2008/044586 | 4/2008 |
| WO | WO 2011/103594 | 8/2011 |
| WO | WO 2012/175266 | 12/2012 |
| WO | WO 2014/028654 | 2/2014 |
| WO | WO 2016/168421 | 10/2016 |
| WO | WO 2018/187782 | 10/2018 |
| WO | WO 2019/046789 | 3/2019 |
| WO | WO 2020/174234 | 9/2020 |
| WO | WO 2021/019524 | 2/2021 |
| WO | WO 2021/019525 | 2/2021 |
| WO | WO 2021/028555 | 2/2021 |
| WO | WO 2021/046041 | 3/2021 |
| WO | WO 2021/105722 | 6/2021 |
| WO | WO 2021/108756 | 6/2021 |

OTHER PUBLICATIONS

FMC BioPolymer: Carrageenan/Disperse and Solubilize, Wayback Machine https:/web.archive.org/web/20100221020746https://www.fmcbiopolymer.com:80/Food/ingredients/carrageenan.

Herbstreith & Fox, Techniques for the addition of pectin into the product batch, 1999, Technical Application Laboratory Herbstreith & Fox Corporate Group.

The British Larder, How to use Agar Agar, 2023, https://britishlarder.co.uk/how-to-use-agar-agar/.

Karo, KaroSyrup, http://web.archive.org/web/20080919064628/http://www.karosyrup.com/faq.html.

Kendall, P. et al, Fruit Leather, 2012, Leathers and Jerkies, Food Nutrition Series, Fact Sheet No. 9.311.

Lan et al, Preparation and properties of sodium carboxymethyl cellulose-sodium alginate-chitosan composite film, 2018, Coatings vol. 8, 291.

Malik et al, Robotic extrusion of algae-laden hydrogels for large-scale applications, 2020, Global Challenges vol. 4, 1900064.

Dezeen, Ari Jonsson uses algae to create biodegradable water bottles, 2016, https://dezeen.com/2016/03/20/ari-jonsson-algae-biodegradable-water-bottles-iceland/.

BIO-BASED, BIODEGRADABLE COMPOSITIONS AND ARTICLES MADE THEREFROM

CROSS-REFERENCE TO RELATED APPLICATIONS

This application is continuation of U.S. patent application Ser. No. 18/086,519, filed Dec. 21, 2022, which is a continuation in part of PCT application serial number PCT/US2022/033527, filed Jun. 15, 2022, which claims priority to U.S. provisional application Ser. No. 63/213,887, filed Jun. 23, 2021, and U.S. provisional application Ser. No. 63/243,358, filed Sep. 13, 2021, each of which is incorporated by reference in its entirety for all purposes.

BACKGROUND

Disposable articles, such as vessels, cups, straws, stirrers, and utensils, typically are made from plastics, paper, or plastic-lined paper and are commonly used alternatives to reusable articles for their low cost and convenience. Both Styrofoam @ (Dow Chemical) and paper cups can hold hot liquids for extended periods of time. Disposable drinking straws made from plastic materials are likewise common. However, disposable cups and straws are not good for the environment. Because they are not biodegradable, they litter the environment or fill landfills. In addition, the plastics used in disposable articles typically are derived from fossil fuels.

Plastic articles, such as plastic straws, are ubiquitous. Millions of single-use plastics, such as plastic straws, are thrown away every day in the US alone, resulting in roughly 7.5 million plastic straws polluting the US shoreline (from 2012 to 2017), as well as shorelines around the world. Yet plastic straws make up about 99% of the $3B global drinking-straw market and only 9% of them can be recycled due to their size. Considering that the average lifetime of a plastic straw is 450+ years, an alternative solution is urgently needed.

Paper articles, such as cups and straws, present one solution that is sustainable and scalable, yet more expensive than plastic. Moreover, inferior water barrier properties of paper articles, such as straws, contribute to their abbreviated lifespan in a drink, where the straw starts to disintegrate or undesirably swell after 30-60 min use. In addition, while raw streams for paper articles, such as straws or cups, come from biorenewable resources, the paper industry is notoriously more energy consuming and hence more $CO_2$ emitting than the plastic industry, hence ultimately contributing to the green-house gas crisis.

Food service industry articles (e.g., cutlery, utensils, and straws) made of bioplastic and bioplastic composites, are gaining popularity. Corn derived polylactic acid (PLA) and polypropylene (PP) are the main constituents in these formulations. To reduce the cost and improve biodegradability of these materials, PLA and PP are commonly blended with natural fibers and starches. Despite the improved barrier properties compared to paper goods, these materials still exhibit an array of shortcomings. Although PLA is marketed as a natural, bio-based, and biodegradable alternative to petroleum-based plastics, PLA is not biodegradable under natural conditions and requires commercial composting facilities for degradation. Accordingly, PLA is not an environmentally friendly alternative to other plastics. Moreover, the use of corn as a raw materials stream and concomitant use of agricultural resources, like fresh water and fertilizers, to produce these biorenewable monomers, and consequent biopolymers, competes with or diverts valuable human food sources. In addition, mechanical properties and cost of these materials requires improvement.

Water-based (aqueous) formulations composed primarily of alginate salts (e.g., sodium and potassium salts) can also be used in articles, but are more typically employed in the food and cosmetics industries as gelling and thickening agents and in biotechnology for wound dressing, drug-delivery, and tissue regeneration. Such formulations are disadvantageous in terms of poor mechanical properties (low tensile strength, brittleness) and barrier properties (rapid loss of moisture in environments with low relative humidity or swelling upon contact with aqueous solutions). Some techniques to address these shortcomings include the addition of plasticizers (glycerol, mannitol, and others), reinforcement with cellulosic fibers (microcrystalline cellulose (MCC), thermoplastic cellulose ethers (e.g., Ethocell™ (DuPont Chemical Company) and others), application of hydrophobic coatings (Beeswax, Soy wax, Rice bran wax and others) and implementation of cross-linking, including both ionic cross-linking agents (e.g., use of metal ions) and covalent cross-linking agents (e.g., citric acid, tartaric acid, and others).

Kappa-carrageenan is a linear mono-sulfated galactose-based polysaccharide typically used as a thickening, gelling, and protein-suspending agent in the food industry, accounting for almost 80% of total world production. The rest of the produced kappa-carrageenan generally is divided between the pharmaceutical, cosmetic, textile, and printing industries, where it has found broad application due to its gel-forming properties. However, kappa-carrageenan typically is not employed in single-use food service industry items, such as cutlery or drinking straws.

Various biodegradable, edible, and/or bio-based formulations, cups, straws, and packaging are known in the art, but are distinguishable in numerous ways from the present disclosure. In addition, such known formulations, cups, straws, and packaging generally have inferior mechanical and/or moisture barrier properties as compared to the articles of the present disclosure.

International Patent Application Publication WO 2019/046789 relates to a low-sugar or sugar-free edible and/or biodegradable material for holding foods and liquids for consumption. This publication is incorporated by reference herein in its entirety to indicate the state of the art with respect to such materials, for definitions and examples of the components employed in the materials therein, and for a description of processing steps employed therein.

International Patent Application Publication WO 2021/046041 relates to biodegradable tubular members, such as straws, comprising a cellulose ester that can be cellulose acetate, in which the tubular members comprise a plurality of pores sized and structured in a manner to allow permeation or infiltration of water or bacteria into the pores to promote biodegradability. This publication is incorporated by reference herein in its entirety to indicate the state of the art with respect to such materials, for definitions and examples of the components employed in the materials therein, and for a description of processing steps employed therein.

Chinese Patent Application Publication CN111875853A relates to a degradable environment-friendly straw comprising sodium alginate, pectin, welan gum, modified starch, plasticizer, tea polyphenol, chitosan oligosaccharide, calcium gluconate, tartaric acid, and deionized water. This publication is incorporated by reference herein in its entirety to indicate the state of the art with respect to such straws, for definitions and examples of the components employed in the straws therein, and for a description of processing steps employed therein.

International Patent Application Publication WO 2021/108756 relates to a biodegradable and water-soluble packaging material comprising a biodegradable nonionic polysaccharide, a biodegradable ionic polysaccharide, and a plasticizer. This publication is incorporated by reference herein in its entirety to indicate the state of the art with respect to such packaging materials, for definitions and examples of the components employed in the packaging materials therein, and for a description of processing steps employed therein.

U.S. Pat. No. 6,902,783 relates to edible molded bodies in the form of flat or tubular films suitable for use as sausage casings and food packaging films, the casing/film comprising biopolymers, cleavage products or derivatives thereof and/or synthetic polymers, at least one edible plasticizer, at least one lubricant, and at least one cross-linker, and fibers. This patent is incorporated by reference herein in its entirety to indicate the state of the art with respect to such sausage casings and packaging film materials, for definitions and examples of the components employed in the packaging film materials therein, and for a description of processing steps employed therein.

U.S. Patent Application Publication 2015/0048554 relates to a biodegradable material comprising protein glue comprising at least one protein and natural fibers, at least one hygroscopic mineral, and water. This publication is incorporated by reference herein in its entirety to indicate the state of the art with respect to such materials, for definitions and examples of the components employed in the materials therein, and for a description of processing steps employed therein.

U.S. Patent Application Publication 2019/0248989 relates to biodegradable and edible films and packing materials that comprise a biodegradable polymer and polyhydric alcohol, polyhydric acid, or combinations thereof. This publication is incorporated by reference herein in its entirety to indicate the state of the art with respect to such materials, for definitions and examples of the components employed in the materials therein, and for a description of processing steps employed therein.

U.S. Pat. No. 7,488,503 relates to encapsulation compositions comprising a mixture of two different food polymers that are useful for encapsulating encapsulates, such as flavoring agents. This patent is incorporated by reference herein in its entirety to indicate the state of the art with respect to such compositions, for definitions and examples of the components employed in the compositions, and for a description of processing steps employed therein.

International Patent Application Publication WO 2016/181004 relates to an edible straw comprising water, gelling agent, sugar, a stabilizing or thickening agent, and a plasticizing or humectant agent. This publication is incorporated by reference herein in its entirety to indicate the state of the art with respect to such straws, for definitions and examples of the components employed in the straws, and for a description of processing steps employed therein.

U.S. Patent Application Publication 2007/0292643 relates to a biodegradable composition including a foamed gelling hydrocolloid system to which a firming agent and fibrous material are added. The '643 publication is incorporated by reference herein in its entirety to indicate the state of the art with respect to such compositions, for definitions and examples of the components employed in the compositions therein, and for a description of processing steps employed therein.

International Patent Application Publication WO 2021/019524 relates to a bioplastic packaging or container made from seaweed using a process comprising immersing the seaweed in water for at least 10 minutes, rinsing and washing the seaweed, cutting the seaweed into pieces less than 1 cm, and then forming a seaweed gel or dough by adding water to the cut seaweed. An exemplified straw is rolled from a mixture which further comprises rice flour and gluten flour This publication is incorporated by reference herein in its entirety to indicate the state of the art with respect to such packaging or containers, for definitions and examples of the components employed in the packaging or containers, and for a description of processing steps employed therein.

International Patent Application Publication WO 2021/019525 relates to a biodegradable and edible bioplastic comprising seaweed from *Eucheuma* sp, *Sargassum* sp, *Turbinaria*, or *Gracilaria*, tubers from potato, cassava, and sweet potato, protein isolate from soy and gluten, sap from rubber, copal, dammar, and jelutung, and additives from glycerin, sorbitol, PEG, food flavor and food color. This publication is incorporated by reference herein in its entirety to indicate the state of the art with respect to such a bioplastic, for definitions and examples of the components employed in the bioplastic, and for a description of processing steps employed therein.

U.S. Patent Application Publication 2009/0099353 relates to composite fibers of alginate and chitosan, for wound management products, in which the chitosan polymer is bonded to the alginate polymer along the length of the fiber. Such composite fibers are produced by extruding a solution of alginate into a coagulation bath of chitosan. This publication is incorporated by reference herein in its entirety to indicate the state of the art with respect to such composite fibers, for definitions and examples of the components employed in the composite fibers, and for a description of processing steps employed therein.

International Patent Application Publication WO 2006/044342 relates to alginate gel comprising a soluble alginate and an insoluble alginate/gelling ion particles, in which the gel is formed by the gelling ions of the particles cross-linking the insoluble alginate polymer particles and the soluble alginate polymers. This publication is incorporated by reference herein in its entirety to indicate the state of the art with respect to such alginate gels, for definitions and examples of the components employed in the alginate gels, and for a description of processing steps employed therein.

U.S. Patent Application Publication 2018/0192803 relates to a straw containing water, gelling agent, sugar, a stabilizing or thickening agent, and a plasticizing or humectant agent. This publication is incorporated by reference herein in its entirety to indicate the state of the art with respect to such straws, for definitions and examples of the components employed in the straws, and for a description of processing steps employed therein.

International Patent Application Publication WO 2008/044586 relates to a molded article which comprises a branched starch having a 6-α-maltosyl branched structure and/or a 6-α-maltotetraosyl branched structure. This publication is incorporated by reference herein in its entirety to indicate the state of the art with respect to such molded articles, for definitions and examples of the components employed in the molded article, and for a description of processing steps employed therein.

International Patent Application Publication WO 2003/035026 relates to polysaccharide networks, especially starch networks, having a high network density, high solidity, a low swelling degree and exhibiting reduced water absorption. This publication is incorporated by reference herein in its entirety to indicate the state of the art with respect to such polysaccharide networks, for definitions and examples of the components employed in the polysaccharide networks, and for a description of processing steps employed therein.

International Patent Application Publication WO 2020/174234 relates to a composition comprising a seaweed extract, a water-soluble cellulose derivative, and water, as well as to packaging material prepared from the composition. This publication is incorporated by reference herein in its entirety to indicate the state of the art with respect to such compositions and packaging materials, for definitions and examples of the components employed in the compositions and packaging materials, and for a description of processing steps employed therein.

U.S. Patent Application Publication 2006/0024425 relates to edible film formulations using low viscosity hydrolyzed vegetable gum as a film forming component. This publication is incorporated by reference herein in its entirety to indicate the state of the art with respect to such films, for definitions and examples of the components employed in the films, and for a description of processing steps employed therein.

International Patent Application Publication WO 1998/042214 relates to edible films and coatings suitable for use as moisture barriers in food. This publication is incorporated by reference herein in its entirety to indicate the state of the art with respect to such films, for definitions and examples of the components employed in the films, and for a description of processing steps employed therein.

International Patent Application Publication WO 2021/028555 relates to compostable tools for eating and for drinking, such as drinking straws or cutlery. This publication is incorporated by reference herein in its entirety to indicate the state of the art with respect to such compostable tools, for definitions and examples of the components employed in the compostable tools, and for a description of processing steps employed therein.

While promising, these technologies are yet to be scaled and streamlined to be economically viable, and there are still various shortcomings in terms of the mechanical, water resistance, and other properties of articles produced from the bio-based compositions, as well as the processability of such compositions into the articles.

Thus, there remains a need in the art for bio-based articles possessing desired properties. There is a particular need in the art for bio-based articles with resistance to water and other liquids while maintaining flexibility and other mechanical properties such as compressibility and bendability.

SUMMARY

In order to be an effective substitute for disposable articles, such as cups, straws, stirrers, utensils, or other vessels, the articles of the present disclosure are preferably able to withstand the hot and cold temperatures of food and beverages. In particular, given the large consumer demand for coffee and other beverages, cups and straws made from an alternative biodegrable material should be able to hold or be in contact with both hot and cold liquids. While several examples of such containers or utensils exist today, most lack the structural integrity and versatility required to hold or be in contact with liquids having different temperatures, particularly for extended periods. The compositions and articles made therefrom disclosed herein address at least some of these and other shortcomings, and provide, in some aspects, a biodegradable article that is sufficiently rigid to be used as a cup, straw, or utensil, while also being able to withstand hot and/or cold beverages for an extended period of time.

In some aspects, disclosed herein are biodegradable and optionally edible articles, vessels, or utensils, that comprise at least one hydrocolloid such as alginate, chitosan, agar, kappa-carrageenan, iota-carrageenan, konjac gum, guar gum, locust bean gum, or any combination thereof, typically in combination with other components, such as at least one humectant, at least one plasticizer, at least one filler (or strength modifier), at least one inorganic cross-linking agent, at least one hydrophobic additive, and/or water, as well as optional additional ingredients including one or more sweeteners (e.g., non-sugar, sugar, honey, etc.), flavoring agents, coloring agents, active ingredients, edible oils, and preservatives (e.g., natural preservatives). The article may also be coated with an optionally edible coating, for example, to enhance waterproofing, improve shelf life, and/or reduce the stickiness of the article, or to provide flavor, color or graphics to the article. The articles may hold or be in contact with liquids or foods (e.g., moist foods) for an extended period of time, preferably more than about one hour. The article may be in the form of a utensil, vessel, cup, drinking straw, stirrer, or any other suitable form. In some aspects, the article is biodegradable, compostable, or a combination thereof.

In some aspects, disclosed herein are flexible, strong, bio-based and/or biodegradable articles with improved water-barrier properties, as well as the compositions (e.g., pre-process mixtures) or pellets used to make such articles. These articles, pellets, and compositions comprise ingredients obtained from biorenewable sources, such as seaweed, plants, animals, or a combination thereof, and provide a sustainable and cost-effective solution to problems relating to single-use plastic pollution, specifically single use plastic straws or other articles. In some aspects, such compositions are used as a replacement for plastic (e.g., plastic derived from petroleum) in the manufacturing of single-use food service industry items. In some aspects, the composition (e.g., pre-process mixture) is in the form of pellets for processing by hot-melt extrusion. In some aspects, the pellets are formed by mixing selected components of the composition for a selected time to achieve a desired consistency suitable for further processing. In some aspects, the pellets are of a selected shape, size and weight suitable for further processing by cold or hot extrusion processes. In some aspects, the pre-process mixture is compounded into a filament. In some aspects, the filament is cut into pellets. In some aspects, the pellet is characterized by dimensions (i.e., diameter, length, width, thickness) in the range of 2 mm to 10 mm or more preferably 2 mm to 5 mm. More specifically, the pellets can have any useful shape and in particular are cylindrical in shape. In some aspects, the pellets have a diameter within the range of 2 mm and 10 mm and more preferably 2 mm to 5 mm. In some aspects, the pellet is characterized by a thickness/length within the range of 2 mm and 10 mm.

In some aspects, such compositions comprise hydrocolloids, which can be biopolymers, (e.g., alginates or carrageenans, particularly kappa-carrageenan) derived from seaweed, such as kelp or red algae. Seaweed grows unattended in the ocean (e.g., kelp growing several meters per day) and requires no agricultural resources or fresh water, hence presenting an ideal renewable and abundant natural resource to replace plastic in single use items in the food industry. However, hydrocolloids (or biopolymers) other than or in addition to alginates or carrageenans, particularly kappa-carrageenan, can also be employed, as described elsewhere herein. The energy expenditure which is required for the extraction of alginate (1 kg) from kelp is negated by 2.2 kg of sequestered $CO_2$ in the form of blue carbon, meaning that seaweed-derived biopolymers not only eliminate the need for consuming valuable land and chemical resources for farming, but also drastically reduce $CO_2$ in the atmosphere. Additionally, in some aspects, compositions comprising a hydrocolloid or biopolymer, such as alginate or carrageenan, particularly kappa-carrageenan, can be processed on conventional plastic processing equipment, such as twin or single screw cold or hot-melt extruders, depending on the composition, enabling the use of existing manufacturing technology (e.g., equipment intended for processing petroleum-derived plastics). For example, compositions (pre-process mixtures) comprising alginates or dried and milled brown seaweed as the main component (excluding water) can be produced using cold extrusion, whereas compositions (pre-process mixtures) comprising carrageenan, particularly kappa-carrageenan, or dried and milled red seaweed, even in minor amounts (and also including alginate in some aspects), can be produced using hot-melt extrusion. Articles, such as vessels or straws, can be produced from such formulations in a scalable and economically feasible manner, with costs on par with or less than production of paper straws.

In some aspects, disclosed is an alginate-based flexible and biodegradable composition and articles made therefrom, in which alginate (e.g., sodium alginate) and other bio-derived polysaccharides (e.g., chitin, chitosan, starch, cellulose) are included in the composition, and in some aspects are the main components of the composition. In some aspects, alginate is the main component of the composition and/or article (excluding water).

In some aspects, disclosed is a carrageenan-based flexible and biodegradable composition and articles made therefrom, in which carrageenan, particularly kappa-carrageenan and mixtures of kappa-carrageenan with other carragenans, and other bio-derived polysaccharides (e.g., chitosan/chitin or alginate) are included in the composition, and in some aspects are the main components of the composition. In some aspects, carrageenan, which can be a mixture of carrageenans, is the main component of the composition and/or article (excluding water). In some aspects, kappa-carrageenan is the main component of the composition and/or article (excluding water). In some aspects, disclosed is an article comprising carrageenan, particularly kappa-carrageenan, which article is flexible, strong, and biodegradable with an extended shelf life (e.g., 30 days or more under ambient conditions without any packaging), and also possessing good water-barrier properties (such as, under 50 wt. % swelling in contact with water at room temperature, as disclosed elsewhere herein). In some aspects, the carrageenan-based article is produced using at least one step of hot-melt extrusion. In some aspects, the carrageenan-based article is not produced using cold extrusion. In some aspects, the kappa-carrageenan-based article is produced using at least one step of hot-melt extrusion. In some aspects, the kappa-carrageenan-based article is not produced using cold extrusion.

In some aspects, single-use food service industry products, such as straws, which consist exclusively of food-grade ingredients, are provided, and such features make the products edible. In some aspects, discarded products, such as straws, can be collected and used as fertilizer (e.g., due to the high organic content of the formulation) or as a potential feed for animals, fish, or microorganisms.

The compositions disclosed herein may be used for producing food service items, such as straws, by cold or hot extrusion. In some aspects, the resulting products, such as straws, display a moderate to high tensile strength (MPa) and compressive strength (MPa), as well as improved barrier properties, enabling the articles to remain flexible even in environments with low relative humidity, and to resist swelling (under 60% by weight, preferably under 50% by weight and more preferably under 30% by weight) in aqueous solutions.

Compositions disclosed herein, particularly those containing alginate, may be used for producing food service items, such as straws, by cold or hot extrusion, but are preferably processed by cold extrusion. In some aspects, the resulting products, such as straws comprising alginate, display a moderate to high tensile strength (MPa) and compressive strength (MPa), as well as improved barrier properties, enabling the articles to stay flexible even in environments with low relative humidity, and to resist swelling (under 60% by weight, preferably under 50% by weight and more preferably under 30% by weight) in aqueous solutions.

The compositions disclosed herein, particularly those comprising kappa-carrageenan, may be used for producing food service items, such as straws, in which the composition is used as a resin in a continuous hot-melt extrusion (HME) process to prepare single-use food service industry products, which are sustainable bio-renewable materials. In some aspects, such compositions consist exclusively of food-grade ingredients, making them biodegradable, edible, and appropriate for food service settings. In some aspects, the resulting products, such as straws comprising kappa-carrageenan, display a moderate tensile strength (e.g., 20-25 MPa) and moderate compressive strength (e.g., 10-13 MPa), as well as barrier properties sufficient to maintaining flexibility and structural integrity for an extended period of time (e.g., over 30 days) under ambient conditions without any packaging (e.g., air- and/or moisture-barrier packaging). In some aspects, the resulting products, such as straws comprising kappa-carrageenan, exhibit reduced water absorption (in comparison to paper analogs), with swelling under 50% by weight in aqueous solutions after 1 hour at room temperature, and with swelling under 30% in aqueous solution after 1 hour at 0° C.

In some aspects, the pre-process mixtures comprise about 10 to 20 wt. % of sodium alginate, about 20 to 30 wt. % plasticizer, about 30-50 wt. % water, about 1-3 wt. % humectant, and other desired optional additives, such as coloring agents, cross-linking agents, and preservatives.

In some aspects, the pre-process mixtures or articles comprise (1) about 10 to 20 wt. % of kappa-carrageenan, (2) about 10 to 20 wt. % of additional hydrocolloid (e.g., biopolymer or polysaccharide), in which the hydrocolloid comprises chitosan, chitin, alginate (e.g., sodium alginate), iota-carrageenan, or any combination thereof, (3) about 5 to 20 wt. % plasticizer, (4) about 5 to 20 wt. % filler (e.g., organic filler or strength modifier (e.g., MCC), inorganic filler, or mineral salt filler), (5) about 20-70 wt. % water, and (6) optional additives, such as coloring agents, flavors, and/or preservatives, which may be present up to 1-3 wt. %. In some aspects, the filler employed also functions as a humectant. In some aspects, the filler employed does not function as a humectant. In some aspects, the pre-process mixtures or articles comprise (1) about 10 to 20 wt. % of kappa-carrageenan, (2) about 10 to 20 wt. % of additional hydrocolloid (e.g., biopolymer or polysaccharide), in which the hydrocolloid comprises chitosan, chitin, alginate (e.g., sodium alginate), iota-carrageenan, or any combination thereof, (3) about 5 to 20 wt. % plasticizer, (4) a filler (e.g., organic filler or strength modifier (e.g., MCC), inorganic filler, or mineral salt filler), (5) a humectant, where the total amount of filler and humectant is about 5 to 20 wt %, (6) about 20-70 wt. % water, and (6) optional additives, such as coloring agents, flavors, and/or preservatives, which may be present up to 1-3 wt. %.

In some aspects, the pre-process mixtures or articles comprise (1) about 10 to 20 wt. % of kappa-carrageenan, (2) about 10 to 20 wt. % of additional hydrocolloid (e.g., biopolymer or polysaccharide), in which the hydrocolloid comprises chitosan, chitin, alginate (e.g., sodium alginate), iota-carrageenan, or any combination thereof, (3) about 5 to 20 wt. % plasticizer, (4) about 0 to 10 wt. % humectant, (5) about 30 to 75 wt. % water, and (6) optional additives, such as coloring agents, flavors, and/or preservatives, which may be present up to 1-3 wt. % However, any component can be employed in the amounts described elsewhere herein, and such compositions can include or exclude any component, as described elsewhere herein.

In some aspects, the pre-process mixtures comprise about 5-35 wt. % hydrocolloid (which may be a mixture of different hydrocolloids), 20-40 wt. % plasticizer, and 0.5 to 10 wt. % humectant, along with optional ingredients and water. In some aspects, the pre-process mixtures or articles comprise about 15-35 wt. % hydrocolloid (which may be a mixture of hydrocolloids), about 5-20 wt. % plasticizer, and about 5-10 wt. % filler (e.g., organic filler (e.g., MCC), inorganic filler or mineral salt filler), along with optional ingredients and water. In some aspects, the pre-process mixtures comprise about 5-35 wt. % hydrocolloid (which may be a mixture of different hydrocolloids), 20-40 wt. % plasticizer, 5-10 wt. % filler and 0.5 to 10 wt. % humectant, along with optional ingredients and water.

In some aspects, the pre-process mixture or article comprising kappa-carrageenan further comprises at least one of a filler (e.g., strength modifier, inorganic filler, and/or organic filler), a cross-linking agent (e.g., an organic or inorganic cross-linking agent), a plasticizer (hydrophobic and/or hydrophilic plasticizer), and optionally a hydrophobic additive, or any combination thereof, or a combination of all components thereof. In some aspects of this embodiment, the filler also functions as a humectant. In some aspects, the pre-process mixture or article comprising kappa-carrageenan contains a filler and a humectant which are separate components in the composition. In some aspects, the pre-process mixture or article comprising kappa-carrageenan does not contain a cross-linking agent. In some aspects, the pre-process mixture or article comprising kappa-carrageenan does not contain an organic cross-linking agent. In some aspects, the pre-process mixture or article comprising kappa-carrageenan does not contain an inorganic cross-linking agent. In some aspects, the pre-processing mixture or article does not contain a dicarboxylic acid, tannic acid, malic acid, succinic acid, adipic acid, citric acid, tannic acid, caffeic acid, catechin, or ferulic acid.

In some aspects, the pre-process mixture or article comprising kappa-carrageenan further comprises at least one of a filler (e.g., strength modifier, inorganic filler, and/or organic filler), a flow agent (such as a stearate salt), a plasticizer (hydrophobic and/or hydrophilic plasticizer), and optionally a hydrophobic additive, or any combination thereof, or a combination of all components thereof. In some aspects of this embodiment, the filler also functions as a humectant. In some aspects, the pre-process mixture or article comprising kappa-carrageenan contains a filler and a humectant which are separate components in the composition. In some aspects, the pre-process mixture or article comprising kappa-carrageenan does not contain a flow agent. In some aspects, the pre-process mixture or article comprising kappa-carrageenan does not contain a stearate salt. In some aspects, the pre-process mixture or article comprising kappa-carrageenan does not contain calcium stearate or zinc stearate or a combination thereof.

In some aspects, the pre-process mixture or article comprising kappa-carrageenan further comprises at least one of a filler (e.g., strength modifier, inorganic filler, and/or organic filler), a cross-linking agent (e.g., an organic or inorganic cross-linking agent), a flow agent (such as a stearate salt), a plasticizer (hydrophobic and/or hydrophilic plasticizer), and optionally a hydrophobic additive, or any combination thereof, or a combination of all components thereof. In some aspects of this embodiment, the filler also functions as a humectant. In some aspects, the pre-process mixture or article comprising kappa-carrageenan contains a filler and a humectant which are separate components in the composition. In some aspects, the pre-process mixture or article comprising kappa-carrageenan does not contain a flow agent or a cross-lining agent. In some aspects, the pre-process mixture or article comprising kappa-carrageenan does not contain a stearate salt or an organic cross-linking agent. In some aspects, the pre-process mixture or article comprising kappa-carrageenan does not contain a stearate salt or an inorganic cross-linking agent. In some aspects, the pre-process mixture or article comprising kappa-carrageenan does not contain a stearate salt (e.g., calcium or zinc stearate or a combination thereof) or an organic cross-linking agent (e.g., dicarboxylic acid, tannic acid, malic acid, succinic acid, adipic acid, citric acid, tannic acid, caffeic acid, catechin, or ferulic acid).

In some aspects, the hydrocolloid is a mixture of alginate, chitosan and at least one natural gum, such as guar gum, gum arabic, locust bean gum, konjac gum, or xanthan gum. In some aspects, the hydrocolloid contains 5-15 wt. % alginate and 0.5-10 wt. % chitosan. In some aspects, the hydrocolloid contains 0.5 to 5 wt. % natural gum. In some aspects, the plasticizer is a mixture of hydrophilic and hydrophobic plasticizer. In some aspects, the plasticizer is 20-35 wt. % hydrophilic plasticizer and 0.5 to 5 wt. % hydrophobic plasticizer. In some aspects, the humectant represents 1-4 wt. % of the pre-process mixture. In some aspect, the humectant comprises a metallic salt or hydrate thereof. In some aspects, the humectant comprises a metal hydroxide or hydrate thereof.

In some aspects, the hydrocolloid is a mixture of carrageenan, particularly carrageenan comprising kappa-carrageenan, and at least one of alginate, chitin or chitosan. In some aspects, the hydrocolloid is a mixture of kappa-carrageenan and at least one of alginate, chitin or chitosan, optionally additionally including at least one natural gum, such as guar gum, gum arabic, locust bean gum, konjac gum, or xanthan gum. In some aspects, the hydrocolloid contains 10-20 wt. % kappa-carrageenan and 5-15 wt. % chitin. In some aspects, the hydrocolloid contains 10-20 wt. % kappa carrageenan and 5-15 wt. % chitosan. In some aspects, the hydrocolloid contains 10-20 wt. % kappa carrageenan and chitin and/or chitosan in a total amount of 5-15 wt. %. In some aspects, the hydrocolloid contains konjac gum, e.g., in an amount of 0-3 wt. %, 0-5 wt. %, or 0-10 wt. %. In some aspects, the plasticizer is a mixture of hydrophilic and hydrophobic plasticizer. In some aspects, the plasticizer comprises 5-15 wt. % hydrophilic plasticizer and 0.5 to 2 wt. % hydrophobic plasticizer. In some aspects, the filler represents 5-10 wt. % of the pre-process mixture. In some aspect, the filler comprises an organic filler, an inorganic filler, a mineral salt filler, or any hydrate thereof. In some aspects, the filler comprises a metal hydroxide or hydrate thereof. In some aspects, the filler comprises a carbonate (e.g., calcium carbonate). In some aspects, the filler (or strength modifier) comprises MCC and/or citrus fiber. In some aspects, the filler also functions as a humectant.

In some aspects, the hydrocolloid is a carrageenan or a mixture of carrageenans, particularly kappa-carrageenan and at least one of alginate, chitin or chitosan. In some aspects, the hydrocolloid is a mixture of kappa-carrageenan and at least one of alginate, chitin or chitosan, optionally additionally including at least one natural gum, such as guar gum, gum arabic, locust bean gum, konjac gum, or xanthan gum. In some aspects, the hydrocolloid is a carrageenan or a mixture of carrageenans, particularly kappa-carrageenan, and at least one of chitin or chitosan, or a mixture thereof. In some aspects, the hydrocolloid is a mixture of kappa-carrageenan and at least one of chitin or chitosan or a mixture thereof. In some aspects, the hydrocolloid contains 10-20 wt. % kappa-carrageenan and 10-20 wt. % chitin. In some aspects, the hydrocolloid contains 10-20 wt. % kappa carrageenan and 10-20 wt. % chitosan. In some aspects, the hydrocolloid contains 10-20 wt. % kappa carrageenan and chitin and/or chitosan in a total amount of 10-20 wt. %. In some aspects, the hydrocolloid optionally contains konjac gum, e.g., in an amount of 0-3 wt. %, 0-5 wt. %, or 0-10 wt. %.

In some aspects, the plasticizer is a mixture of hydrophilic and hydrophobic plasticizer. In some aspects, the plasticizer comprises 5-15 wt. % hydrophilic plasticizer and 0.5 to 2 wt. % hydrophobic plasticizer. In some aspects, the filler represents 10-15 wt. % of the pre-process mixture. In some aspect, the filler comprises an organic filler, an inorganic filler, a mineral salt filler, or any hydrate thereof. In some aspects, the filler comprises a metal hydroxide or hydrate thereof. In some aspects, the filler comprises a carbonate (e.g., calcium carbonate). In some aspects, the filler (or strength modifier) comprises MCC and/or citrus fiber. In some aspects, the filler also functions as a humectant.

In some aspects, the pre-process mixtures or pellets comprise 10-40 wt. % hydrocolloid (e.g., a combination of 5-10 wt. % agar, 4-9 wt. % carrageenan, and 1-5 wt. % xanthan gum), 15-30 wt. % plasticizer (e.g., a combination of 10-20 wt. % hydrophilic plasticizer such as one or more sugar alcohols, and 1-3 wt. % hydrophobic plasticizer such as one or more alkylated sugar alcohols), 0.1-5 wt. % of a humectant (e.g., calcium sulfate or a hydrate thereof), and balance water. In some aspects, the pre-process mixtures or pellets comprise about 5-35 wt. % hydrocolloid (e.g., a combination of 5-15 wt. % alginate (e.g., having 1-5 wt. % high M block alginate, and 8-16 wt. % high G block alginate), 0.5-10 wt. % chitosan, and 0.5-10 wt. % guar gum), 20-35 wt. % hydrophilic plasticizer (e.g., glycerol), 0.5-2 wt. % hydrophobic plasticizer (e.g., glycerol trioctanoate), 0.5-10 wt. % humectant (e.g., aluminum hydroxide or a hydrate thereof), 40-60 wt. % water, and optional ingredients (e.g., colorant, flavor, etc.). In some aspects, the pre-process mixtures or pellets comprise about 17-21 wt. % hydrocolloid (e.g., a combination of 10-14 wt. % alginate (e.g., 1-4 wt. % high M block alginate, and 9-13 wt. % high G block alginate), 1-5 wt. % chitosan, and 1-5 wt. % guar gum), 28-33 wt. % hydrophilic plasticizer (e.g., glycerol), 0.5-2 wt. % hydrophobic plasticizer (e.g., glycerol trioctanoate), 1-4 wt. % humectant (e.g., aluminum hydroxide or a hydrate thereof), 44-54 wt. % water, and optional ingredients (e.g., 0.1-0.5 wt. % colorant provided as an aqueous solution). In some aspects, the pre-process mixtures or pellets comprise about 3-30 wt. % hydrocolloid (e.g., a combination of 5-15 wt. % alginate (e.g., 4-10 wt. % high M block alginate, and 4-10 wt. % high G block alginate), 0.5-4 wt. % chitosan, and 2-10 wt. % locust beam gum), 30-45 wt. % hydrophilic plasticizer (e.g., sorbitol), 1.5-8 wt. % humectant (e.g., a metal oxide (e.g., magnesium oxide) or a hydrate thereof), 40-60 wt. % water, and optional ingredients (e.g., colorant, flavor, etc.). Articles or pellets made from such pre-process mixtures generally have the same weight ratio of hydrocolloids, hydrophobic plasticizer, and humectant. In some aspects, the article or pellets produced from the pre-process mixtures comprises about 34-41 wt. % hydrocolloid (e.g., a combination of 24-29 wt. % alginate (e.g., 3-8 wt. % high M block alginate, and 18-25 wt. % high G block alginate), 3-8 wt. % chitosan, and 2-7 wt. % guar gum), 17-24 wt. % hydrophilic plasticizer (e.g., glycerol), 2-6 wt. % hydrophobic plasticizer (e.g., glycerol trioctanoate), 2-7 wt. % humectant (e.g., aluminum hydroxide or a hydrate thereof), 30-40 wt. % water, and optional ingredients (e.g., 0.4-0.9 wt. % colorant).

In some aspects, the pre-process mixtures or pellets comprise 10-40 wt. % hydrocolloid (e.g., a combination of 10-20 wt. % carrageenan, and 1-20 wt. % chitin, chitosan or a mixture thereof), 8-20 wt. % plasticizer (e.g., a combination of 7-15 wt. % hydrophilic plasticizer such as one or more sugar alcohols, and 1-5 wt. % hydrophobic plasticizer such as one or more alkylated sugar alcohols), 10-15 wt. % of a filler or a combination of a filler and a humectant (e.g., calcium sulfate or a hydrate thereof), and balance water and optional ingredients (e.g., colorant, flavor, etc.). In some aspects, the pre-process mixtures or pellets comprise about 15-34 wt. % hydrocolloid (e.g., a combination of carrageenans, chitan and chitosan); 7-15 wt. % hydrophilic plasticizer (e.g., glycerol), 0.5-2 wt. % hydrophobic plasticizer (e.g., glycerol trioctanoate), 10-15 wt % filler, optional ingredients (e.g., 0.1-0.5 wt. % colorant provided as an aqueous solution) with balance water. In some aspect, the hydrocolloids are a mixture of kappa-carrageenan and chitosan. In some aspects, the hydrocolloids are a mixture of kappa-carrageenan and chitin. In some aspects, the hydrocolloids are a mixture of kappa-carrageenan, chitin and chitosan. In some aspect, the hydrocolloids are a mixture of kappa-carrageenan, iota-carrageenan and chitosan. In some aspects, the hydrocolloids are a mixture of kappa-carrageenan, iota carrageenan and chitin. In some aspects, the hydrocolloids are a mixture of kappa-carrageenan, iota-carrageenan, chitin and chitosan.

In some aspects, disclosed is a pre-process mixture, pellet, or article comprising 8-33 wt. % hydrocolloid (e.g., a combination of 5-15 wt. % kappa-carrageenan, 0-5 wt. % alginate (e.g., Alginate Protanal™ 6650), 3-10 wt. % chitosan (e.g., low MW crustacean), and 20-40 wt. % guar gum), 0-5 wt. % humectant (e.g., aluminum hydroxide or hydrate thereof), 20-45 wt. % plasticizer (e.g., a combination of 20-40 wt. % glycerol and 0-5 wt. % glycerol trioctanoate), 0-5 wt. % filler/strength modifier (e.g., microcrystalline cellulose (MCC)), 35-60 wt. % water, and optional ingredients such as coloring agents and/or preservative. In some aspects, disclosed is a pre-process mixture, pellet, or article comprising 13-33 wt. % hydrocolloid (e.g., a combination of 10-20 wt. % kappa-carrageenan, 3-10 wt. % chitosan (e.g., low MW crustacean), and 0-3 wt. % guar gum), 0-5 wt. % humectant (e.g., aluminum hydroxide or hydrate thereof), 20-45 wt. % plasticizer (e.g., a combination of 20-40 wt. % glycerol and 0-5 wt. % glycerol trioctanoate), 0-5 wt. % filler/strength modifier (e.g., MCC), 35-65 wt. % water, and optional ingredients such as coloring agents and/or preservative. In some aspects, disclosed is a pre-process mixture, pellet, or article comprising 23-63 wt. % hydrocolloid (e.g., a combination of 5-15 wt. % kappa-carrageenan, 5-15 wt. % iota-carrageenan, 10-20 wt. % alginate (e.g., Alginate Protanal™ 6650), 3-10 wt. % chitosan (e.g., low MW crustacean), and 0-3 wt. % guar gum), 0-5 wt. % humectant (e.g., aluminum hydroxide or hydrate thereof), 20-45 wt. % plasticizer (e.g., a combination of 20-40 wt. % glycerol and 0-5 wt. % glycerol trioctanoate), 0-5 wt. % filler/strength modifier (e.g., MCC), 35-65 wt. % water, and optional ingredients such as coloring agents and/or preservative. In some aspects, disclosed is a pre-process mixture, pellet, or article comprising 10-28 wt. % hydrocolloid (e.g., a combination of 10-20 wt. % kappa-carrageenan, 0-5 wt. % iota-carrageenan, and 0-3 wt. % guar gum), 0-5 wt. % humectant (e.g., aluminum hydroxide or hydrate thereof), 20-45 wt. % plasticizer (e.g., a combination of 20-40 wt. % glycerol and 0-5 wt. % glycerol trioctanoate), 0-5 wt. % filler/strength modifier (e.g., MCC), 35-65 wt. % water, and optional ingredients such as coloring agents and/or preservative. In some aspects, disclosed is a pre-process mixture, pellet, or article comprising 13-33 wt. % hydrocolloid (e.g., a combination of 10-20 wt. % kappa-carrageenan, 3-10 wt. % chitosan (e.g., low MW crustacean), and 0-3 wt. % locust bean gum), 0-5 wt. % humectant (e.g., aluminum hydroxide or hydrate thereof), 20-45 wt. % plasticizer (e.g., a combination of 20-40 wt. % glycerol and 0-5 wt. % glycerol trioctanoate), 0-5 wt. % filler/strength modifier (e.g., MCC), 35-65 wt. % water, and optional ingredients such as coloring agents and/or preservative. In some aspects, disclosed is a pre-process mixture, pellet, or article comprising 20-23 wt. % hydrocolloid (e.g., a combination of 10-20 wt. % kappa-carrageenan and 0-3 wt. % konjac gum), 0-5 wt. % humectant (e.g., aluminum hydroxide or hydrate thereof), 20-45 wt. % plasticizer (e.g., a combination of 20-40 wt. % glycerol and 0-5 wt. % glycerol trioctanoate), 0-5 wt. % filler/strength modifier (e.g., MCC), 35-65 wt. % water, and optional ingredients such as coloring agents and/or preservative. In some aspects, disclosed is a pre-process mixture, pellet, or article comprising 10-35 wt. % hydrocolloid (e.g., a combination of 10-30 wt. % kappa-carrageenan and 0-5 wt. % konjac gum), 25-45 wt. % plasticizer (e.g., a combination of 25-40 wt. % glycerol and 0-5 wt. % glycerol trioctanoate), 5-15 wt. % hydrophobic additive (e.g., palm stearin), 0-5 wt. % filler/strength modifier(e.g., MCC), 30-50 wt. % water, and optional ingredients such as coloring agents and/or preservative. In some aspects, disclosed is a pre-process mixture, pellet, or article comprising 10-35 wt. % hydrocolloid (e.g., a combination of 10-30 wt. % kappa-carrageenan and 0-5 wt. % konjac gum), 25-45 wt. % plasticizer (e.g., a combination of 25-40 wt. % glycerol and 0-5 wt. % glycerol trioctanoate) 5-15 wt. % hydrophobic additive (e.g., carnauba wax), 0-5 wt. % filler/strength modifier (e.g., MCC), 30-50 wt. % water, and optional ingredients such as coloring agents and/or preservative. In some aspects, disclosed is a pre-process mixture, pellet, or article comprising 10-35 wt. % hydrocolloid (e.g., a combination of 10-30 wt. % kappa-carrageenan and 0-5 wt. % konjac gum), 25-45 wt. % plasticizer (e.g., a combination of 25-40 wt. % glycerol and 0-5 wt. % glycerol trioctanoate), 0-3 wt. % hydrophobic additive (e.g., zein), 0-5 wt. % filler/strength modifier (e.g., MCC), 30-60 wt. % water, and optional ingredients such as coloring agents and/or preservative. In some aspects, disclosed is a pre-process mixture, pellet, or article comprising 10-35 wt. % hydrocolloid (e.g., a combination of 10-30 wt. % kappa-carrageenan and 0-5 wt. % konjac gum), 0-15 wt. % filler/strength modifier (e.g., a combination of 0-10 wt. % calcium carbonate or hydrate thereof, and 0-5 wt. % MCC), 10-30 wt. % plasticizer (e.g., a combination of 10-25 wt. % glycerol and 0-5 wt. % glycerol trioctanoate), 20-80 wt. % water, and optional ingredients such as coloring agents and/or preservative. In some aspects, disclosed is a pre-process mixture, pellet, or article comprising 15-40 wt. % hydrocolloid (e.g., a combination of 15-30 wt. % kappa-carrageenan and 0-10 wt. % konjac gum), 0-15 wt. % filler (e.g., a combination of 0-10 wt. % calcium carbonate or hydrate thereof, and 0-5 wt. % MCC), 0-5 wt. % inorganic cross-linking agent (e.g., potassium zirconium carbonate or hydrate thereof (e.g., Zirmel™ 1000)), 5-25 wt. % plasticizer (e.g., a combination of 5-20 wt. % glycerol and 0-5 wt. % glycerol trioctanoate), 30-80 wt. % water, and optional ingredients such as coloring agents and/or preservative. In some aspects, disclosed is a pre-process mixture, pellet, or article comprising 10-40 wt. % hydrocolloid (e.g., a combination of 10-30 wt. % kappa-carrageenan and 0-10 wt. % konjac gum), 0-15 wt. % filler (e.g., a combination of 0-10 wt. % calcium carbonate or hydrate thereof, and 0-5 wt. % MCC), 0-3 wt. % inorganic cross-linking agent (e.g., alum (e.g., $KAl(SO_4)_2 \cdot 12H_2O$)), 5-25 wt. % plasticizer (e.g., a combination of 5-20 wt. % glycerol and 0-5 wt. % glycerol trioctanoate), 40-80 wt. % water, and optional ingredients such as coloring agents and/or preservative. In some aspects, disclosed is a pre-process mixture, pellet, or article comprising 10-40 wt. % hydrocolloid (e.g., a combination of 10-30 wt. % kappa-carrageenan and 0-10 wt. % konjac gum), 0-15 wt. % filler (e.g., a combination of 0-10 wt. % calcium carbonate or hydrate thereof, and 0-5 wt. % MCC), 0-3 wt. % inorganic cross-linking agent (e.g., zirconium acetate), 5-25 wt. % plasticizer (e.g., a combination of 5-20 wt. % glycerol and 0-5 wt. % glycerol trioctanoate), 40-80 wt. % water, and optional ingredients such as coloring agents and/or preservative. In some aspects, disclosed is a pre-process mixture, pellet, or article comprising 10-40 wt. % hydrocolloid (e.g., a combination of 10-30 wt. % kappa-carrageenan and 0-10 wt. % konjac gum), 5-15 wt. % filler (e.g., calcium carbonate or hydrate thereof), 5-25 wt. % plasticizer (e.g., a combination of 5-20 wt. % glycerol and 0-5 wt. % glycerol trioctanoate), 40-80 wt. % water, and optional ingredients such as coloring agents and/or preservative. In some aspects, disclosed is a pre-process mixture, pellet, or article comprising 10-50 wt. % hydrocolloid (e.g., a combination of 10-30 wt. % kappa-carrageenan, 0-10 wt. % chitosan (e.g., low MW crustacean), and 0-10 wt. % konjac gum), 5-15 wt. % filler (e.g., calcium carbonate or hydrate thereof), 5-25 wt. % plasticizer (e.g., a combination of 5-20 wt. % glycerol and 0-5 wt. % glycerol trioctanoate), 40-80 wt. % water, and optional ingredients such as coloring agents and/or preservative. In some aspects, disclosed is a pre-process mixture, pellet, or article comprising 10-50 wt. % hydrocolloid (e.g., a combination of 10-30 wt. % kappa-carrageenan, 0-10 wt. % chitin (e.g., from crustacean), and 0-10 wt. % konjac gum), 5-15 wt. % filler (e.g., calcium carbonate or hydrate thereof), 5-25 wt. % plasticizer (e.g., a combination of 5-20 wt. % glycerol and 0-5 wt. % glycerol trioctanoate), 40-80 wt. % water, and optional ingredients such as coloring agents and/or preservative. In some aspects, disclosed is a pre-process mixture, pellet, or article comprising 10-50 wt. % hydrocolloid (e.g., a combination of 10-30 wt. % kappa-carrageenan, 0-10 wt. % chitosan and 0-10 wt. % chitin (e.g., from crustacean), and 0-10 wt. % konjac gum), 5-15 wt. % filler (e.g., calcium carbonate or hydrate thereof), 5-25 wt. % plasticizer (e.g., a combination of 5-20 wt. % glycerol and 0-5 wt. % glycerol trioctanoate), 40-80 wt. % water, and optional ingredients such as coloring agents and/or preservative. In some aspects, disclosed is a pre-process mixture, pellet, or article comprising 10-40 wt. % hydrocolloid (e.g., 10-30 wt. % kappa-carrageenan and 0-10 wt. % konjac gum), 5-20 wt. % plasticizer (e.g., glycerol), 0-10 wt. % hydrophobic additive (e.g., lignin (e.g., lignin powder)), 0-10 wt. % filler/strength modifier (e.g., calcium carbonate or hydrate thereof), 40-70 wt. % water, and optional ingredients such as coloring agents and/or preservative.

In some aspects, disclosed is a process for the production of the edible and/or biodegradable articles or pellets. In some aspects, the process comprises introducing a mixture comprising hydrocolloid(s) (e.g., comprising alginate or kappa-carrageenan), water-based liquid, humectant(s), plasticizer(s), and optional ingredients into a mold comprising at least an inner form and one or more outer forms, allowing the hydrocolloid to set, removing an outer mold form, dehydrating the hydrocolloid while on the inner mold form, and removing the article from the inner mold form. In some aspects, the process comprises introducing a mixture comprising hydrocolloid(s), water-based liquid, humectant(s), plasticizer(s), and optional ingredients into a mold comprising at least an inner form and one or more outer forms, allowing the hydrocolloid to set, removing an inner mold form, dehydrating the hydrocolloid while on the outer mold form, and removing the article from the outer mold form. In some aspects, the process comprises introducing a mixture comprising hydrocolloid(s), water-based liquid, humectant(s), plasticizer(s), and optional ingredients into a mold comprising at least an inner form and one or more outer forms, allowing the hydrocolloid to set, dehydrating the hydrocolloid while on the inner mold form and the outer mold form, and removing the article from the inner mold form and the outer mold form. In some aspects, the compositions are mixed and extruded (e.g., cold and/or hot extruded) into an article (e.g., straw, cup, or utensil). In some aspects, the extruded articles are submerged in a cross-linking bath followed by a rinse to eliminate excess cross-linker and drying to eliminate excess water.

In some aspects, disclosed is a process for the production of the edible and/or biodegradable articles or pellets, particularly those articles comprising kappa-carrageenan. In some aspects, the process comprises compounding a pre-process mixture into pellets using a twin-screw hot-melt extruder. In some aspects, the pellets are processed on conventional machinery, including an extruder and/or injection molding machine, into a desired form, such as an article or straw. In some aspects, the pellets are extruded into articles such as straws using a single screw extruder. In some aspects, the pellets are extruded into articles such as straws using a single screw extruder with a general purpose screw and a tubular die. In some aspects, the general-purpose screw has a 3 to 1 compression ratio. In some aspects, the resulting articles, such as straws, are air-cooled and cut to length. In some aspects, the extrusion into pellets and/or articles is performed at a temperature elevated with respect to typical room temperature, for example, each extrusion temperature independently is 70-100° C., 70-99° C., 70-95° C., 75-95° C., or 85-100° C.

In some aspects, disclosed are pre-process mixtures or pellets comprising hydrocolloid, humectant, and plasticizer, which produce articles that, in some aspects, are biodegradable, flexible, strong, and water-resistant.

In some aspects, disclosed are pre-process mixtures or pellets comprising hydrocolloid, filler, and plasticizer, which produce articles that, in some aspects, are biodegradable, flexible, strong, and water-resistant.

Various aspects are contemplated herein, several of which are set forth in the paragraphs below. It is explicitly contemplated that any aspect or portion thereof can be combined to form an aspect.

Aspect 1: An article, pellet, or a pre-process mixture comprising, consisting of, or consisting essentially of: at least one hydrocolloid, at least one plasticizer, at least one humectant or at least one filler, or a combination thereof, and water, each of which is described elsewhere herein.

Aspect 2: An article, pellet, or pre-process mixture of aspect 1 comprising, consisting of, or consisting essentially of: at least on hydrocolloid, at least one plasticizer, at least one humectant, and water, each of which is described elsewhere herein.

Aspect 3: An article, pellet, or pre-process mixture of aspect 2 that does not comprise, consist of, or consist essentially of a filler.

Aspect 4: An article, pellet, or pre-process mixture of aspect 1 comprising, consisting of, or consisting essentially of: at least one hydrocolloid, at least one plasticizer, at least one filler, and water, each of which is described elsewhere herein.

Aspect 5: An article, pellet, or pre-process mixture of aspect 4 that does not comprise, consist of, or consist essentially of a humectant.

Aspect 6: The article, pellet, or pre-process mixture of any preceding aspect, wherein the at least one hydrocolloid is derived from a biological source.

Aspect 7: The article, pellet, or pre-process mixture of any preceding aspect, wherein the at least one hydrocolloid comprises alginate, agar, chitin, chitosan, pectin, carrageenan (e.g., kappa, iota, lambda, or a combination thereof), gelatin, corn starch, a natural gum, gellan gum, guar gum, gum arabic, isomalt, konjac, lecithin, locust bean gum, maltodextrin, methylcellulose, sodium alginate, xanthan gum, tapioca, or any combination thereof.

Aspect 8: The article, pellet, or pre-process mixture of any preceding aspect, wherein the at least one hydrocolloid comprises alginate and chitosan.

Aspect 9: The article, pellet, or pre-process mixture of any preceding aspect, wherein the at least one hydrocolloid comprises a high G block alginate and a high M block alginate.

Aspect 10: The article, pellet, or pre-process mixture of any preceding aspect, wherein the at least one hydrocolloid comprises: alginates in an amount of about 5 wt. % to about 30 wt. %; chitosan and/or chitin in an amount of about 0.5 wt. % to about 10 wt. %, and guar gum in an amount of about 0.5 wt. % to about 10 wt. %, based on total weight of the article, pellet, or pre-process mixture, as appropriate.

Aspect 11: The article, pellet, or pre-process mixture of any preceding aspect, wherein the at least one hydrocolloid comprises carrageenan.

Aspect 12: The article, pellet, or pre-process mixture of any preceding aspect, wherein the at least one hydrocolloid comprises kappa-carrageenan.

Aspect 13: The article, pellet, or pre-process mixture of any preceding aspect, wherein the at least one hydrocolloid comprises carrageenan in combination with at least one of alginate, chitin, or chitosan.

Aspect 14: The article, pellet, or pre-process mixture of any preceding aspect, wherein the at least one hydrocolloid comprises: kappa-carrageenan in an amount of 10 wt. % to 20 wt. %; and chitin and/or chitosan in a total amount of 5 wt. % to 15 wt. %, and based on total weight of the article, pellet, or pre-process mixture, as appropriate.

Aspect 15: The article, pellet, or pre-process mixture of any preceding aspect, wherein the at least one hydrocolloid comprises chitosan, optionally the chitosan comprises crustacean chitosan, and optionally the crustacean chitosan comprises low molecular weight crustacean chitosan.

Aspect 16: The article, pellet, or pre-process mixture of any preceding aspect, wherein the at least one hydrocolloid comprises chitin, optionally the chitin comprises milled chitosan, and optionally the chitin comprises a low molecular weight crustacean chitin.

Aspect 17: The article, pellet, or pre-process mixture of any preceding aspect comprising hydrocolloids in a total amount of 1 wt. % to 40 wt. %, based on total weight of the article, pellet, or pre-process mixture, as appropriate.

Aspect 18: The article, pellet, or pre-process mixture of any preceding aspect, wherein the at least one plasticizer comprises glycerol, a sugar alcohol, microcrystalline cellulose, acacia gum, shellac, genepin, nano emulsions, algae oil, coconut oils, processed shea butter, ester gums, carnauba wax, palm stearin, thermoplastic cellulose ethers (e.g., Ethocell™), zein, citrate esters, phthalate esters, adipate esters, fatty acids, or any alkylated or esterified version thereof, or any combination thereof.

Aspect 19: The article, pellet, or pre-process mixture of any preceding aspect, wherein the at least one plasticizer comprises glycerol.

Aspect 20: The article, pellet, or pre-process mixture of any preceding aspect, wherein the at least one plasticizer comprises a combination of: a hydrophilic plasticizer, and a hydrophobic plasticizer.

Aspect 21: The article, pellet, or pre-process mixture of any preceding aspect, wherein the at least one plasticizer comprises a combination of: glycerol and/or a sugar alcohol, and alkylated or esterified glycerol or alkylated or esterified sugar alcohol.

Aspect 22: The article, pellet, or pre-process mixture of any preceding aspect, wherein the at least one plasticizer comprises a combination of: glycerol, and esterified or alkylated glycerol, wherein the esterified or alkylated glycerol has 4 to 15 carbon atoms in the ester or alkyl group.

Aspect 23: The article, pellet, or pre-process mixture of any preceding aspect, wherein a total amount of the at least one plasticizer is 15 wt. % to 40 wt. %.

Aspect 24: The article, pellet, or pre-process mixture of any preceding aspect, wherein the at least one plasticizer comprises a hydrophilic plasticizer in an amount of 15 wt. % to 40 wt. %, and a hydrophobic plasticizer in an amount of 0.5 wt. % to 10 wt. %.

Aspect 25: The article, pellet, or pre-process mixture of any preceding aspect, wherein the at least one plasticizer comprises a hydrophilic plasticizer in an amount of 5 wt. % to 15 wt. %, and a hydrophobic plasticizer in an amount of 0.5 wt. % to 5 wt. %.

Aspect 26: The article, pellet, or pre-process mixture of any preceding aspect, wherein the at least one filler is present and comprises starch (e.g., corn starch), microcrystalline cellulose (MCC), guar gum, carboxymethyl cellulose, citrus fiber, a mineral salt, calcium carbonate or a hydrate thereof, a salt or compound which is a hydroxide, a sulfate, a chloride, a carbonate, an oxide, an aluminate, a silicate, an acetate, silica, pentasodium triphosphate, sepiolite, silicone dioxide, zeolite, or any hydrate thereof, or any combination thereof.

Aspect 27: The article, pellet, or pre-process mixture of any preceding aspect, wherein the at least one humectant is present and comprises a salt or compound which is a hydroxide, a sulfate, a chloride, a carbonate, an oxide, an aluminate, a silicate, an acetate, silica, pentasodium triphosphate, sepiolite, silicone dioxide, zeolite, or any hydrate thereof, or any combination thereof.

Aspect 28: The article, pellet, or pre-process mixture of aspect 27, or any preceding aspect, wherein the salt or compound is a salt of an alkali metal, an alkaline earth metal, aluminum, or any combination thereof.

Aspect 29: The article, pellet, or pre-process mixture of aspect 27, or any preceding aspect, wherein the hydroxide comprises aluminum hydroxide, calcium hydroxide, or a hydrate thereof; the sulfate comprises calcium sulfate, magnesium hydrogen sulfate, sodium sulfate, sodium hydrogen sulfate, alum (e.g., $KAl(SO_4)_2$), or a hydrate thereof; the chloride comprises calcium chloride, magnesium chloride, or a hydrate thereof; the carbonate comprises calcium carbonate, potassium carbonate, magnesium carbonate, potassium zirconium carbonate (e.g., Zirmel™ 1000), or a hydrate thereof; the oxide comprises calcium oxide, magnesium oxide, aluminum oxide, or a hydrate thereof; the aluminate comprises calcium aluminate or a hydrate thereof; the silicate comprises calcium silicate, potassium silicate, lithium silicate, magnesium silicate, or a hydrate thereof; or the acetate comprises sodium acetate, potassium acetate, zirconium acetate, or a hydrate thereof; or any combination thereof.

Aspect 30: The article, pellet, or pre-process mixture of any preceding aspect, further comprising a coloring agent, a flavoring agent, or a combination thereof.

Aspect 31: The article, pellet, or pre-process mixture of any preceding aspect, wherein the at least one humectant is present and comprises a hydroxide salt or a hydrate thereof.

Aspect 32: The article, pellet, or pre-process mixture of aspect 31, or any preceding aspect, wherein the hydroxide is a salt of an alkali metal, an alkaline earth metal, or aluminum.

Aspect 33: The article, pellet, or pre-process mixture of any preceding aspect, wherein the at least one humectant is present in an amount of 0.5 wt. % to 10 wt. %, based on total weight of the article, pellet, or pre-process mixture, as appropriate.

Aspect 34: The article, pellet, or pre-process mixture of any preceding aspect, wherein the water is present in an amount of 20 wt. % to 70 wt. %.

Aspect 35: The article, pellet, or pre-process mixture of any preceding aspect, comprising a weight ratio of total hydrocolloid to humectant of 5:1 to 15:1.

Aspect 36: The article, pellet, or pre-process mixture of any preceding aspect, comprising a weight ratio of total hydrocolloid to total plasticizer of 0.1:1 to 5:1.

Aspect 37: The article, pellet, or pre-process mixture of any preceding aspect, comprising a weight ratio of total hydrocolloid to hydrophobic plasticizer of 1:1 to 20:1.

Aspect 38: The article, pellet, or pre-process mixture of any preceding aspect, wherein the at least one hydrocolloid comprises at least one alginate, and wherein the article, pellet, or pre-process mixture comprises a weight ratio of total alginate to total plasticizer of 0.07:1 to 0.8:1.

Aspect 39: The article, pellet, or pre-process mixture of any preceding aspect, wherein the at least one hydrocolloid comprises at least one alginate, and wherein the article, pellet, or pre-process mixture comprises a weight ratio of total alginate to hydrophobic plasticizer of 1:1 to 10:1.

Aspect 40: The article, pellet, or pre-process mixture of any preceding aspect, wherein the at least one hydrocolloid comprises at least one alginate, and wherein the article, pellet, or pre-process mixture comprises a weight ratio of total alginate to chitosan of 1:1 to 10:1.

Aspect 41: The article, pellet, or pre-process mixture of any preceding aspect, wherein the at least one hydrocolloid comprises at least one alginate, and wherein the article, pellet, or pre-process mixture comprises a weight ratio of total alginate to humectant of 1:1 to 10:1.

Aspect 42: The article, pellet, or pre-process mixture of any preceding aspect, wherein the at least one filler is present and comprises calcium carbonate or a hydrate thereof.

Aspect 43: The article, pellet, or pre-process mixture of any one of aspects any preceding aspect wherein the at least one filler is present in an amount of 5 wt. % to 15 wt. %, based on total weight of the article, pellet, or pre-process mixture, as appropriate.

Aspect 44: The article, pellet, or pre-process mixture of any preceding aspect, further comprising at least one inorganic cross-linking agent.

Aspect 45: The article, pellet, or pre-process mixture of aspect 44, or any preceding aspect, wherein the at least one inorganic cross-linking agent is present in an amount of 1 wt. % to 10 wt. %, based on total weight of the article, pellet, or pre-process mixture, as appropriate.

Aspect 46: The article, pellet, or pre-process mixture of aspect 44 or 45, or any preceding aspect, wherein the at least one inorganic cross-linking agent comprises zirconium acetate, potassium zirconium carbonate (e.g., Zirmel™ 1000), ammonium zirconium carbonate (e.g., Bacote™ available from Luxfer MEL Technologies), alum (e.g., KAl $(SO_4)_2$), calcium chloride, or any combination thereof.

Aspect 47: The article, pellet, or pre-process mixture of any preceding aspect, further comprising at least one hydrophobic additive.

Aspect 48: The article, pellet, or pre-process mixture of aspect 47 or any preceding aspect, wherein the at least one hydrophobic additive is present in an amount of 1 wt. % to 15 wt. %, based on total weight of the article, pellet, or pre-process mixture, as appropriate.

Aspect 49: The article, pellet, or pre-process mixture of aspect 47 or aspect 48, wherein the at least one hydrophobic additive comprises palm stearin, carnauba wax, zein, lignin, hydrophobic plasticizers, edible oils, coatings, or any combination thereof.

Aspect 50: The article, pellet, or pre-process mixture of any preceding aspect, wherein the at least one hydrocolloid comprises kappa-carrageenan, and the article, pellet, or pre-process mixture comprises a weight ratio of kappa-carrageenan to total plasticizer of 0.5:1 to 4:1.

Aspect 51: The article, pellet, or pre-process mixture of preceding aspect, wherein the at least one hydrocolloid comprises kappa-carrageenan, and the article, pellet, or pre-process mixture comprises a weight ratio of kappa-carrageenan to hydrophilic plasticizer of 0.6:1 to 4:1.

Aspect 52: The article, pellet, or pre-process mixture of any preceding aspect, wherein the at least one hydrocolloid comprises kappa-carrageenan, and the article, pellet, or pre-process mixture comprises a weight ratio of kappa-carrageenan to hydrophobic plasticizer of 5:1 to 40:1.

Aspect 53: The article, pellet, or pre-process mixture of any preceding aspect, wherein the at least one hydrocolloid comprises kappa-carrageenan, and the article, pellet, or pre-process mixture comprises a weight ratio of kappa-carrageenan to total filler of 1:1 to 4:1.

Aspect 54: The article, pellet, or pre-process mixture of any preceding aspect, wherein the at least one hydrocolloid comprises kappa-carrageenan, and the article, pellet, or pre-process mixture comprises a weight ratio of kappa-carrageenan to total other hydrocolloid of 0.6:1 to 4:1.

Aspect 55: A process to make an article, the process comprising, consisting or, or consisting essentially of: combining at least one hydrocolloid, at least one plasticizer, at least one humectant, or filler, or combination thereof, water, and optionally at least one coloring agent, so as to make a pre-process mixture; optionally, compounding the pre-process mixture into a pellet; forming the pre-process mixture or pellet into a shape; optionally, immersing the shape in a cross-linking bath to form a cross-linked shape; optionally, rinsing the cross-linked shape to remove excess cross-linker; and drying the shape, optionally cross-linked, to form the article, optionally on a mandrel; wherein the at least one hydrocolloid, the at least one plasticizer, and the at least one filler are as defined in any preceding aspect.

Aspect 56: The process of aspect 55 wherein the at least one hydrocolloid comprises carrageenan and at least one of chitosan and chitin.

Aspect 57: The process of aspect 56, wherein the forming comprises molding, extrusion, casting, or any combination thereof.

Aspect 58: The process of aspect 56 or aspect 57, wherein the forming comprises hot-melt extrusion.

Aspect 59: The process of aspect 58, wherein the hot-melt extrusion comprises a single screw extruder with a general purpose screw with a 3 to 1 compression ratio and a tubular die at a temperature of 75° C. to 95° C. and a screw speed of 5 rpm to 50 rpm.

Aspect 60: The process of any one of aspects 55-59, wherein the process is a continuous hot-melt extrusion process.

Aspect 61: The process of any one of aspects 55-60, wherein the compounding is performed.

Aspect 62: The process of any one of aspects 55-61, further comprising applying a coating, or optionally an edible coating, to the article.

Aspect 63: The process of aspect 62, wherein the applying comprises spraying, dipping, brushing, edible ink-jet printing, co-extrusion, or any combination thereof.

Aspect 64: The process of aspect 62, wherein the applying comprises immersing the article in a solution of a coating component in a solvent.

Aspect 65: The article or pellet of aspect 62, wherein the coating or edible coating comprises an oil coating, a wax coating, confectioner's glaze, or a combination thereof.

Aspect 66: The article or pellet of aspect 62, wherein the coating or edible coating comprises the wax coating, and the wax coating comprises beeswax, carnauba wax, soy wax, rice bran wax, shellac, or a combination thereof.

Aspect 67: The article of any preceding aspect, exhibiting a tensile strength of 10 to 30 MPa.

Aspect 68: The article of any preceding aspect, exhibiting a Young's modulus of 50 to 250 MPa.

Aspect 69: The article of any preceding aspect, exhibiting a compressive strength of 10 to 25 MPa.

Aspect 70: The article of any preceding aspect, exhibiting swelling in room temperature water of 0% to 50%.

Aspect 71: The article of any preceding aspect, exhibiting swelling in a cold non-alcoholic beverage of 0% to 40%.

Aspect 72: The article of any preceding aspect, exhibiting swelling in a cold alcoholic beverage of 0% to 50%.

Aspect 73: The article of any preceding aspect, exhibiting swelling in a cold carbonated beverage of 0% to 50%.

Aspect 74: A process to make a pellet, the process comprising, consisting of, or consisting essentially of: combining at least one hydrocolloid, at least one plasticizer, at least one filler, or humectant, or combination thereof, water, and optionally at least one coloring agent, so as to make a pre-process mixture; compounding the pre-process mixture into the pellet; and optionally applying a coating to the pellet by spraying, immersion, dipping, brushing, edible ink jet printing, co-extrusion, or any combination thereof, wherein the coating comprises an oil coating, a wax coating, confectioner's glaze, or any combination thereof; wherein the at least one hydrocolloid, the at least one plasticizer, and the at least one filler are as defined in any preceding aspect.

Aspect 75: The process of aspect 74, wherein the compounding comprises extrusion with a twin-screw hot-melt extruder at a temperature of 85 to 100° C., a screw speed of 200-300 rpm, and a feeding weight ratio of solids to liquids of 0.25:1 to 1:1.

Aspect 76: The process of any one of aspects 55-75, wherein the at least one hydrocolloid comprises alginate and chitosan.

Aspect 77: The process of any one of aspects 55-75, wherein the at least one hydrocolloid is carrageenan in combination with chitin and/or chitosan.

Aspect 78: The process of aspect 77, wherein carrageenan comprises kappa-carrageenan.

Aspect 79: An article, pellet, or pre-process mixture comprising:
a. at least one hydrocolloid,
b. at least one plasticizer,
c. at least one filler and/or at least one humectant and
d. water;
e. wherein the at least one hydrocolloid comprises alginate, agar, chitin, chitosan, pectin, carrageenan, gelatin, isomalt, konjac, lecithin, maltodextrin, methylcellulose, or any combination thereof.

Aspect 80: The article of aspect 79, wherein the at least one hydrocolloid comprises carrageenan.

Aspect 81: The article, pellet, or pre-process mixture of aspect 79, wherein the at least one hydrocolloid comprises kappa-carrageenan.

Aspect 82: The article, pellet, or pre-process mixture of aspect 79, wherein the at least one hydrocolloid comprises kappa-carrageenan in combination with at least one of chitin, or chitosan.

Aspect 83: The article, pellet, or pre-process mixture of aspect 82, wherein the chitosan and/or chitin are low molecular weight crustacean chitosan and/or chitin.

Aspect 84: The article, pellet, or pre-process mixture of aspect 79, wherein the at least one plasticizer comprises glycerol, a sugar alcohol, microcrystalline cellulose, acacia gum, genepin, nano emulsions, algae oil, coconut oils, processed shea butter, ester gums, palm stearin, thermoplastic cellulose ethers, zein, citrate esters, phthalate esters, adipate esters, fatty acids, or any alkylated or esterified version thereof, or any combination thereof.

Aspect 85: The article, pellet, or pre-process mixture of aspect 79, wherein the at least one plasticizer comprises a combination of hydrophilic plasticizer, and a hydrophobic plasticizer.

Aspect 86: The article, pellet, or pre-process mixture of aspect 79, wherein the at least one plasticizer comprises glycerol.

Aspect 87: The article, pellet, or pre-process mixture of aspect 79, wherein the at least one plasticizer comprises a combination of glycerol, and esterified or alkylated glycerol, wherein the esterified or alkylated glycerol has 4 to 15 carbon atoms in the ester or alkyl group.

Aspect 88: The article, pellet, or pre-process mixture of aspect 79, wherein the at least one filler comprises starch, microcrystalline cellulose (MCC), guar gum, carboxymethyl cellulose, citrus fiber, a mineral salt, calcium carbonate or a hydrate thereof, a salt or compound which is a hydroxide, a sulfate, a chloride, a carbonate, an oxide, an aluminate, a silicate, an acetate, silica, pentasodium triphosphate, sepiolite, silicone dioxide, zeolite, or any hydrate thereof, or any combination thereof.

Aspect 89: The article, pellet, or pre-process mixture of aspect 79, wherein the at least one filler comprises calcium carbonate or a hydrate thereof.

Aspect 90: The article, pellet, or pre-process mixture of aspect 79 comprising hydrocolloids in a total amount of 20 wt. % to 60 wt. % based on total weight of the article, pellet, or pre-process mixture, as appropriate.

Aspect 91: The article, pellet, or pre-process mixture of aspect 79 comprising kappa-carrageenan in an amount of 10 wt. % to 30 wt. % and comprising a second hydrocolloid in an amount of 10 wt. % to 30 wt % based on total weight of the article, pellet, or pre-process mixture, as appropriate.

Aspect 92: The article, pellet, or pre-process mixture of aspect 91, wherein the second hydrocolloid is chitin or chitosan or a mixture thereof.

Aspect 93: The article, pellet, or pre-process mixture of aspect 79, wherein a total amount of the at least one plasticizer is 1 wt. % to 30 wt. %.

Aspect 94: The article, pellet, or pre-processing mixture of aspect 79, wherein a total amount of the at least one filler is 5 wt. % to 50 wt. %.

Aspect 95: The article, pellet, or pre-process mixture of aspect 79 comprising kappa-carrageenan in an amount of 10 wt. % to 40 wt. %, chitin or chitosan or a mixture thereof in a total amount of 10 wt. % to 40 wt. %; at least one plasticizer in an amount of 1 wt. % to 30 wt. %, at least one filler in an amount of 5 wt. % to 50 wt. %, optional ingredients less than 1 wt. %, and water, wherein the amount of each component in the mixture is adjusted within the range given such that the total amount of components in the mixture is 100 wt. %.

Aspect 96: The article, pellet, or pre-process mixture of aspect 95, wherein the at least one plasticizer comprises glycerol.

Aspect 97: The article, pellet, or pre-process mixture of aspect 96, wherein the at least one plasticizer comprises a mixture of glycerol and esterified or alkylated glycerol, wherein the esterified or alkylated glycerol has 4 to 20 carbon atoms in the ester or alkyl group. In related aspects, the esterified or alkylated glycerol has 6 to 20 carbon atoms in the ester or alkyl group. In related aspects, the esterified or alkylated glycerol has 8 to 20 carbon atoms in the ester or alkyl group. In related aspects, the esterified or alkylated glycerol has 8 to 18 carbon atoms in the ester or alkyl group. In related aspects, the esterified or alkylated glycerol has 8 to 12 carbon atoms in the ester or alkyl group.

Aspect 98: The article or pellet of aspect 79, further comprising a coating.

Aspect 99: The article or pellet of claim 98, wherein the coating is a hydrophobic coating.

Aspect 100: The article or pellet of aspect 99, wherein the coating ranges in thickness from 10 nm to 100 micron.

Aspect 101: The article of aspect 79 exhibiting a tensile strength of 10 to 50 MPa.

Aspect 102: The article of aspect 79 exhibiting a Young's modulus of 50 to 500 MPa.

Aspect 103: The article of aspect 79 exhibiting compressive strength of 10 to 100 MPa.

Aspect 104: The article of aspect 79, exhibiting swelling in room temperature water of less than 50% by weight.

Aspect 105: A process to make a biodegradable article, the process comprising:
  combining (i) at least one hydrocolloid, (ii) at least one plasticizer, (iii) at least one filler and (iv) water, so as to make a pre-process mixture; and;
  optionally, compounding the pre-process mixture into a pellet;
  forming the pre-process mixture or pellet into a shape; and drying the shape to form the article.

Aspect 106: The process of aspect 105, wherein the forming comprises molding, extrusion, casting, or any combination thereof.

Aspect 107: The process of aspect 106, wherein the forming comprises hot-melt extrusion.

Aspect 108: The process of aspect 105, wherein the pre-process mixture is compounded into a pellet and the pellet is formed into the shape.

Aspect 109: The process of aspect 108, wherein the pre-process mixture is blended and processed with a twin-screw extruder to form pellets.

Aspect 110: The process of aspect 109, wherein the pellets are processed into the shape.

Aspect 111: The process of aspect 110, wherein the pellets are processed into a straw.

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

DETAILED DESCRIPTION

Statements Regarding Chemical Compounds and Nomenclature

Figure 1:
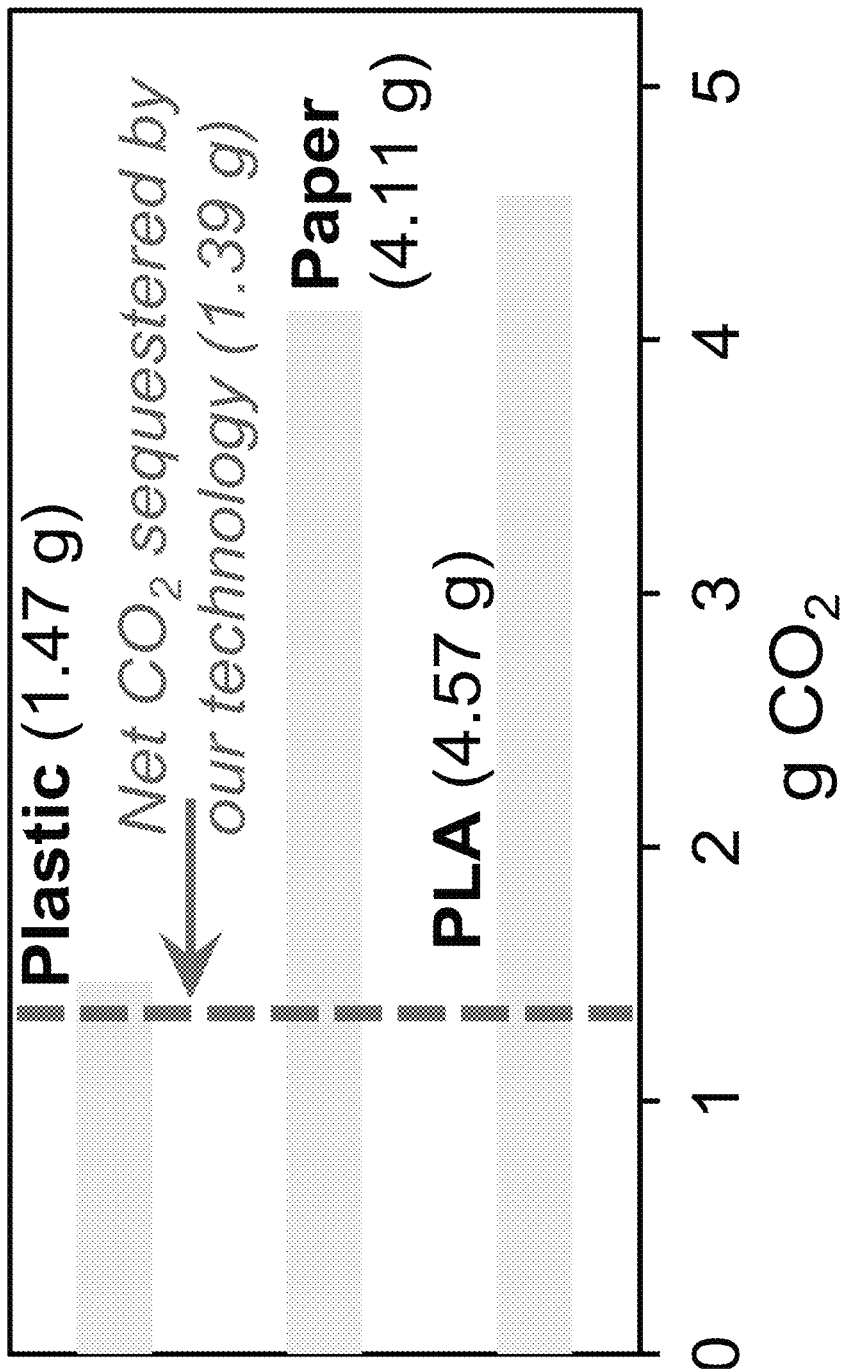
FIG. 1 shows carbon dioxide ($CO_2$) production to make a single straw of different materials. The technology disclosed herein uses $CO_2$ to fuel the growth of seaweed.

In general, the terms and phrases used herein have their art-recognized meaning, which can be found by reference to standard texts, journal references and contexts known to those skilled in the art. The following definitions are provided to clarify their specific use in the context of the invention.

As used herein, the term "about" means that, with respect to compositions, slight variations from a stated value may be used to achieve substantially the same results as the stated value, or, with respect to properties, slight variations from a stated value are acceptable (i.e., non-detrimental) to the stated value relative to a given property. In circumstances where this definition cannot be applied or is exceedingly difficult to apply, then the term "about" means a 10% deviation (plus or minus) from the stated value. In any event, for any individual number or number in a range, it will be appreciated that some variation in the specific value can be accommodated without loss of significant benefit or without significant detriment. In this regard, such a non-detrimental variation allowed for a given number or range is typically 10% or less of the stated number or range. Also, the disclosure of ranges is intended as a continuous range including every value between the minimum and maximum values recited as well as any ranges that may be formed by such values. Also disclosed herein are any and all ratios (and ranges of any such ratios) that may be formed by dividing a recited numeric value into any other recited numeric value. Accordingly, the skilled person will appreciate that many such ratios, ranges, and ranges of ratios may be unambiguously derived from the numerical values presented herein and in all instances such ratios, ranges, and ranges of ratios represent various embodiments of the present invention.

As used herein, the term "sugar-free" means that the pre-process mixture or article is substantially free of dietary sugars, such as glucose, sucrose and fructose. As used herein, the term "low-sugar" refers to edible compositions, particularly in their post-processing form, that have less than 10% by weight of a dietary sugar, and preferably less than about 5% by weight. In some aspects, articles and pre-process mixtures herein are sugar-free. In some aspects, articles, pellets, and pre-process mixtures herein are low-sugar.

As used here, the percent of components in an article, pellet, or pre-process mixture is the weight percent, unless otherwise specified. Moreover, all weight percent values are based on the total weight of the relevant composition, pre-process mixture, pellet, or article, unless specified otherwise. For example, when a pre-process mixture is disclosed to have 10 wt. % plasticizer, the 10 wt. % is based on the total weight (100 wt. %) of the pre-process mixture including water and other components. Moreover, when "an article, pellet, or pre-process mixture" is disclosed to have a certain amount of a component "as appropriate" or "as the case may be," such terminology means that any of, or all of, the article, pellet, or pre-process mixture can have the specified amount of a given component.

As used herein, the term "edible" refers to an item that may be consumed safely by the consumer, but may or may not be palatable or readily consumed.

As used herein, the term "biopolymer" means a polymer derived from a biological source, such as a plant, fungus, or animal, and includes polysaccharides derived from such sources. A particularly useful source of biopolymer is seaweed, including brown, red, or green algae as well as green yellow or golden algae.

As used herein, the term "biodegradable" refers to an item that is capable of being broken down into innocuous products by the action of living things (such as microorganisms) under typical environmental conditions. In some aspects, an article is biodegradable if it can be broken down to innocuous products, as noted above, within a timeframe of about 3 to about 6 months.

As used herein the term "chitin" is a long polymer of N-acetylglucosamine which is derived from a biological source, such as the exoskeletons of arthropods, such as crustaceans (e.g., crab shell) and insects, or cell walls of fungi. Chitin may occur as a composite in the natural source, e.g., as a composite with calcium carbonate in the shells of crustaceans. Pure chitin rather than composite chitin is presently preferred for use in this disclosure. Chitin is believed to function as a hydrocolloid in the articles, pellets, and pre-process mixtures disclosed herein, but may also serve alternative or additional functions in a pre-process mixture, pellet, and/or article. In some aspects, the chitin has a viscosity average molecular weight (kDa) of 100, 150, 200, 250, 300, 350, 400, 450, 500, 550, 600, 650, 700, 750, 800, 850, 900, 950, or 1000. Each of the foregoing numbers can be preceded by the word "about," "at least," "at least about," "less than," or "less than about," and any of the foregoing numbers can be used singly to describe a single point or an open-ended range, or can be used in combination to describe multiple single points or a close-ended range. For example, in some aspects, the chitin can have a viscosity average molecular weight (kDa) of 250, about 250, 200 to 300, about 300, 750, about 750, 500 to 800, or less than 350.

As used herein, the term "chitosan" is the deacetylated form of chitin generally having randomly distributed beta-(1-4)-linked D-glucosamine and N-acetyl-D-glucosamine. Chitin is typically deacetylated by treatment with a base, such as sodium hydroxide. Commercially available chitosan can be characterized by degree of deacetylation (% DD, typically ranging from 60 to 100%) and viscosity average molecular weight, generally ranging from 3800 to 800,000 daltons). In some aspect, chitosan having viscosity average molecular weight ranging from 50,000 to 400,000 daltons is employed. In some aspects, "low molecular weight chitosan" or "low MW chitosan" is employed and refers to chitosan having a viscosity average molecular weight of 50,000 daltons to 190,000 daltons. Ultra low molecular weight chitosan (e.g., chitin having a molecular weight of 20,000 daltons or less) is not preferred for use in the compositions and methods herein. In some aspects, chitosan having % DD of 75% or higher is employed. In some aspects, chitosan having % DD of 75%-85% is employed.

Chitosan is believed to function as a hydrocolloid in the articles and pre-process mixtures disclosed herein, but may also serve alternative or additional functions in a pre-process mixture, pellet, and/or article.

As used herein, the term "compostable" refers to an item that is capable of being broken down under natural composting conditions into innocuous natural products. Accordingly, a material is referred to as compostable when it can biodegrade in a composting process, and preferably through the action of naturally occurring micro-organisms under naturally occurring composting conditions and do so to a high extent within a specified timeframe. In some aspects, a material that is compostable is degraded under natural (home) composting conditions to an extent of at least about 60%, or at least about 80% or at least about 90%, in less than a year, and, in some aspects, in less than about 6 months.

In some aspects, materials are determined to be "biodegradable" and "compostable" according to the definitions as provided in EN-13432. According to EN-13432, biodegradability is the capacity of a material to be converted into $CO_2$ by the action of micro-organisms. This property may be measured with the laboratory standard test method EN-14046 (also published as ISO 14855: biodegradability under controlled composting conditions). In order to show complete biodegradability, a biodegradation level of at least 90% is reached in 6 months or less.

In some aspects, the pre-process mixtures, pellets, and/or articles described herein also show high disintegrability, i.e., the fragmentation and loss of visibility in the final compost (absence of visible pollution). Disintegration may be measured using a pilot scale composting test (EN 14045), in which specimens of the test material are composted with biowaste for 3 months and the final compost is screened with a 2 mm sieve. The mass of test material residues with dimensions greater than 2 mm should be less than 10% of the original mass of the test material.

As used herein, "continuous" indicates a process which is uninterrupted for its duration, or interrupted, paused or suspended only momentarily relative to the duration of the process. A hot-melt extrusion process is "continuous" when pre-process mixture or pellets are fed into a hot-melt extruder without interruption or without a substantial interruption, or such hot-melt extrusion or pre-process mixture or pellets is not performed in a batch process.

As used herein, the term "carrageenan" refers to a linear sulfated polysaccharide derived, typically by extraction, from certain species of seaweed (e.g., Irish moss). The polysaccharide comprises repeating galactose units. Carrageenan typically functions as a hydrocolloid in aqueous environments. Different classes of carrageenan exist and are defined by the sulfate content. As used herein, the term "kappa-carrageenan" refers to carrageenan having one sulfate group per disaccharide, the term "iota-carrageenan" refers to carrageenan having two sulfate groups per disaccharide, and the term "lambda-carrageenan" refers to carrageenan having three sulfate groups per disaccharide. Carrageenan can contain a mixture of polymers containing on average 1-3 sulfate groups per disaccharide, including the kappa, iota and lambda forms noted above, as well as forms with an intermediate average number of sulfate groups per disaccharide (e.g., between 1 and 2 or between 2 and 3, exclusive). Preferred carrageenan for use herein has on average between 1 and 2, inclusive, sulfate groups per disaccharide. Useful carrageenan is a mixture of kappa-carrageenan and iota-carrageenan. More useful carrageenan comprises kappa-carrageenan with less than 10 wt. % other carrageenans. Most useful carrageenan is kappa-carrageenan.

As used herein, the terms "crosslinker," "cross-linker," "cross-linking agent" or "crosslinking" carry their normal meaning in the art in its broadest sense, as readily used and understood by a person of skill in the polymer or biochemical arts. It typically refers to formation of a covalent or other bond (e.g., hydrogen bond) between two molecules, typically between two oligomers, macromers, or polymers. Bond formation is facilitated by addition of the cross-linker or cross-linking agent. In some aspects, article, pre-process mixture, or pellet comprises an organic cross-linker. In further aspects, the article, pre-process mixture, or pellet comprises an organic acid cross-linker, such as a dicarboxylic acid, tannic acid, malic acid, succinic acid, adipic acid, citric acid, tannic acid, caffeic acid, catechin, or ferulic acid.

As used herein, the term "flowing agent" or "anti-caking agent" refers to anhydrous compounds that prevent particles of dry materials from aggregating and "caking" together. In some aspects, the flowing agent comprises functional properties appropriate for facilitating the flow of a pre-process mixture during processing. In some aspects, the flowing agent comprises a compound or a mixture of compounds that are biocompatible with the pre-process mixture, such as calcium stearate, zinc stearate or a combination thereof.

As used herein, the term "filler" carries its normal meaning in the art in its broadest sense, as readily used and understood by a person of skill in the polymer or biochemical arts. In general, filler is added to formulations herein to improve (or at least not be detrimental) to specific properties, and/or to make the product cheaper. A given filler may provide additional properties to a given formulation. In embodiments herein, fillers can also function as humectants. In embodiments herein, a filler having humectant properties can be supplemented, if desired, with a second humectant. In embodiments herein, a filler lacking sufficient humectant properties can be supplemented with a second humectant. In embodiments herein, a filler without humectant properties can be replaced with a mixture of that filler and a distinct humectant.

As used herein, the term "humectant" refers to a substance that facilitates retention of moisture in a given product (e.g., article or pellet) or composition (e.g., pre-process mixture). Typically, humectants are hygroscopic substances but need not be. Humectants can include organic substances, inorganic substances, or substances with both organic and inorganic features.

As used herein, the term "hydrocolloid" refers to a hydrophilic polymer that swells in an aqueous environment by absorbing water. A hydrocolloid affects the rheology of a composition, typically resulting in increased viscosity. Adding a hydrocolloid to an aqueous composition typically forms a gelled network with the polymer chains of hydrocolloids interacting with other polymer chains of the hydrocolloids directly and/or mediated via water, ions, or combinations thereof. Hydrocolloids can be derived from a number of sources, including plants, animals, or microorganisms, or chemically modified versions thereof. Hydrocolloids can also be prepared synthetically. A hydrocolloid derived from a natural source, such as an animal or plant, whether or not chemically modified, is termed a "hydrocolloid biopolymer" herein. Although it is believed certain components herein function as hydrocolloids, such components, even if categorized as a hydrocolloid, may in fact possess additional or alternative functions, and such components are still considered "hydrocolloids" as defined herein.

As used herein, the term "pre-process mixture" refers to the composition that is molded, extruded, or otherwise formed into an article or pellet. Upon extrusion, rinsing, subsequent drying, or a combination thereof, the amounts of components in the article may differ from the amounts of components in the pre-process mixture as a result of leaching (e.g., leaching of a hydrophilic plasticizer during cross-linking and/or rinsing, thereby resulting in a reduced amount of hydrophilic plasticizer in the article relative to the pre-process mixture) and/or drying (e.g., evaporation or other loss of water content, thereby resulting in a reduced amount of water in the article relative to the pre-process mixture). Typically, the relative weight ratio of certain components in the article to other components in the article is the same as in the pre-process mixture, such as the weight ratio of hydrocolloid(s) to the humectant, and other hydrophobic components (e.g., hydrophobic plasticizer such as glycerol trioctanoate, or hydrophobic additive such as carnauba wax, lignin powder, etc.), whereas the weight ratio of other components (such as water and hydrophilic plasticizer, e.g., glycerol) to other components in the article is different between the pre-process mixture and the article for the reasons described above.

In aspects, the pre-processing mixture is pelletizable, i.e., capable of being formed into pellets, wherein the pellets can then be processed in to the desired article. In aspects, pellets are formed by introducing liquid and solid components of the pre-processing mixture into an extruded and the mixture is extruded into a filament and thereafter cut into pellets of selected size and shape. Cut pellets are preferably dried (e.g., air-dried at room temperature or dried by heating at appropriate temperature, for example, from 50 to 200° C. or 100 to 220 C. In aspects, the pellets have sufficient mechanical stability and shelf-life allowing their future processing into articles. The extrusion step is optionally preceded by a blending step in which one or more components of the pre-processing mixture are mixed together prior to introduction into the extruder. Pellets may be any shape, but conveniently can be cylindrical in shape, with size appropriate for further processing, preferably with dimensions in the range of millimeters. In aspects, pellets have dimensions (diameter, height, length, width or thickness) in the range of 2 mm to 10 mm. In aspects, pellets have dimensions (diameter, height, length, width or thickness) in the range of 2 mm to 5 mm. In aspects, pellets are cylindrical and have diameter in the range of 2 mm to 5 mm and thickness or length in the range of 2 mm to 10 mm.

Typically, in aspects where the pre-process mixture is formed (e.g. cold extruded) into an article that is subjected to a cross-linking bath followed by rinsing and drying, the water content of the dried article is about one-third the water content of the pre-process mixture (e.g., 85-95 wt. % compared to 28-35 wt. %), and the hydrophilic plasticizer (e.g., glycerol) content in the cross-linked and rinsed article is also about one-third of the hydrophilic plasticizer content of the pre-process mixture (e.g., about 25-36 wt. % compared to about 8-12 wt. %). Typically, in aspects where the pre-process mixture is formed (e.g., hot-melt extrusion) into a pellet that is not subjected to a cross-linking bath, rinsing, nor drying, such pellet has the same or substantially similar (e.g., within 10% of the values) composition and amounts thereof of the pre-process mixture. Typically, in aspects where the pellet is formed (e.g., hot-melt extrusion) into an article that is not subjected to a cross-linking bath nor rinsed, and such article is dried, the water content of the dried article typically is the same as, or up to about half of, the water content of the pellet (e.g., 35-50 wt. % water in the pellet versus 25-35 wt. % water in the dried article), and other components of the article (e.g., hydrophilic plasticizer, hydrophobic plasticizer, filler, hydrophobic additive, etc.) are the same as in the pellet.

In aspects, particularly for pre-processing mixtures containing carrageenan, no cross-linking agent is added to or contained in the pre-processing mixture and cross-linking associated with such a cross-linking agent does not occur during processing to form pellets or articles. In such aspects where no cross-linking agent is present in the pre-processing mixture, the pellets or article formed is not subjected to a cross-linking bath.

In aspects, articles formed, such as straws, by any process described herein are optionally dried after formation, e.g., air dried at room temperature or dried by heating to an appropriate temperature (e.g., 50 to 150° C.) for a selected time such that the article retains desired shape and properties.

As used herein, the term "hydrophobic" in relation to a plasticizer or additive means a compound having a hydrophobic character, which typically includes compounds that comprise alkyl, ester, or aryl groups, and typically have little to no polar groups present, such as hydroxyl or amino functionalities. By way of example, alkylated compounds, esterified compounds, waxes, oils, polymers containing alkyl, ester, and/or aryl groups, and other similar compounds are hydrophobic.

Hydrophobic additives include hydrophobic plasticizers. In aspects, the pre-process mixtures, pellets or articles do not contain hydrophobic additives other than hydrophobic plasticizers. Hydrophobic plasticizers or additives are water-insoluble or only slightly water-soluble as is understood in the art. Examples of hydrophobic plasticizers include among others, citrate esters, phthalate esters, adipate esters, and glycerol esters, including alkyl esters and esters of fatty acids. Examples of hydrophobic additives include among others palm stearin, carnauba wax, zein, and lignin.

In aspects, the pre-process mixtures, pellets or articles do not contain hydrophobic additives other than hydrophobic plasticizers selected from citrate esters, phthalate esters, adipate esters, and glycerol esters, including alkyl esters and esters of fatty acids. In aspects, the pre-process mixtures, pellets or articles do not contain hydrophobic additives other than hydrophobic plasticizers selected from citrate esters, phthalate esters, adipate esters, and glycerol esters, including alkyl esters and esters of fatty acids wherein the ester groups have 6 to 20 carbon atoms, or wherein the ester groups have 8 to 18 or 8 to 12 carbon atoms. In aspects, the pre-process mixtures, pellets or articles do not contain hydrophobic additives which are flow agents other than hydrophobic plasticizer. In aspects, the pre-process mixtures, pellets or articles do not contain hydrophobic additives which are flow agents other than hydrophobic plasticizers selected from citrate esters, phthalate esters, adipate esters, and glycerol esters, including alkyl esters and esters of fatty acids. In aspects, the pre-process mixtures, pellets or articles do not contain hydrophobic additives other than hydrophobic plasticizers selected from citrate esters, phthalate esters, adipate esters, and glycerol esters, including alkyl esters and esters of fatty acids wherein the ester groups have 6 to 20 carbon atoms, or wherein the ester groups have 8 to 18 or 8 to 12 carbon atoms. In aspects, the pre-process mixtures, pellets or articles contain hydrophobic plasticizers, such as those selected from citrate esters, phthalate esters, adipate esters, and glycerol esters, including alkyl esters and esters of fatty acids wherein the ester groups have 6 to 20 carbon atoms, or wherein the ester groups have 8 to 18 or 8 to 12 carbon atoms, but do not contain flow agents, such as stearate salts, and particularly do not contain calcium and/or zinc stearate.

As used herein, the term "hydrophilic" in relation to a plasticizer or additive means a compound having a hydrophilic character, which typically includes compounds that comprise polar groups, such as hydroxyl and/or amino functionalities. By way of example, compounds such as glycerol, sugar alcohols, and similar compounds are hydrophilic. Hydrophilic plasticizer or additive includes plasticizers or additives that are water-soluble as is understood in the art.

The terms "glycerin" and "glycerol" are used interchangeably herein and refer to the same chemical compound.

The term "composition" is used herein in some aspects to refer to a pre-process mixture, and in some aspects to refer to an article or pellet, as will be clear from context.

While certain components of a pre-process mixture, pellet, or article are described herein as having a given function (e.g., hydrocolloid, plasticizer, etc.), such components may in reality serve entirely different functions or multiple functions. As a result, the functions of a given component are described as currently understood, but such functions are a working theory.

When disclosing numerical values herein, for example, 1, 2, 3, 4, 5, 6, 7, 8, 9, 10, the following sentence typically follows such numerical values: "Each of the foregoing numbers can be preceded by the term 'about,' 'at least,' 'at least about,' 'less than,' or 'less than about,' and any of the foregoing numbers can be used singly to describe a single point or an open-ended range, or can be used in combination to describe multiple single points or a close-ended range." This sentence means that each of the aforementioned numbers can be used alone (e.g., 4), can be prefaced with the word "about" (e.g., about 8), prefaced with the phrase "at least about" (e.g., at least about 2), prefaced with the phrase "at least" (e.g., at least 10), prefaced with the phrase "less than" (e.g., less than 1), prefaced with the phrase "less than about" (e.g., less than about 7), or used in any combination with or without any of the prefatory words or phrases to define a range (e.g., 2 to 9, about 1 to 4, at least 3, 8 to about 9, 8 to less than 10, about 1 to about 10, and so on). Moreover, when a range is described as "about X or less," this phrase is the same as a range that is a combination of "about X" and "less than about X" in the alternative. For example, "about 10 or less" is the same as "about 10, or less than about 10." Such interchangeable range descriptions are contemplated herein. Other range formats may be disclosed herein, but the difference in formats should not be construed to imply that there is a difference in substance.

In an aspect, a composition or compound disclosed herein, such as a hydrocolloid or plasticizer, is isolated or substantially purified. In an aspect, an isolated or purified compound is at least partially isolated or substantially purified as would be understood in the art. In an embodiment, a substantially purified composition, compound or formulation of the invention has a chemical purity of 95%, optionally for some applications 99%, optionally for some applications 99.9%, optionally for some applications 99.99%, and optionally for some applications 99.999% pure.

In the following description, numerous specific details of the compositions, pre-process mixtures, pellets, articles made therefrom, and methods of the present invention are set forth to provide a thorough explanation of the precise nature of the invention. It will be apparent, however, to those of skill in the art that the invention can be practiced without these specific details.

In some aspects, the pre-process mixtures, pellets, and articles described herein comprise at least one hydrocolloid, such as alginate, at least one plasticizer, such as glycerol, and at least one humectant, such as aluminum hydroxide or hydrates thereof. In some aspects, the pre-process mixtures, pellets, and articles described herein comprise at least one hydrocolloid, such as kappa-carrageenan, at least one plasticizer, such as glycerol and/or glycerol trioctanoate, and at least one filler, such as calcium carbonate or hydrates thereof and/or MCC. The pre-process mixtures, pellets, and articles, such as a vessel, cup, utensil, or straw, may further comprise additional optional ingredients including one or more of sugar or non-sugar sweeteners, flavoring agents, coloring agents, active ingredients, plasticizers, humectants, hydrocolloids, edible oils, fillers (e.g., organic or inorganic), hydrophobic additives, cross-linking agents (e.g., inorganic or ionic), and natural preservatives. The article may also be coated with an edible coating to enhance waterproofing, improve shelf life, and/or reduce the stickiness of the article, or to provide flavor, color or graphics to the article. The articles may hold or be in contact with liquids (hot or cold) for an extended period of time, in some aspects more than about one hour (e.g., more than about 2 hours, more than about 3 hours, more than about 4 hours, or more than about 5 hours). In specific aspects, particularly those pre-processing mixtures or articles made therefrom that contain carrageenan or more specifically that contain kappa-carrageenan, In some aspects, disclosed is a process for the production of the pre-process mixtures, pellets, and the articles. In one aspect, the process comprises introducing a pre-process mixture comprising the hydrocolloid (e.g., alginate and/or kappa-carrageenan), water, plasticizer, and humectant, and optional additional ingredients, into a mold comprising at least an inner form and one or more outer forms, allowing the hydrocolloid to set, removing an outer mold form, dehydrating the hydrocolloid while on the inner mold form, and removing the article from the inner mold form. In another aspect, a pre-process mixture comprising the hydrocolloid, plasticizer, humectant, water and optional additional ingredients is extruded to provide the article, followed by optional cross-linking. In some aspects, two hydrocolloids (e.g., one or more alginates, kappa-carrageenan, and chitosan) are mixed together as powders, and the powder mixture is added to one or more plasticizers (e.g., glycerol and glycerol trioctanoate), followed by addition of a humectant (e.g., aluminum hydroxide or a hydrate thereof) or filler (e.g., calcium carbonate and/or MCC). In some aspects, such a mixture is mixed, then water is added to make a dough, the dough is hot blended, and then cooled to below 50° C., where additional optional ingredients can be added (e.g., flavor, color, or both). In some aspects, such mixture is then extruded (e.g., hot or cold), cross-linked, rinsed, and dried.

In some aspects, disclosed is a process for the production of the edible and/or biodegradable articles or pellets, particularly those articles comprising kappa-carrageenan. In some aspects, the process comprises compounding a pre-process mixture into pellets in a continuous process using a twin-screw hot-melt extruder at temperatures ranging between 85° C. to 100° C. and at a screw speed ranging from 200-300 rpm, with a feeding ratio of solids to liquids ranging anywhere between 1:1 to 1:4. In some aspects, the pellets are processed on conventional machinery, including an extruder and/or injection molding machine, into a desired form, such as an article or straw. In some aspects, the pellets are extruded into articles such as straws using a single screw extruder. In some aspects, the pellets are extruded into articles such as straws using a single screw extruder with a general purpose screw and a tubular die. In some aspects, the general-purpose screw has a 3 to 1 compression ratio, and the extrusion is performed at temperatures ranging between 75° C. to 95° C. and screw speeds ranging from 5 to 50 rpm. In some aspects, the resulting articles, such as straws, are air-cooled and cut to length.

Articles

In some aspects, the article disclosed herein that is produced from the pre-process mixture or pellet can be any suitable article. For example, in some aspects, the article is a vessel, a cup, a lid, drinkware, dishware, or a utensil. In some aspects, the utensil is a straw (e.g., drinking straw), fork, knife, spook, chopstick, toothpick, or stirrer (e.g., drink stirrer). In some aspects, the lid is a lid for a cup, a lid for a container, a lid for a plate, a lid for a dish, or an insulated lid thereof. In some aspects, the article can be any suitable article that comes into contact with food or drink and facilitates preparing, consuming, serving, presenting, or storing the food or drink. In some aspects, the article is edible, derived from plants or animals (i.e., bio-based), biodegradable, compostable, or any combination thereof. In some aspects, the article is a wound dressing. In some aspects, the article is not intended to come into contact with food or drink, e.g., a container for storing items, which container provides a sturdy yet biodegradable alternative to plastic or foam storage containers.

In some aspects, the article is a drinking straw or drink stirrer. In some aspects, the drinking straw or stirrer also is suitable for use in consuming or stirring either cold or hot beverages over an extended periods of time without substantially reducing functionality, preferably over an hour or more. In some aspects, the drinking straw or stirrer may have any configuration, such as a cylindrical drinking straw or stirrer, a spoon straw or stirrer, a cocktail straw or stirrer, a bubble tea straw, or the like. In some aspects, the straw or stirrer may have an inner diameter from about 2 mm to about 15 mm, or from about 3 mm to about 10 mm, or smaller such as from about 0.5 mm to about 1.5 mm particularly for stirrers. In some aspects, the stirrer is hollow. In some aspects, the stirrer is not hollow.

In some aspects, in addition to cups, straws, and stirrers, the article may be in the form of other containers, lids, utensils, and other table top containers using the same ingredients. In some aspects, the article comprises drinkware such as teacups, mugs, stemware, shot glasses, cocktail glasses, lowballs, and highballs; flatware such as spoons, knives, forks, and utensils; tableware such as plates, saucers, and bowls; serving ware such as platters, serving bowls, pitchers, and jugs.

In some aspects, the article comprises an edible shell or cup used to contain a food filling. In some aspects, the edible films, skins and shells may be used to form candy, pastas such as ravioli, dumplings, wontons, mochi, and tortilla skins used to wrap or encase food fillings such as syrups, jellies, ganaches, chocolate, meat, vegetable, cheese, fruit, nut, ice cream, paste, peanut butter, syrup, sugar, and candy. In some aspects, the edible food shells or cups used to hold or encase food fillings may also be frozen to hold frozen ingredients such as ice cream. In some aspects, the edible material may comprise of an iced casing used to hold flavorings for infusing drinks.

In some aspects, the article is an edible and/or biodegradable film, coating, or packaging. In some aspects, the article is a film, coating, or packaging for containing a concentrate (e.g., a powder) to be dropped into water or a water-based liquid and mixed to dissolve the film, coating, or packaging and release the contents, thereby producing a drink, soup, or other consumable liquid, or to produce a liquid for topical application (e.g., a lotion, soap, shampoo, or conditioner). In some aspects, the article is a water soluble film, coating, or packaging, e.g., for dishwasher tabs.

In some aspects, the article is edible clothing for use, e.g., in the intimacy industry, such as edible lingerie, edible underwear, edible accessories and toys. In some aspects, the concentration of the ingredients used for making the edible material may be adjusted by weight to produce a softer, more pliable material or a harder, more rigid material, optionally including desirable flavoring and/or coloring agents.

In some aspects, the articles disclosed herein are not in the form of a sausage casing or food packaging film.

In some aspects, the article may have any suitable properties. For example, an article an article (e.g., drinking straw or drink stirrer) has a tensile strength (MPa) ranging from 5-50 MPa or 10-50 MPa. In aspects, an article has tensile strength of 10-30 MPa. In certain aspects, an article (e.g., drinking straw or drink stirrer) has a tensile strength (MPa) of 10, 12, 14, 16, 18, 20, 22, 24, 26, 28, 30, 32, 34, 36, 38, 40, 42, 44, 46, 48 or 50. In certain aspects, an article (e.g., drinking straw or drink stirrer) has a tensile strength (MPa) of 5, 6, 8, 10, 12, 14, 16, 18, 20, 22, 24, 26, 28, or 30. Each of the foregoing numbers can be preceded by the word "about," "at least," "at least about," "less than," or "less than about," and any of the foregoing numbers can be used singly to describe a single point or an open-ended range, or can be used in combination to describe multiple single points or a close-ended range. For example, in some aspects, the tensile strength of an article (e.g., straw or stirrer) is about 10 to about 30, about 8 to about 24, about 18 to about 28, at least about 14, at least 16, or at least 18. Tensile strength can be measured by any art-recognized method particularly as applied to plastic sheets. For example, tensile strength can be measured based on ASTM D882-12 (2012) with a testing machine (4443; Instron, Nerwood, MA, USA) with an initial gap of 25 mm.

In some aspects, the article may have any suitable properties. For example, an article (e.g., drinking straw or drink stirrer) has a Young's modulus (MPa) of 40-500 MPa or 50-500 MPa. In aspects, an article has Young's modulus of 40-300 MPa. In certain aspects, an article (e.g., drinking straw or drink stirrer) has a Young's modulus (MPa) of 40, 45, 50, 55, 60, 65, 70, 75, 80, 85, 90, 95, 100, 110, 120, 130, 140, 150, 160, 170, 180, 190, 200, 210, 220, 230, 240, 250, 260, 270, 280, 290 or 300. Each of the foregoing numbers can be preceded by the word "about," "at least," "at least about," "less than," or "less than about," and any of the foregoing numbers can be used singly to describe a single point or an open-ended range, or can be used in combination to describe multiple single points or a close-ended range. For example, in some aspects, the Young's modulus of an article (e.g., straw or stirrer) is about 40 to about 270, about 50 to about 250, about 140 to about 240, about 170 to about 210, at least about 150, at least 180, at least 190, at least 200, at least 210, about 150 to 230, or less than about 260. Young's modulus can be measured by any art-recognized method particularly as applied to plastic sheets. For example, the Young's modulus can be derived from strain-stress curves obtained according to ASTM D882-12 (2012) with a testing machine (4443; Instron, Nerwood, MA, USA) with an initial gap of 25 mm.

In some aspects, the article may have any suitable properties. For example, an article (e.g., drinking straw or drink stirrer) has a compressive strength (MPa) of 5, 6, 7, 8, 9, 10, 11, 12, 13, 14, 15, 16, 17, 18, 19, 20, 21, 22, 23, 24, 25, 26, or 27. Each of the foregoing numbers can be preceded by the word "about," "at least," "at least about," "less than," or "less than about," and any of the foregoing numbers can be used singly to describe a single point or an open-ended range, or can be used in combination to describe multiple single points or a close-ended range. For example, in some aspects, the compressive strength of an article (e.g., straw or stirrer) is about 5 to about 27, about 10 to about 25, about 8 to about 12, about 6 to about 20, or at least about 7. Compressive strength can be measured by any art-recognized method particularly as applied to plastic sheets. For example, the compressive strength can be measured based on ASTM D695-15 (2018) and ASTM D2412-11 (2018) using a tensile strength testing machine (4443; Instron, Norwood, MA, USA). In this assay, both the axial and radial configuration for compression was tested, compression speed test of 10 mm/min was used for the axial configuration using samples with length/diameter ratio of 2, and a compression speed test of 1 mm/min was used for the radial configuration with a length/diameter ratio greater than 8.

In some aspects, the article may have any suitable properties. For example, an article (e.g., drinking straw or drink stirrer) has a force at break (psi) of 50, 60, 80, 90, 100, 120, 140, 160, 180, 200, 220, 24, 260, 280, 300, 320, 340, 360, 380, 400, 420, 440, 480, or 500. Each of the foregoing numbers can be preceded by the word "about," "at least," "at least about," "less than," or "less than about," and any of the foregoing numbers can be used singly to describe a single point or an open-ended range, or can be used in combination to describe multiple single points or a close-ended range. For example, in some aspects, the force at break (psi) is 100 to 500, 120 to 440, 200 to 360, 140 to 320, 180 to 240, or 160 to 280. The force at break (psi) of an article is measured based on ASTM D882-12 (2012) using a Universal Tester (34SC-1, Instron, Norwood, MA, USA) equipped with 1 kN load cell) and initial gap of 25 mm.

In some aspects, the article may have any suitable properties. For example, an article (e.g., drinking straw or drink stirrer) has an elongation at break (%) of 0.4, 1, 2, 4, 6, 8, 10, 20, 30, 40, 50, 60, 70, 80, 90, 100, 120, 140, 160, 180, 200, 220, 240, 260, 280, 300, 320, 340, 360, or 380. Each of the foregoing numbers can be preceded by the word "about," "at least," "at least about," "less than," or "less than about," and any of the foregoing numbers can be used singly to describe a single point or an open-ended range, or can be used in combination to describe multiple single points or a close-ended range. For example, in some aspects, the elongation at break (%) is 0.4 to 320, 1 to 300, 1 to 20, 20 to 60, 20 to 100, 80 to 220, 100 to 340, 140 to 340, 180 to 360, 180 to 320, 200 to 320, or 80 to 260. The elongation at break (%) of an article is measured using a Universal Tester (34-SC-1, Instron, Norwood, MA, USA) equipped with 1 kN load cell and initial gap of 25 mm. Elongation at break was determined according to the formula: %=(final gage length–initial gage length)/initial gage length*100.

In some aspects, different articles can have different target mechanical properties, such as flexibility, compressibility, tensile strength, Young's modulus, compressive strength, or any combination thereof, depending on the identity or intended use of a given article. For example, drinking straws typically are flexible, even though they need not be, but in any event consumers generally expect straws to have a certain level of flexibility, even if such flexibility is not generally required for a straw to function properly (e.g., to drink a liquid from a cup). In contrast, utensils such as forks, knives, and spoons typically need not be flexible, even though they may be, but instead more rigid properties are suitable for such utensils given their intended use of cutting and/or supporting food. In some aspects, the mechanical properties, or swelling properties disclosed elsewhere herein, can be improved and/or affected by the formulation components and amounts thereof.

In some aspects, the article may have any suitable properties. For example, an article (e.g., drinking straw or drink stirrer) is stable in room temperature water, as measured by a swelling of between about 0% and about 65%, or between about 0% and about 50%, or between about 0% and about 40%, or between about 0% about 30%, or between about 0% and about 20%, or between about 0% and about 10%, in which a piece of the article is immersed in room temperature water and recording the weight change after 1 hour. The swelling percentage is the percent increase in the article's weight due to absorbing water. In aspects, an article, has swelling in room temperature water of less than 60%. In aspects, an article, has swelling in room temperature water of less than 50%. In aspects, an article, has swelling in room temperature water of less than 30%.

In some aspects, the article may have any suitable properties. For example, a pellet or an article (e.g., drinking straw or drink stirrer) exhibits less than 30% shrinkage during processing to form the pellet or article, where shrinkage is measured by any method known and accepted in the art. In aspects, shrinkage percentages are measured. In aspects, shrinkage percentages are calculated by comparing the wt. % of the pre-processing mixture before processing with the respective wt. % of the pellets and/or articles post-processing, after drying. In aspects, shrinkage percentages are within the range of 3 to 30%. In aspects, shrinkage percentages are less than 3% or between 3 to 5%. Formulations that exhibit minimal shrinkage are preferred. In aspects, compositions exhibiting shrinkage percentages on formation of pellets or articles less than 30% are useful. In aspects, compositions exhibiting shrinkage percentages for pellets or articles ranging from 3 to 30%, 3 to 20%, or 3 to 10% are useful. In aspects, compositions herein exhibit shrinkage percentages on formation of pellets or articles of 1, 3, 5, 7, 9, 10, 12, 14, 16, 18, 20, 22, 25, 27 or 30.

In some aspects, the article may have any suitable properties. For example, an article (e.g., drinking straw or drink stirrer) is stable in cold, non-alcoholic beverages, exhibiting swelling of between about 0% and about 65%, or between about 0% and about 50%, or between about 0% and about 40%, or between about 0% about 30%, or between about 0% and about 20%, or between about 0% and about 10%, in which a piece of the article is immersed in a cold, non-alcoholic beverage and recording the weight change after 1 hour. The swelling percentage is the percent increase in the article's weight due to absorbing water.

In some aspects, the article may have any suitable properties. For example, an article (e.g., drinking straw or drink stirrer) is stable in cold, alcoholic beverages having about 20 vol. % alcohol, exhibiting swelling of between about 0% and about 65%, or between about 0% and about 50%, or between about 0% and about 40%, or between about 0% about 30%, or between about 0% and about 20%, or between about 0% and about 10%, in which a piece of the article is immersed in a cold, alcoholic beverage and recording the weight change after 1 hour. The swelling percentage is the percent increase in the article's weight due to absorbing water.

In some aspects, the article may have any suitable properties. For example, an article (e.g., drinking straw or drink stirrer) is stable in cold carbonated beverages, exhibiting swelling of between about 0% and about 65%, or between about 0% and about 50%, or between about 0% and about 40%, or between about 0% about 30%, or between about 0% and about 20%, or between about 0% and about 10%, in which a piece of the article is immersed in a cold carbonated beverage and recording the weight change after 1 hour. The swelling percentage is the percent increase in the article's weight due to absorbing water.

In some aspects, swelling can be mitigated, e.g., reduced or prevented, by increasing the cross-linking density.

In some aspects, the article may have any suitable properties. For example, an article (e.g., drinking straw or drink stirrer) exhibits a material transfer to liquid of between about 0 and about 1 formazin nephelometric units (FNU), as measured by soaking thirty articles (e.g., straws) in 1 L of room temperature water for 24 hours and the turbidity measured and the FNU determined.

In some aspects, the article maintains suitable flexibility, moisture-barrier properties, and structural integrity over an extended period of time at room temperature and 50% relative humidity without any packaging (e.g., packaging with moisture and/or air barrier properties). In some aspects, the "extended period of time" is the shelf-life of the article. In some aspects, the "extended period of time" is 10, 12, 14, 16, 18, 20, 22, 24, 26, 28, 30, 32, 34, 36, 38, 40, 42, 44, 46, 48, 50, 52, 54, 56, 58, 60, 65, 70, 75, 80, 85, 90, 95, 100, 105, 110, 115, 120, 125, 130, 135, 140, 145, 150, 160, 170, 180, 190, 200, 210, 220, 230, 240, 250, 260, 270, 280, 290, 300, 310, 320, 330, 340, 350, 360, 365, 370, 380, 390, 400, 450, 500, 550, 600, 650, 700, 750, 800, 950, or 1000 days. Each of the foregoing numbers can be preceded by the word "about," "at least," "at least about," "less than," or "less than about," and any of the foregoing numbers can be used singly to describe a single point or an open-ended range, or can be used in combination to describe multiple single points or a close-ended range. For example, in some aspects, the extended period of time (days) is at least 10, at least 20, at least 26, at least 28, at least 30, at least 32, at least 40, 20 to 40, about 24 to about 36, 28 to 60, at least 150, 30 to 150, 30 to 120, 120 to 365, 150 to 365, 30 to 1000, or 24 to 48. In some aspects, the article does not exhibit any change in mechanical properties (e.g., one or more of tensile strength, Young's modulus, compressive strength, or swelling in room temperature water) when the article is maintained at room temperature and 50% relative humidity for the extended period of time.

In some aspects, the article has a neutral smell. In some aspects, the article has a neutral taste. In some aspects, the article has a neutral smell and a neutral taste. In some aspects, neutral smell and/or taste is achieved without the addition of any fragrance and/or flavor. In some aspects, whether an article has a neutral smell and/or taste is determined by surveying a panel of unbiased panelists (i.e., panelists having no stake in the outcome of the smell/taste assessment).

In some aspects, the pre-process mixtures and/or articles do not include a plurality of pores. In some aspects, the pre-process mixtures and/or articles do not include a plurality of pores that are sized and structured in such a manner to allow permeation or infiltration of water or bacteria into the pores to promote biodegradability. In some aspects, the pre-process mixtures and/or articles do not include pores having a size of about 500 nm in diameter or less. In some aspects, the pre-process mixtures and/or articles do not have a density of about 0.6 to about 1.3 g/cm$^3$. In some aspects, the pre-process mixtures and/or articles do not have a porosity of at least 10%, at least 15%, at least 20%, at least 25%, or at least 30%.

Pellets

In some aspects, the pre-process mixture can first be formed (e.g., compounded) into pellets. In some aspects, the pellets are then used to form the article, such as a drinking straw. In some aspects, the pre-process mixtures are compounded into pellets using a twin-screw hot-melt extruder at temperatures ranging between 70-100° C. (e.g., 85-100° C.). In some aspects, the screw speed is 150 to 450 rpm (e.g., 200-300 rpm), as described elsewhere herein. In some aspects, the feeding weight ratio of solids to liquids ranges between 1:1 to 1:6, e.g., 1:1, 1:1.5, 1:2, 1:2.5, 1:3, 1:3.5, 1:4, 1:4.5, 1:5, 1:5.5, or 1:6, as described elsewhere herein. Each of the foregoing ratios can be preceded by the word "about," "at least," "at least about," "less than," or "less than about," and any of the foregoing ratios can be used singly to describe a single point or an open-ended range, or can be used in combination to describe multiple single points or a close-ended range. For example, in some aspects, the feeding weight ratio of solids to liquids is 1:1 to 1:4, about 1:1.5 to 1:5.5, or 1:3 to 1:4.5.

In some aspects, the composition of the pellets is the same as the composition of the pre-process mixture used to prepare the pellets. In particular, in some aspects, a pellet contains the same components in the same amounts (e.g., and in the same ratios) as in the pre-process mixture used to prepare the pellet. In some aspects, the pellet contains the same relative amounts (e.g., same ratios) of each component as in the pre-process mixture used to prepare the pellet, except that, in some aspects, the moisture content of the pellet is less than in the precursor pre-process mixture as a result of drying (either active or passive drying). Any amount disclosed herein for any component for a pre-process mixture is applicable to the amount of the same component in a pellet.

In some aspects, the composition of the pellets is the same as the composition of an article made therefrom. In particular, in some aspects, a pellet contains the same components in the same amounts (e.g., and in the same ratios) as in an article prepared from the pellet. In some aspects, the pellet contains the same relative amounts (e.g., same ratios) of each component as in the article made from the pellet, except that, in some aspects, the moisture content of the article is less than in the pellet used to make the article as a result of drying (either active or passive drying). Any amount disclosed herein for any component for an article is applicable to the amount of the same component in a pellet.

In some aspects, the moisture content of the pellets can be any suitable amount. In some aspects, the moisture content of the pellets is the same or substantially the same (e.g., within 5 wt. % or 10 wt. %) of the pre-process mixture used to form the pellets. In some aspects, the moisture content (wt. %) of the pellets is 30, 32, 34, 35, 36, 38, 40, 42, 44, 46, 48, 50, 52, 54, 55, 56, 58, or 60. Each of the foregoing numbers can be preceded by the word "about," "at least," "at least about," "less than," or "less than about," and any of the foregoing numbers can be used singly to describe a single point or an open-ended range, or can be used in combination to describe multiple single points or a close-ended range. For example, in some aspects, the moisture content (wt. %) is 30-55, 35-50, 28-52, at least 30, or less than 60.

In some aspects, the pellets are packaged in packaging with moisture and/or air (e.g., oxygen) barrier properties. In some aspects, the pellets are not packaged in such packaging. In some aspects, the pellets are shipped or otherwise transported to another location where the pellets are formed into an article (e.g., via hot-melt extrusion), as described elsewhere herein. In some aspects, the pellets are not transported to a separate location and instead are formed into an article in the same location where the pellets are produced.

In some aspects, the pellets can be in any suitable form. In some aspects, the pellets are in the form of plugs, spheres, cubes, dollops, crumbles, or any combination thereof, or any other discrete shape or combinations of discrete shapes that are conducive to further processing the pellet into a desired article (e.g., via hot-melt extrusion, e.g., in a single screw extruder with a general-purpose screw and a tubular die when making an article that is a straw). In some aspects, the weight of a single pellet ranges from 0.05 to 0.2 g. In some aspects, the dimensions of a single pellet ranges from 1-10 mm or 2 to 10 mm or 2 to 5 mm. In some aspects, the diameter of a pellet ranges from 1-10 mm, 2 to 10 mm or 2 to 5 mm. In some aspects, the average dimensions of pellets exhibit a narrow size distribution, such that the pellets are generally uniform in size. In aspects, the pellets are generally uniform in shape. In a specific aspect, the pellets are cylindrical in shape with a narrow size distribution.

Hydrocolloid

The edible, bio-based, and/or biodegradable material disclosed herein comprises one or more hydrocolloids. The hydrocolloids are polysaccharides that generally can gel when combined with water. Many hydrocolloids can change their physical behavior and characteristics with the addition or elimination of heat and have the ability to thicken and form gels at low concentrations. Hydrocolloids include alginate, agar, chitosan, chitin, pectin, carrageenan (e.g., kappa, iota, lambda, or a combination thereof, particularly kappa-carrageenan and/or iota-carrageenan), a natural gum, gelatin, starch, modified starch, pregelatinized starch, corn starch, gellan gum, guar gum, gum arabic, isomalt, konjac, lecithin, locust bean gum, maltodextrin, methylcellulose, sodium alginate, xanthan gum, tapioca, and combinations thereof. Hydrocolloids include natural gums, such as gellan gum, guar gum, gum arabic, locust bean gum, konjac gum, and xanthan gum. Such gums can function as binding agents in mixtures herein. The hydrocolloid may be a mixture of the listed hydrocolloids, e.g., alginate and chitosan; alginate and chitin; alginate, chitosan, and chitin; kappa-carrageenan and chitosan; kappa-carrageenan and chitin; kappa-carrageenan, chitin, and chitosan; kappa-carrageenan and alginate; kappa-carrageenan and iota-carrageenan; kappa-carrageenan and konjac gum; kappa-carrageenan, alginate, and iota-carrageenan; kappa-carrageenan, chitosan (and/or chitin), and konjac gum; alginate and agar; agar and chitosan (and/or chitin); alginate, chitosan (and/or chitin), and agar; two different types of alginate; or two different types of alginate plus chitosan (and/or chitin) and optionally guar gum; kappa-carrageenan and two different types of alginate; kappa-carrageenan, two different types of alginate, and chitosan (and/or chitin); kappa-carrageenan and high G block alginate; kappa-carrageenan, high G block alginate, and chitosan (and/or chitin); kappa-carrageenan and locust bean gum; kappa-carrageenan and guar gum. In some aspects, suitable commercially available alginates include Protanal™ GP8223 (a high M block high molecular weight biopolymer having a viscosity of about 600-900 cPs in water) (FMC BioPolymer), Protanal™ RF6650 (a high G block high molecular weight biopolymer having a viscosity of about 400-600 cPs in water) (FMC BioPolymer), or a combination thereof. In some aspects, hydrocolloids have a biological source, such as a bacterial, animal, or plant source (e.g., seaweed, such as kelp). In some aspects, hydrocolloids include agar, carrageenans and alginates, or combinations thereof. In some aspects, the hydrocolloid is a mixture of agar and alginate. In some aspects, the hydrocolloid is a mixture of alginate and chitosan (and/or chitin). In some aspects, the hydrocolloid is a mixture of chitosan (and/or chitin) and two or more alginates. In some aspects, the hydrocolloid is a mixture of kappa-carrageenan and alginate. In some aspects, the hydrocolloid is a mixture of kappa-carrageenan and chitosan (and/or chitin) (e.g., low MW crustacean chitosan and/or chitin). In some aspects, the hydrocolloid is a mixture of kappa-carrageenan and chitin. In some aspects, the hydrocolloid is a mixture of kappa-carrageenan and milled chitin. In some aspects, the chitin is milled chitin. In some aspects, milled chitin has particle size ranging from 50 to 500 micron. In some aspects, the hydrocolloid is a mixture of kappa-carrageenan and chitosan and/or chitin. In some aspects, the chitosan and/or chitin is obtained from crustaceans. In some aspects, the chitosan and/or chitin is obtained from crab shells. In some aspects, the hydrocolloid is a mixture of kappa-carrageenan and konjac gum. In some aspects, the hydrocolloid is a mixture of kappa-carrageenan and iota-carrageenan. In some aspects, the hydrocolloid is a mixture of kappa-carrageenan, chitosan (e.g., low MW crustacean), and guar gum. In some aspects, the hydrocolloid is a mixture of chitosan, two or more alginates, and guar gum. In some aspects, chitosan is employed, and the chitosan is crustacean chitosan, plant-derived chitosan, synthetic chitosan, chemically-modified chitosan, or a combination thereof. In some aspects, the chitosan is crustacean chitosan. In some aspects, the chitosan is a low molecular weight chitosan. In some aspects, the chitosan is a low molecular weight crustacean chitosan. As used herein, "low molecular weight chitosan" or "low MW chitosan" means chitosan having a viscosity average molecular weight of 50,000 g/mol to 190,000 g/mol.

Agar, also referred to as agar-agar, is a hydrocolloid and a natural vegetable counterpart to animal-derived gelatin.

Agar is a flavorless gelling agent derived from a polysaccharide in red algae, where it accumulates in the cell walls. In chemical terms, agar is a polymer made up of subunits of the sugar galactose. The primary source for this substance is *Gracilaria lichenoides*.

Alginates are natural polymers typically derived from seaweed and comprising linear copolymers of d-mannuronic acid and 1-guluronic acid units. Structurally, alginates are linear unbranched polymers containing covalently linked blocks of β(1-4)-linked d-mannuronic acid (M block) and α(1-4)-linked 1-guluronic acid (G block) residues, and may also comprise fractions of alternating guluronic and mannuronic acids (M/G block). Alginates are heterogeneous polymers with different contents of G and M blocks.

Alginates exist widely in brown seaweeds such as species of *ascophyllum, durvillaea, ecklonia, laminaria, lessonia, macrocystis, sargassum*, and *turbinaria*. In some aspects, sodium alginate is employed since it is widely commercially available and is the first by-product of processing the alginate from a seaweed source.

Hydrocolloids, such as alginate, kappa-carrageenan, iota-carrageenan, chitosan, konjac gum, guar gum, locust bean gum, or any other hydrocolloid listed herein, may form ionic cross-links in the presence of various multivalent cations, including divalent cations, e.g. $Ba^{2+}$, $Ca^{2+}$, $Mg^{2+}$, etc., and trivalent cations, e.g., $Al^{3+}$, by cross-linking the carboxylate groups or other electron donating groups or atoms on the hydrocolloid. Suitable cross-linking agents include any component with such multivalent cations (e.g., di-, tri, tetra-valent, etc.), and examples of such suitable cross-linking agents are disclosed elsewhere here.

For pre-process mixtures, pellets, or articles herein comprising alginate, factors that are responsible for the stiffness or flexibility of the alginate gel include the relative M/G ratio of the alginate and the stoichiometry of alginate with the cross-linking $M^{2+}$ cation. Higher G block content produces strong brittle gels, while higher M block content provides a more flexible gel. In some embodiments, and particularly for drinking straws, the alginate may comprise a high G-block alginate, optionally with the addition of some high M/G block alginate, for example, a weight ratio of 100:0 to 70:30 (high G/high M), as discussed below. A high G-block alginate may have a G/M ratio that is greater than 1:2, or greater than about 1:1, or greater than about 2:1, or greater than about 3:1. Typically, a high G-block alginate has a G/M ratio of about between about 1:2 to 4:1. Typically, a high M-block alginate has a G/M ratio of less than 1:2. The alginate may comprise a ratio of G:M/G:M of about 2:1:1 to about 4:1:1, for example about 2:1:1, or about 3:1;1 or about 4:1:1. The alginates used in the pre-process mixture used to produce an article may be a blend of different heterogeneous alginates. In some aspects, a high G block alginate is used in combination with a high M block alginate. In some aspects, the high G/high M weight ratio is 100:0, 95:5, 90:10, 85:15, 80:20, 75:25, 70:30, 65:35, 60:40, 55:45, or 50:50, or any range made therefrom, including 100:0 to 75:25, 95:5 to 75:25, 100:0 to 60:40, 85:15 to 70:30, and so forth. In some aspects, the high G/high M weight ratio can also be expressed in a manner where the high M weight amount set to 1. For example, in some aspects, the weight ratio (X:1) of high G alginate (X) to high M alginate (1) is 1, 1.5, 2, 2.5, 3, 3.5, 4, 4.5, 5, 5.5, 6, 6.5, 7, 7.5, 8, 8.5, 9, 9.5, 10, 11, 12, 13, 14, 15, 16, 17, 18, 19, or 20. Each of the foregoing numbers can be preceded by the word "about," "at least," "at least about," "less than," or "less than about," and any of the foregoing numbers can be used singly to describe a single point or an open-ended range, or can be used in combination to describe multiple single points or a close-ended range. For example, in some aspects, the weight ratio (X:1) of high G alginate to high M alginate is about 1:1 to about 6:1, about 2:1 to about 10:1, about 1:1 to about 20:1, about 3:1 to about 5:1, at least 3:1, less than about 20:1, or at least 4:1.

Species of seaweed that may be used as a source of the alginate and their relative amounts of M-block, M/G block and G-block include those set forth in Table 1:

TABLE 1

| Type of Seaweed | % MM | % MG & GM | % GG |
| --- | --- | --- | --- |
| *Laminaia hyperborean* (stem) | 17 | 26 | 57 |
| *Laminaia hyperborean* (leaf) | 36 | 38 | 26 |
| *Lessonia nigrescens* | 40 | 38 | 22 |
| *Lessonia trabeculata* | 25 | 26 | 49 |
| *Durvillaea antarctica* | 56 | 26 | 18 |

In some aspects, the pre-process mixtures, pellets, and/or articles herein comprise carrageenan, particularly kappa-carrageenan. Carrageenan and its various forms (e.g., kappa-, iota-, and lambda-) is defined elsewhere herein, but generally carrageenans are a group of sulfated polysaccharides comprising repeating galactose units. Carrageenans are generally derived or extracted from red seaweed, including *Chondudrus cripus* (Irish moss), *Eucheuma*, and *Gigartina stellate*. Carrageenans are commercially available, though can be produced directly from the source, such as seaweed, by dissolution in hot (e.g., 70-100° C.) alkaline water, filtering, pH adjusting, followed by further filtration (e.g., ultrafiltration) if desired. Such methods are known in the art.

In some aspects, the pre-process mixtures, pellets, and/or articles herein do not include seaweed from *Eucheuma* sp, *Sargassum* sp, *Turbinaria, Gracilaria*, or any combination thereof.

In some aspects, the article may comprise any suitable amount of hydrocolloid or combination of hydrocolloids. For example, in some aspects, the article comprises a hydrocolloid in an amount (wt. %) of 0, 1, 2, 3, 4, 5, 6, 7, 8, 9, 10, 11, 12, 13, 14, 15, 16, 17, 18, 19, 20, 21, 22, 23, 24, 25, 30, 35, 40, 45, 50, 55, 60, 65, 70, 75, 80, 85, 90, 95, or 98, based on the total weight of the article. Each of the foregoing numbers can be preceded by the word "about," "at least," "at least about," "less than," or "less than about," and any of the foregoing numbers can be used singly to describe a single point or an open-ended range, or can be used in combination to describe multiple single points or a close-ended range. For example, in some aspects, the article comprises hydrocolloid in an amount (wt. %) of about 15 to about 98, 5 to 30, 5 to 35, 20 to about 90, 25 to about 80, 30 to about 65, 45 to about 60, 40 to about 50, 50 to about 60, at least about 5, about 10 to about 20, less than about 25, about 8 to about 15, about 9 to about 17, or about 7 to about 13. Such amounts can refer to a single hydrocolloid present in the article, or to the total amount of hydrocolloid present in the article. Moreover, such amounts refer to the final article after drying (e.g., after extruding, cross-linking, rinsing, and drying, if such processes are employed).

In some aspects, the article can be prepared from a pre-process mixture or pellet comprising any suitable amount of hydrocolloid or combination of hydrocolloids. For example, in some aspects, the pre-process mixture or pellet comprises a hydrocolloid in an amount (wt. %) of 0, 0.5, 1, 1.5, 2, 2.5, 3, 3.5, 4, 4.5, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40, based on the total weight of the pre-process mixture or pellet, as the case may be. Each of the foregoing numbers can be preceded by the word "about," "at least," "at least about," "less than," or "less than about," and any of the foregoing numbers can be used singly to describe a single point or an open-ended range, or can be used in combination to describe multiple single points or a close-ended range. For example, in some aspects, the pre-process mixture or pellet comprises hydrocolloid in an amount (wt. %) of about 5 to about 15, about 6 to about 12, about 4 to about 18, at least about 3, at least about 5, at least about 9, less than about 19, about 10 to about 13, about 10 to about 15, 0 to about 3, 0 to about 5, 0 to about 10, about 10 to about 20, about 10 to about 30, about 5 to 30, 5 to 35, about 10 to about 40, about 15 to about 30, about 15 to about 35, or about 9 to about 21. Such amounts can refer to a single hydrocolloid present in the pre-process mixture, or to the total amount of hydrocolloid present in the pre-process mixture. In aspects where the article is prepared from a pre-process mixture or pellet, and such article is not subjected to a cross-linking bath and/or rinsing, the composition of the pre-process mixture, pellet, and article is the same or substantially the same (e.g., having values within 1%, within 2%, within 4%, within 6%, within 8%, or within 10 wt. %), though drying of the article can affect the moisture content as described elsewhere herein. In any event, the ratios of components (other than water) remain the same or substantially the same (e.g., having values within 1%, within 2%, within 4%, within 6%, within 8%, or within 10 wt.

In some aspects, particularly when the hydrocolloid is or comprises agar, chitosan, gellan-guar-xanthan gum, konjac, alginate, or a combination thereof, the article is made from a pre-process mixture or pellet comprising about 1.5% to about 5% by weight hydrocolloid and about 80% to about 98.5% by weight of water, or from about 85% to about 98% by weight of water, or from about 95% to about 98% by weight of water (water contents are described in more detail below).

In some aspects when the hydrocolloid is or comprises alginate, the article may be made from a pre-process mixture or pellet that comprises from about 0.5 wt. % to about 40 wt. % alginate, or from about 1 wt. % to about 30% alginate, or from about 3 wt. % to about 20 wt. % alginate, or from about 5 wt. % to about 15 wt. % alginate, or from about 7 wt. % to about 13 wt. % alginate, based on the total weight of the pre-process mixture or pellet, as the case may be.

In some aspects when the hydrocolloid is or comprises kappa-carrageenan, the article may be made from a pre-process mixture or pellet that comprises from about 10-20 wt. % kappa-carrageenan, 5-15 wt. % kappa-carrageenan, 10-30 wt. % kappa-carrageenan, 15-30 wt. % kappa-carrageenan, 5-20 wt. % kappa-carrageenan, 8-18 wt. % kappa-carrageenan, 12-22 wt. % kappa-carrageenan, or 15-25 wt. % kappa-carrageenan, based on the total weight of the pre-process mixture or pellet, as the case may be.

In some aspects when the hydrocolloid is or comprises kappa-carrageenan (in any amount disclosed herein), the article may be made from a pre-process mixture or pellet that further comprises chitosan (e.g., low MW crustacean) in an amount of 3-10 wt. %, 0-10 wt. %, 0.5-10 wt. %, 5-15 wt. %, 2-12 wt. %, or 5-10 wt. %, based on the total weight of the pre-process mixture or pellet, as the case may be.

In some aspects when the hydrocolloid is or comprises kappa-carrageenan (in any amount disclosed herein), the article may be made from a pre-process mixture or pellet that further comprises konjac gum in an amount of 0-10 wt. %, 0.5-10 wt. %, 0-5 wt. %, 0.5-5 wt. %, 0-3 wt. %, 0.5-3 wt. %, or 2-10 wt. %, based on the total weight of the pre-process mixture or pellet, as the case may be.

In some aspects when the hydrocolloid is or comprises kappa-carrageenan (in any amount disclosed herein), the article may be made from a pre-process mixture or pellet that further comprises additional hydrocolloid (e.g., alginate, chitosan, iota-carrageenan, guar gum, konjac gum, locust bean gum, etc.) in a combined or individual amount of 0-50 wt. %, 1-50 wt. %, 1-10 wt. %, 0-10 wt. %, 0.5-10 wt. %, 1-15 wt. %, 0-5 wt. %, 0.5-5 wt. %, 0-3 wt. %, 0.5-3 wt. %, 5-15 wt. %, 10-20 wt. %, 3-10 wt. %, or 2-10 wt. %, based on the total weight of the pre-process mixture or pellet, as the case may be.

In some aspects when the hydrocolloid is or comprises kappa-carrageenan (in any amount disclosed herein), the article may be made from a pre-process mixture or pellet that further comprises a filler (e.g., calcium carbonate, MCC, citrus fiber, carboxymethyl cellulose, etc.) in a combined or individual amount of 0-10 wt. %, 0.5-10 wt. %, 0-5 wt. %, 0.5-5 wt. %, 0-3 wt. %, 0.5-3 wt. %, 5-15 wt. %, or 2-10 wt. %, based on the total weight of the pre-process mixture or pellet, as the case may be.

In some aspects when the hydrocolloid is or comprises kappa-carrageenan (in any amount disclosed herein), the article may be made from a pre-process mixture or pellet that further comprises an inorganic cross-linking agent (e.g., zirconium acetate, potassium zirconium carbonate, ammonium zirconium carbonate, alum, etc.) in a combined or individual amount of 0-10 wt. %, 0.5-10 wt. %, 1-8 wt. %, 0-5 wt. %, 0.5-5 wt. %, 0-3 wt. %, 0.5-3 wt. %, or 2-5 wt. %, based on the total weight of the pre-process mixture or pellet, as the case may be.

In some aspects when the hydrocolloid is or comprises kappa-carrageenan (in any amount disclosed herein), the article may be made from a pre-process mixture or pellet that further comprises a hydrophobic additive (e.g., palm stearin, carnauba wax, zein, lignin, etc.) in a combined or individual amount of 0-10 wt. %, 0.5-10 wt. %, 0-5 wt. %, 0.5-5 wt. %, 0-3 wt. %, 0.5-3 wt. %, 1-8 wt. %, 2-5 wt. %, 5-15 wt. %, or 2-10 wt. %, based on the total weight of the pre-process mixture or pellet, as the case may be.

When more than one hydrocolloid is employed, the amounts described herein can refer to each hydrocolloid individually, or to the total amount of hydrocolloid present in the article, pre-process mixture, or pellet.

In some aspects, the pre-process mixtures, pellets, and/or articles herein do not include one or more of pectin, welan gum, starch, modified starch, pregelatinized starch, chitosan oligosaccharide, or any combination thereof.

In some aspects, the pre-process mixtures, pellets, and/or articles herein do not include one or more of polylactic acid (polylactide), chitin, chitosan, hydrolyzed chitosan, alginic acid, sodium alginate, calcium alginate, magnesium alginate, triethanolamine alginate, potassium alginate, strontium alginate, barium alginate, ammonium alginate, propylene glycol alginate, lignin, thermoplastic starch, starch, plant starch, branched starch (e.g., 6-α-maltosyl branched structure, 6-α-maltotetraosyl branched structure, or a combination thereof), polyethylene, polypropylene, polyethylene glycol, polyglycolide, poly (lactide-co-glycolide), polyacrylate, polymethacrylate, poly (δ-caprolactone), polyorthoester, polyanhydride, polylysine, polyethyleneimine, carboxymethylcellulose, acetylated carboxymethylcellulose, gelatin, collagen, pullulan, cold-soluble gelatin, pectin, locust gum derivatives, kappa carrageenan, lambda carrageenan, iota carrageenan, and derivatives, combinations, and copolymers thereof. In some aspects, the pre-process mixtures, pellets, and/or articles herein do not include a hydrocolloid that is or derived from starchy leguminous seed protein.

In some aspects, the pre-process mixtures, pellets, and/or articles herein do not include one or more of n-octenylsuccinic anhydride-modified starch, an exudate gum (arabic, ghatti, karaya, tragacanth), an extract gum (beta-glucans, inulins, konjac, larch), a seed gum (locust bean, guar, psyllium, quince, fenugreek, tara), a vegetable gum (e.g., a hydrolyzed vegetable gum or a low viscosity hydrolyzed vegetable gum), pectins (high methoxy-, low methoxy-, amidated), a microbial gum (xanthan, curdlan, pullulan, gellan, scleroglucan, welan, rhamsan), a modified cellulose (methylcellulose, hydroxypropylcellulose, hydroxypropylmethyl cellulose, sodium carboxymethyl cellulose), a carrageenan (iota, kappa, lambda), a dextrin, dextran, hydrogenated starch hydrolyzate, polydextrose, agar, gelatin (both type A and B, hydrolyzed gelatin), or any combination thereof.

In some aspects, the pre-process mixtures, pellets, and/or articles do not include an insoluble alginate, for example, insoluble alginate particles. In some aspects, the pre-process mixtures, pellets, and/or articles do not include an alginate with a molecular weight of 5,000 to 350,000 g/mol. In some aspects, the pre-process mixtures and/or articles do not include an alginate comprising one or more of calcium, strontium, barium, copper manganese, lead, cobalt, nickel, or any combination thereof.

Water-Based Liquid

The water in the pre-process mixture, pellet, or article may be supplied as pure water or as a water based liquid (e.g., an aqueous mixture or solution). According to some aspects, water such as filtered water, distilled water, purified water, spring water, mineral water, tap water, carbonated water or any combination thereof may be used. Additional water-based liquids that may be alternatively or additionally used include juice, juice concentrate, milk, treacle, tree and cactus waters, alcoholic beverage, energy drinks, caffeinated coffee, decaffeinated coffee, soda, nut milks, coconut milk, flavored milks, flavored waters, teas, tea infusions, hot chocolate, ciders, cold-pressed juices, sports drinks, coconut water, fermented liquids, such as kombucha and kvass, herbal infusions, or any combination thereof.

In some aspects, the article can comprise any suitable amount of water or water-based liquid. For example, in some aspects, the article comprises water in an amount (wt. %) of 0.5, 1, 1.5, 2, 2.5, 3, 3.5, 4, 4.5, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 45, 50, 55, 60, 65, or 70, based on the total weight of the article. Each of the foregoing numbers can be preceded by the word "about," "at least," "at least about," "less than," or "less than about," and any of the foregoing numbers can be used singly to describe a single point or an open-ended range, or can be used in combination to describe multiple single points or a close-ended range. For example, in some aspects, the article comprises water-based liquid in an amount (wt. %) of about 35 to about 70, about 35 to about 65, about 45 to about 65, about 40 to about 55, about 40 to about 50, about 30 to about 35, about 25 to about 40, about 25 to about 35, about 27 to about 35, about 20 to about 40, less than about 50, less than about 38, or at least about 20. Such amounts refer to the article the final article after drying (e.g., after extruding, cross-linking, rinsing, and drying, if such processes are employed); however, if desired, a substantial amount of water can be removed through the drying process. For example, in some aspects, water is substantially removed from the article during dehydration, providing an article having less than 10% by weight of water, or less than about 5% by weight of water, or less than about 1% by weight of water. In some aspects, the article is air-cooled (e.g., when hot-melt extrusion is employed) and/or air-dried, and substantial removal of water is not achieved nor desired. In such aspects, the water content or water-based liquid content of the article is the same or substantially the same (e.g., having values within 1%, within 2%, within 4%, within 6%, within 8%, or within 10 wt. %) as the water content or water-based liquid content of the pre-process mixture or pellet used to prepare the article.

In some aspects, the pre-process mixture or pellet can comprise any suitable amount of water or water-based liquid. For example, in some aspects, the pre-process mixture or pellet comprises water or water-based liquid in an amount (wt. %) of 30, 32, 34, 35, 36, 38, 40, 42, 44, 45, 46, 48, 50, 52, 54, 55, 56, 58, 60, 62, 64, 65, 66, 68, 70, 72, 74, 75, 76, 78, 80, 82, 84, 85, 86, 88, 90, 92, 94, or 95, based on the total weight of the pre-process mixture or pellet, as the case may be. Each of the foregoing numbers can be preceded by the word "about," "at least," "at least about," "less than," or "less than about," and any of the foregoing numbers can be used singly to describe a single point or an open-ended range, or can be used in combination to describe multiple single points or a close-ended range. For example, in some aspects, the pre-process mixture comprises water or water-based liquid in an amount (wt. %) of about 40 to about 60, about 85 to about 90, at least 80, about 35 to about 75, about 35 to about 50, about 35 to about 60, about 30 to about 60, about 40 to about 90, about 44 to about 92, or less than about 80.

When more than one water-based liquid is employed, the amounts described herein can refer to each water-based liquid individually, or to the total amount of water-based liquid.

In some aspects, the addition of certain components is found to improve mechanical properties of articles formed from pre-process mixtures or pellets and to facilitate process steps to form articles. In some aspects, such improved mechanical properties and/or facilitated processing steps are the result of plasticizer; humectant; plasticizer and humectant; filler/strength modifier; plasticizer and filler/strength modifier; hydrophobic additive; plasticizer and hydrophobic additive; kappa-carrageenan; kappa-carrageenan and additional hydrocolloid; filler/strength additive and hydrophobic additive; or any combination thereof.

Plasticizer

In some aspects, the article, pellet, or pre-process mixture comprises one or more plasticizers (e.g., edible plasticizers). In some aspects, and without wishing to be bound by theory, it is believed that the plasticizer modifies the texture and/or viscosity of the hydrocolloid mixture to provide one or more desirable properties, including increased ease of processing, more desirable plastic-like properties (i.e., spring-back), tensile strength, Young's modulus, compressive strength, and so forth, and also to provide a material that can be bitten through and/or chewed. In some aspects, the article, pellet, or pre-process mixture comprises one plasticizer or a combination of two or more plasticizers. In some aspects, a plasticizer is hydrophilic or hydrophobic. In some aspects, a combination of a hydrophilic plasticizer (e.g., glycerol, sorbitol, maltitol) and a hydrophobic plasticizer (e.g., glycerol trioctanoate) is used. Without wishing to be bound by theory, it is believed that inclusion of a hydrophobic plasticizer (and/or hydrophobic additive described elsewhere) helps to prevent leaching of hydrophilic compounds (e.g., glycerol) during the cross-linking and/or rinsing process, if such processes are employed, and also to increases the water-resistance and/or moisture-barrier properties of the article. In some aspects, a given component, for example a plasticizer, may have an additional function in the composition. For example, in certain compositions used in cold extrusion processes herein, hydrophilic plasticizers such as glycerol are believed to serve as a solvent for seaweed-derived biopolymer (alginate or carrageenans) as well as to function as plasticizers. Additionally, in some aspects, certain components are believed to only have a single function in the composition. For example, in certain compositions used in cold extrusion processes herein, hydrophobic plasticizers such as glycerol trioctanoate are believed to serve only as plasticizers (e.g., not as solvents for seaweed-derived polymers, such as alginate or carrageenans).

Suitable plasticizers include an edible oil (e.g., as disclosed elsewhere herein), glycerol, a sugar alcohol such as maltitol, sorbitol or xylitol, microcrystalline cellulose, acacia gum, shellac, genepin, nano emulsions, algae oil, coconut oils, processed shea butter, ester gums, carnauba wax, palm stearin, thermoplastic cellulose ethers (e.g., Ethocell™), zein, citrate esters, phthalate esters, adipate esters, and glycerol esters, including alkyl esters and esters of fatty acids, or mixtures thereof. In some aspects, a functionalized plasticizer (e.g., glycerol, a sugar alcohol, sorbitol, maltitol, xylitol, etc.) is employed, in which one or more of the hydroxyl groups are functionalized with alkyl groups via an ether and/or ester linkage (e.g., alkylated or esterified plasticizer(s)). Suitable groups that can be used to functionalize glycerol include alkyl groups with 1, 2, 3, 4, 5, 6, 7, 8, 9, 10, 11, 12, 13, 14, or 15 carbon atoms. Each of the foregoing numbers can be preceded by the word "about," "at least," "at least about," "less than," or "less than about," and any of the foregoing numbers can be used singly to describe a single point or an open-ended range, or can be used in combination to describe multiple single points or a close-ended range. For example, in some aspects, the number of carbon atoms is 5 to 10, 6 to 9, 4 to 9, at least 4, at least 6, or 8 to 12. In some aspects, suitable functionalized (e.g., hydrophobic) plasticizers include glycerol octanoate (e.g., mono-, di-, trioctanoate, or any combination thereof), octyl glycerol (e.g., mono-, di-, trioctyl glycerol, or any combination thereof), glycerol decanoate (e.g., mono-, di-, tridecanoate, or any combination thereof), sorbitol octanoate (e.g., mono-, di-, tri-, tetra-, penta-, hexaoctanoate, or any combination thereof), and so forth. In some aspects, the hydrophobic plasticizer is or comprises glycerol trioctanoate. As used herein, when a compound is disclosed to have a given number of carbon atoms, only that number or range is intended. In other words, it is not intended that a compound comprise the number of carbon atoms, but rather the compound has that specific number of carbon atoms. For example, if a compound is disclosed to have 5 to 10 carbon atoms, a compound with 15 carbon atoms would fall outside the range of 5 to 10 carbon atoms. Even though technically the 15 carbon atom compound necessarily also has 5 to 10 carbon atoms, it is not intended that the 15 carbon atom compound fall within the range of a compound that has 5 to 10 carbon atoms.

In some aspects, the article comprises one or more plasticizers in any suitable amount. For example, in some aspects, the article comprises one or more plasticizers in an amount (wt. %) of 0, 0.1, 0.2, 0.3, 0.4, 0.5, 0.6, 0.7, 0.8, 0.9, 1, 1.2, 1.4, 1.6, 1.8, 2, 2.2, 2.4, 2.6, 2.8, 3, 3.2, 3.4, 3.6, 3.8, 4, 4.2, 4.4, 4.6, 4.8, 5, 6, 7, 8, 9, 10, 11, 12, 13, 14, 15, 16, 17, 18, 19, 20, 21, 22, 23, 24, 25, 26, 28, 30, 32, 34, 35, 36, 38, 40, 42, 44, 45, 46, 48, 50, 52, 54, or 55, based on the total weight of the article. Each of the foregoing numbers can be preceded by the word "about," "at least," "at least about," "less than," or "less than about," and any of the foregoing numbers can be used singly to describe a single point or an open-ended range, or can be used in combination to describe multiple single points or a close-ended range. For example, in some aspects, the article comprises one or more plasticizers in an amount (wt. %) of about 5 to about 18, 5 to 20, 5 to 30, about 8 to about 10, about 10 to about 20, about 25 to about 45, about 30 to about 42, at least about 6 or less than about 23. When an article is prepared by processes that employ cross-linking baths and/or rinsing, such processes can reduce the amounts of plasticizer in the article as compared to the pre-process mixture or pellet, particularly resulting in leaching of hydrophilic plasticizers (e.g., glycerol, sugar alcohols, etc.). However, the amounts described hereinabove for hydrophobic plasticizers, if present, such as alkylated or esterified plasticizers, generally are as disclosed herein, since such hydrophobic plasticizers are less prone to, or are more resistant to, leaching during such processing steps. In other words, if one or more hydrophobic plasticizers are employed in the pre-process mixture or pellet, such hydrophobic plasticizers generally are not leached in a process that employs cross-linking baths and/or rinsing.

In some aspects, the pre-process mixture or pellet comprises one or more plasticizers in any suitable amount. For example, in some aspects, the pre-process mixture or pellet comprises one or more plasticizers in an amount (wt. %) of 0, 0.1, 0.2, 0.3, 0.4, 0.5, 0.6, 0.7, 0.8, 0.9, 1, 1.5, 2, 2.5, 3, 3.5, 4, 4.5, 5, 5.5, 6, 6.5, 7, 7.5, 8, 8.5, 9, 9.5, 10, 12, 14, 15, 16, 18, 20, 22, 24, 25, 26, 28, 30, 32, 34, 35, 36, 38, 40, 42, 44, or 45, based on the total weight of the pre-process mixture or pellet, as the case may be. Each of the foregoing numbers can be preceded by the word "about," "at least," "at least about," "less than," or "less than about," and any of the foregoing numbers can be used singly to describe a single point or an open-ended range, or can be used in combination to describe multiple single points or a close-ended range. For example, in some aspects, the pre-process mixture or pellet comprises one or more plasticizers in an amount (wt. %) of about 0.5 to about 2, about 0.1 to about 2, about 0.5 to about 5, about 1 to about 10, about 0.5 to about 35, about 0.5 to about 40, about 1 to about 30, about 3 to about 25, about 5 to about 20, about 8 to about 20, about 0.5 to about 2, about 20 to about 35, about 0.4 to about 15, about 5 to about 15, about 5 to about 20, 5 to 30, about 15 to about 40, about 22 to about 34, or at least about 15. In some aspects, the amount (wt. %) of hydrophilic plasticizer is any amount described herein, including about 5 to about 15, about 5 to about 20, about 1 to about 15, about 1 to about 20, about 20 to about 35, about 10 to about 25, about 20 to about 40, about 25 to about 40, about 18 to about 32, about 15 to about 40, or about 28 to about 35. In some aspects, the amount (wt. %) of hydrophobic plasticizer is any amount described herein, including 0 to about 5, 0.1 to about 5, about 1 to about 5, about 1 to about 4, about 2 to about 4, about 0.8 to about 1.5, about 0.5 to about 2, at least about 0.2, about 0.4 to about 5, about 0.1 to about 4, or less than about 8. In some aspects, one or more hydrophilic plasticizers are used in combination with one or more hydrophobic plasticizers in any of the amounts set forth herein. For example, in some aspects, one or more hydrophilic plasticizers are employed in any amount (wt. %) disclosed herein, such as 5-15, 20-40, 25-40, 10-25, or 5-20, in combination with one or more hydrophobic plasticizers in any amount (wt. %) disclosed herein, such as 0.5-2, 0-5, 0.1-5, 0.1-4, 0.1-3, 0.1-2, or 0.5 to 1.5.

When more than one plasticizer is employed, the amounts described herein can refer to each plasticizer individually, or to the total amount of plasticizer.

In some aspects, where the hydrocolloid provides a more rigid gel, for example for alginates, and particularly for high G-block alginates, the article may comprise from 5 to about 70% by weight of plasticizer; or from 15% to about 65% by weight of plasticizer; or from about 25% to about 65% by weight of plasticizer, or about 40% to about 60% by weight of plasticizer, or about 50% to about 60% by weight of plasticizer, or any other amount described herein.

In some aspects, in the pre-process mixture, pellet, or article, the weight ratio of the alginate to total plasticizer is from about 1:2 to about 2:1, or from about 1:1.5 to about 1.5:1, or from about 1:1 to 1:1.5.

In some aspects, the pre-process mixtures, pellets and/or articles herein do not include one or more of glycerol, sorbitol, mannitol, galactitol, arabitol, erythritol, xylitol, or any combination thereof.

Humectants

In some aspects, one or more humectants are employed in the article, pellet, or pre-process mixture. Suitable humectants include, for example, hydroxides (e.g., aluminum hydroxide, calcium hydroxide, hydrates thereof, or any combination thereof), sulfates (e.g., calcium sulfate, magnesium hydrogen sulfate, sodium sulfate, sodium hydrogen sulfate, alum (e.g., $KAl(SO_4)_2$), hydrates thereof, aluminum sulfate or hydrates thereof or any combination thereof), chlorides (e.g., calcium chloride, potassium chloride magnesium chloride, hydrates thereof, or any combination thereof), carbonates (e.g., calcium carbonate, potassium carbonate, magnesium carbonate, potassium zirconium carbonate (e.g., Zirmel™ 1000 available from Luxfer MEL Technologies), hydrates thereof, or any combination thereof), oxides (e.g., calcium oxide, magnesium oxide, aluminum oxide, hydrates thereof, or any combination thereof), aluminates (e.g., calcium aluminate, a hydrate thereof, or a combination thereof), silicates (e.g., calcium silicate, potassium silicate, lithium silicate, magnesium silicate, hydrates thereof, or any combination thereof), acetates (e.g., sodium acetate, potassium acetate, zirconium acetate, hydrates thereof, or any combination thereof), silica, pentasodium triphosphate, sepiolite, silica gel, silicon dioxide, zeolite, any hydrate thereof, or any combination thereof.

In some aspects, suitable humectants include, for example, salts selected from hydroxides (e.g., aluminum hydroxide, calcium hydroxide, hydrates thereof, or any combination thereof), sulfates (e.g., calcium sulfate, magnesium hydrogen sulfate, sodium sulfate, sodium hydrogen sulfate, alum (e.g., $KAl(SO_4)_2$), hydrates thereof, or any combination thereof), chlorides (e.g., calcium chloride, magnesium chloride, hydrates thereof, or any combination thereof), carbonates (e.g., calcium carbonate, potassium carbonate, magnesium carbonate, potassium zirconium carbonate, hydrates thereof, or any combination thereof), aluminates (e.g., calcium aluminate, a hydrate thereof, or a combination thereof), silicates (e.g., calcium silicate, potassium silicate, lithium silicate, magnesium silicate, hydrates thereof, or any combination thereof), acetates (e.g., sodium acetate, potassium acetate, zirconium acetate, hydrates thereof, or any combination thereof), pentasodium triphosphate, any hydrate thereof, or any combination thereof.

In some aspects, the humectant is or comprises aluminum hydroxide or a hydrate thereof. In some aspects, the humectant is or comprises aluminum hydroxide monohydrate or multihydrate. In some aspects, the aluminum hydroxide or a hydrate thereof is derived from bauxite ore. Aluminum hydroxide or a hydrate thereof can include aluminum trihydrate. In some aspects, without wishing to be bound by theory, a humectant is employed to prevent or reduce swelling of the article when placed in contact with a water-based liquid, and/or to improve flexibility of the article. It was surprisingly discovered that an article made from a pre-process mixture comprising a humectant, such as aluminum hydroxide or a hydrate thereof, prevented or reduced swelling of the article when placed in contact with a water-based liquid, and/or improved mechanical properties of the article, such as flexibility, compressive strength, tensile strength, Young's modulus, or any combination thereof.

In some aspects, the pre-process mixtures, pellets, and/or articles herein do not include aluminum hydroxide, bentonite, calcium sulfate, calcium chloride, calcium carbonate, calcium oxide, calcium hydroxide, calcium aluminate, calcium silicate, potassium silicate, potassium carbonate, silica, lithium silicate, magnesium sulfate, magnesium carbonate, magnesium chloride, magnesium hydrogensulfate, magnesium silicate, sodium sulfate, sodium acetate, sodium hydrogensulfate, pentasodium triphosphate, sepiolite, silica gel (silicic acid gel), silicon dioxide, zeolite, or any combination thereof.

In some aspects, the article comprises one or more humectants in any suitable amount. For example, in some aspects, the article comprises one or more humectants in an amount (wt. %) of 0, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.2, 3.4, 3.6, 3.8, 4, 4.2, 4.4, 4.6, 4.8, 5, 5.5, 6, 6.5, 7, 7.5, 8, 8.5, 9, 9.5, 10, 10.5, 11, 11.5, 12, 12.5, 13, 13.5, 14, 14.5, or 15, based on the total weight of the article. Each of the foregoing numbers can be preceded by the word "about," "at least," "at least about," "less than," or "less than about," and any of the foregoing numbers can be used singly to describe a single point or an open-ended range, or can be used in combination to describe multiple single points or a close-ended range. For example, in some aspects, the article comprises one or more humectants in an amount (wt. %) of about 0.1 to about 10, about 0.5 to about 10, 0 to about 5, 0.1 to 5, about 1 to about 5, at least about 1.5, less than about 12, or about 1.1 to about 4.5.

In some aspects, the pre-process mixture or pellet comprises one or more humectants in any suitable amount. For example, in some aspects, the pre-process mixture comprises one or more humectants in an amount (wt. %) of 0, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.2, 3.4, 3.6, 3.8, 4, 4.2, 4.4, 4.6, 4.8, 5, 5.5, 6, 6.5, 7, 7.5, 8, 8.5, 9, 9.5, 10, 10.5, 11, 11.5, or 12, based on the total weight of the pre-process mixture. Each of the foregoing numbers can be preceded by the word "about," "at least," "at least about," "less than," or "less than about," and any of the foregoing numbers can be used singly to describe a single point or an open-ended range, or can be used in combination to describe multiple single points or a close-ended range. For example, in some aspects, the preprocess mixture comprises one or more humectants in an amount (wt. %) of about 0.1 to about 8, 0 to about 5, 0.1 to 5, about 0.5 to about 7, about 1 to about 5, at least about 1.5, less than about 12, about 1.1 to about 4.5, or about 1.8 to about 3.

When more than one humectant is employed, the amounts described herein can refer to each humectant individually, or to the total amount of humectant.

Fillers/Strength Modifiers

In some aspects, the article, pellet, or pre-process mixture may comprise a filler. In some aspects, the filler can function as a strength modifier (e.g., impact strength modifier).

Suitable fillers/strength modifiers can be organic or inorganic and can include, for example, starch (e.g., corn starch), microcrystalline cellulose (MCC), guar gum, carboxymethyl cellulose, citrus fiber, a mineral salt, calcium carbonate (or a hydrate thereof), or any combination thereof. Moreover, suitable fillers also include any of the humectants disclosed elsewhere herein, such as a salt or compound which is a hydroxide, a sulfate, a chloride, a carbonate, an oxide, an aluminate, a silicate, an acetate, silica, pentasodium triphosphate, sepiolite, silicone dioxide, zeolite, or any hydrate thereof, or any combination thereof; or a salt or compound is a salt of an alkali metal, an alkaline earth metal, aluminum, or any combination thereof.

In some aspects, such fillers may be disclosed elsewhere herein as having a different function, such as guar or starch as a hydrocolloid; MCC as a plasticizer or reinforcing fiber; or calcium carbonate as a humectant; however, such disclosures merely indicate that certain components can have different or multiple functions in the article, pellet, and/or pre-process mixture.

In some aspects, the pre-process mixture, pellet, or article can comprise any suitable amount of filler. For example, in some aspects, the pre-process mixture, pellet, or article comprises a filler or combination of fillers in an amount (wt. %) of 0, 0.5, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5 or 15, based on the total weight of the pre-process mixture, pellet, and/or article, as the case may be. Each of the foregoing numbers can be preceded by the word "about," "at least," "at least about," "less than," or "less than about," and any of the foregoing numbers can be used singly to describe a single point or an open-ended range, or can be used in combination to describe multiple single points or a close-ended range. For example, in some aspects, the pre-process mixture, pellet, or article comprises a filler or combination of fillers in an amount (wt. %) of about 1 to about 10, 5 to 10, 5 to 15, 4.5 to 12, 3 to 11, 6 to 14, at least 3, at least 5, or less than 12. Generally, the amount of filler does not change when a pre-process mixture is formed into a pellet, or when a pre-process mixture or pellet is formed into an article, except that the moisture content may change somewhat as described elsewhere herein, particularly if drying is employed.

Hydrophobic Additive

In some aspects, the article, pellet, or pre-process mixture may comprise a hydrophobic additive. Suitable hydrophobic additives include, for example, palm stearin, carnauba wax, zein, lignin, or any combination thereof. Moreover, suitable hydrophobic additives also include any of the hydrophobic plasticizers, edible oils, and/or coatings disclosed elsewhere herein. Without wishing to be bound by theory, it is believed that including a hydrophobic additive in the pre-process mixture, pellet, and/or article improves resistance to moisture absorption and/or improves moisture barrier properties, for example, by increasing the hydrophobicity of the article and/or pellet.

In some aspects, the article, pellet, or pre-process mixture comprises a hydrophobic additive in any suitable amount. For example, in some aspects, the pre-process mixture, pellet, or article comprises a hydrophobic additive or combination of hydrophobic additives in an amount (wt. %) of 0, 1, 2, 3, 4, 5, 6, 7, 8, 9, 10, 11, 12, 13, 14, 15, 16, 17, 18, 19, or 20, based on the total weight of the pre-process mixture, pellet, and/or article, as the case may be. Each of the foregoing numbers can be preceded by the word "about," "at least," "at least about," "less than," or "less than about," and any of the foregoing numbers can be used singly to describe a single point or an open-ended range, or can be used in combination to describe multiple single points or a close-ended range. For example, in some aspects, the pre-process mixture, pellet, and/or article comprises a hydrophobic additive or combination of hydrophobic additives in an amount (wt. %) of 0 to about 10, about 1 to about 10, about 1 to about 15, 0 to 5, 1 to 5, 0 to 3, 1 to 3, 5 to 10, 3 to 11, 5 to 10, about 5 to about 10, about 5 to 15, 6 to 14, at least 3, at least 5, or less than 12. Generally, the amount of hydrophobic additive does not change when a pre-process mixture is formed into a pellet, or when a pre-process mixture or pellet is formed into an article, except that the moisture content may change somewhat as described elsewhere herein, particularly if drying is employed.

Additional Ingredients

In some aspects, the articles, pellets, and pre-process mixtures further comprise one or more additional ingredients such as, for example, flavoring agents, coloring agents, spices, acids, actives, or any combination thereof, as described in more detail elsewhere herein. These additional ingredients are typically present in pre-process mixture, pellets, and/or articles herein in amounts or combined amounts such that their presence or combined presence does not affect the mechanical properties of the articles formed.

In some aspects, the pre-process mixtures, pellets, and/or articles herein do not include a fibrous material embedded in a hydrocolloid matrix. In some aspects, the pre-process mixtures, pellets, and/or articles herein do not include a hydrated fibrous material embedded in a hydrocolloid matrix. Fibrous materials can include particulated cellulose fibers, such as recycled paper, corn stover, cotton linters, sawdust, or the like. In some aspects, the pre-process mixtures, pellets, and/or articles herein do not include coagula or extruded fibers of water-insoluble biopolymers. In some aspects, the pre-process mixtures, pellets, and/or herein do not include fibers, such as wood pulp fibers, cotton linters, or a combination thereof. In some aspects, the pre-process mixtures, pellets, and/or articles herein do not include natural fibers, such as wood fibers, cereal fibers, nutshell fibers, grass fibers, cornmeal, cellulose fibers, cellulose flakes, or any combination thereof. In some aspects, the pre-process mixtures, pellets, and/or articles herein do not include cellulose, water-soluble cellulose, or mechanical pulp. In some aspects, the pre-process mixtures, pellets, and/or articles herein do not include a lipid, a dried fat, or a lipid derived from dried fat.

In some aspects, the pre-process mixtures, pellets, and/or articles herein do not include polyphenol, tea polyphenol, gluconate, calcium gluconate, tartaric acid, or any combination thereof.

In some aspects, the pre-process mixtures, pellets, and/or articles herein do not include a protein glue that comprises gluten (or glutin), collagen, albumin, gelatin, chondrin, agar-agar, xanthan, or any combination thereof. In some aspects, the pre-process mixtures, pellets, and/or articles herein do not include protein. In some aspects, the pre-process mixture, pellets, and/or articles herein do not include one or more of a milk protein (whole milk protein, sodium caseinate, calcium caseinate, whey proteins, albumins, lactoglobulins), seed proteins (from soy, sunflower, cottonseed, peanut), cereal proteins (wheat, corn, oat, rice), fractionated proteins, hydrolyzed proteins, or any combination thereof. In some aspects, the pre-process mixtures, pellets, and/or articles herein do not include protein isolate, for example, from soy, gluten, or a combination thereof.

In some aspects, the pre-process mixtures, pellets, and/or articles herein do not include a nonionic polysaccharide. In some aspects, the pre-process mixtures and/or articles herein do not include one or more of pullulan, a pullulan derivative, inulin, guar, cellulose, konjac, agar, agarose, curdlan, hydroxypropylmethyl cellulose, hydroxyethyl cellulose, methyl cellulose, hydroxypropyl cellulose, hydroxypropyl guar, cellulose acetate, cellulose aldehyde, carboxymethyl starch, hydroxypropyl starch, hydroxyethyl starch, starch acetate, starch aldehyde, or any combination thereof. In some aspects, the pre-process mixtures, pellets, and/or articles herein do not include one or more of carboxymethyl cellulose, xanthan gum, gum arabic, gum tragacanth, locust bean gum, tara gum, carboxymethyl starch, cationic starch, gelatin, gellan, pectin, and carrageenan.

In some aspects, the pre-process mixtures, pellets, and/or articles herein do not include flour, such as rice flour, gluten flour, or a combination thereof. In some aspects, the pre-process mixtures, pellets, and/or articles herein do not include tubers, for example, tubers from potato, cassava, sweet potato, or any combination thereof.

In some aspects, the pre-process mixtures, pellets, and/or articles herein do not include sap, for example, from rubber, copal, dammar, jelutung, or any combination thereof. In some aspects, the pre-process mixtures, pellets, and/or articles herein do not include polyethylene glycol. In some aspects, the pre-process mixtures, pellets, and/or articles do not include one or more cellulose esters, such as cellulose acetate, or polylactic acid.

In some aspects, the pre-process mixture, pellets and articles herein do not include organic or inorganic cross-linking agents. In some aspects, the pre-process mixture, pellets and articles herein do not include a dicarboxylic acid, tannic acid, malic acid, succinic acid, adipic acid, citric acid, tannic acid, caffeic acid, catechin, or ferulic acid. In some aspects, the pre-process mixture, pellets and articles herein do not include a flow agent. In some aspects, the pre-process mixture, pellets and articles herein do not include a stearate salt. In some aspects, the pre-process mixture, pellets and articles herein do not include calcium stearate, zinc stearate or a mixture thereof.

In some aspects, the pre-process mixture, pellets and articles herein do not include hydrophobic additives as described herein. In some aspects, the pre-process mixture, pellets and articles herein do not include hydrophobic additives as described herein, but do include at least one hydrophobic plasticizer. In some aspects, the pre-process mixture, pellets and articles herein do not include hydrophobic additives as described herein, but do include at least one hydrophobic plasticizer and one hydrophilic plasticizer. In some aspects, the pre-process mixture, pellets and articles herein do not include hydrophobic additives as described herein Sugar and/or Non-Sugar Sweetener In some aspects, the article, pellet, and/or pre-process mixture comprises a sugar or non-sugar sweetener, such as sugar, honey, agave nectar, a low calorie sweetener, a zero-calorie sweetener, or any combination thereof. In some aspects, the sweetener is a natural agent that is derived from a biological source, and particularly a plant source. In some aspects, the sweetener may comprise one or more of stevia, erythritol, monk fruit, and so forth, or any combination thereof. In some aspects, the sweetener may alternatively or additional also comprise a sugar substitute such as maltitol, lactitol, mannitol, xylitol, or sorbitol. Any single sweetener or combination of sweeteners may be employed in the pre-process mixture, in the pellet, in the article, or coated on or infused into the article and/or pellet. When employed, the sweetener can be employed in any suitable amount to provide a desired level of sweetness. In some aspects, the pre-process mixtures, pellets, and/or articles herein are not low-sugar or sugar-free. In some aspects, the pre-process mixtures or articles herein do not include sugar, honey, or other sweetener.

Edible Oils

In some aspects, the article, pre-process mixture, and/or pellet comprises one or more edible oils. In some aspects, the edible oils are derived from a plant or plant source. In some aspects, the edible oils comprises one or of vegetable glycerin, palm oil, and the like. In some aspects, the edible oil comprises an essential oil.

In some aspects, the pre-process mixtures, pellets, and/or articles herein do not include a lubricant, such as vegetable oil, rapeseed oil, olive oil and poppyseed oil, a lecithin, triethyl acetyl citrate, a sucrose ester, a lactone, a lactam, a synthetic triglyceride, or any combination thereof.

In some aspects, the article comprises an edible oil or combination of edible oils in any suitable amount. For example, in some aspects, the article comprises an edible oil or combination of edible oils in an amount (wt. %) of 0.5, 1, 1.5, 2, 2.5, 3, 3.5, 4, 4.5, 5, 5.5, 6, 6.5, 7, 7.5, 8, 8.5, 9, 9.5, or 10, based on the total weight of the article. Each of the foregoing numbers can be preceded by the word "about," "at least," "at least about," "less than," or "less than about," and any of the foregoing numbers can be used singly to describe a single point or an open-ended range, or can be used in combination to describe multiple single points or a close-ended range. For example, in some aspects, the article comprises an edible oil or combination of edible oils in an amount (wt. %) of about 1 to about 10, about 2 to about 5, or about 1 to about 7.

In some aspects, the pre-process mixture or pellet, comprises an edible oil or combination of edible oils in any suitable amount. For example, in some aspects, the pre-process mixture or pellet comprises an edible oil or combination of edible oils in an amount (wt. %) of 0.05, 0.1, 0.15, 0.2, 0.25, 0.3, 0.35, 0.4, 0.45, 0.5, 0.6, 0.7, 0.8, 0.9, 1, 1.1, 1.2, 1.3, 1.4, 1.5, 1.6, 1.7, 1.8, 1.9, 2, 2.2, 2.4, 2.6, 2.8, 3, 3.2, 3.4, 3.6, 3.8, 4, 4.2, 4.4, 4.6, 4.8, or 5, based on the total weight of the pre-process mixture or pellet, as the case may be. Each of the foregoing numbers can be preceded by the word "about," "at least," "at least about," "less than," or "less than about," and any of the foregoing numbers can be used singly to describe a single point or an open-ended range, or can be used in combination to describe multiple single points or a close-ended range. For example, in some aspects, the pre-process mixture or pellet comprises an edible oil or combination of edible oils in an amount (wt. %) of about 0.05 to about 3, about 0.1 to about 1, at least 0.3, less than about 5, or about 0.45 to about 1.8.

Flavoring Agents and Fragrances

In some aspects, the article, pellet, or pre-process mixture comprises one or more flavoring agents, one or more fragrances, or any combination thereof. Flavoring agents and fragrances suitable for the present disclosure may be derived from natural sources such as plants, herbs, spices, and the like. Various flavoring agents and/or fragrances may include, but are not limited to, grapefruit, cherry, matcha green tea, vanilla, chocolate, raspberry, strawberry, cranberry, passionfruit, apple, blueberry, papaya, lemon, lime, champagne, grape, banana, watermelon, honey, peach, orange, kiwi, pomegranate, plum, coconut, yuzu, and the like or any combination thereof. Flavoring agents may also include one or more edible florals such as rose water, damascenea rose, jasmine, lavender, and the like. Representative examples of flavoring agents are available from Abelei, The Tec Team, Virginia Dare, Silesia, Carmi Flavors, Fruit D'Or, American Fruit Flavors, Lakewood Organic, and Comax Flavors and are present in about 0.1% to about 10% by weight. In some aspects, no flavoring agents or fragrances are employed.

Coloring Agents

In some aspects, the article, pellet, or pre-process mixture comprises one or more coloring agents (sometimes referred to herein as colorants). The coloring agent may be added as an optional ingredient in the pre-processing mixture, may be applied to the article as an edible coating, or may be infused into the article or pellet. In some aspects, the coloring agent is derived from a plant source and is present in the article, pellet, or pre-process mixture in the amount of about 0.1% to about 10% by weight, or about 0.1 to about 0.3% by weight. Representative coloring agents are available from DDW Color House, Food Ingredient Solutions, GNT, Natural Flavors Inc., SunChemical, FireDots and Sensient Food Colors. Depending on the coloring agent or agents chosen, the articles (e.g., edible articles) may be translucent, opaque, or clear. In some aspects the coloring agent is a pigment, for example, cyan, red, blue, yellow, green, purple, or any other desired color, which can be in any form, such as an aqueous solution. In some aspects the coloring agent is a photonic flake, for example titania coated mica, carbon black coated mica or self-assembled polymer flake ranging in color from violet to red and supplied in a powdered form. In some aspects, the article, pellet, or pre-process mixture is devoid of any coloring agent. The coloring agent may be applied to provide a particular appearance, for example striated, color blocked, faded from one color to another, changing in color throughout, tie-dye, marble swirls, or any combination thereof.

Active Ingredients

In some aspects, the article, pellet, or pre-process mixture comprises one or more active ingredients. Suitable active ingredients include vitamins, minerals, phytonutrients (e.g., carotenoids, flavonoids, resveratrol, and glucosinolates), anti-oxidants, fiber, fatty acids such as omega-3 fatty acid, stimulants such as caffeine and PureEnergy™ (caffeine pterostilbene co-crystal), amino acids, polypeptides, proteins (plant and insect-based, i.e., cricket, etc.), *cannabis* oil, CBD oil, *cannabis*, THC, plant-based charcoal for detoxification, brain supplements such as lion's mane and *Cordyceps*, nootropics such as hyperzine-A, acetal choline, DHA, GABA, phosphatidylserine, L-Thyanine, Turkey Tail, Chaga immunity mushrooms, collagen and collagen peptides, botanicals, plant extracts, or any combination of any active ingredient listed herein. In some aspects, an active ingredient comprises any plant-derived material that is safe for human consumption, including herbal extracts, botanical extracts, and the like, such as Gotu Kola, Kola Nut, Bacopa Manieri, ginseng, Gingko Biloba, Schisandra, Goji Berry, turmeric, ginger, terpenes, and aromatic isolates (alpha-pinene, myrcene and the like), or any combination thereof. Other materials, such as prebiotics, probiotics, can also be used as an active ingredient.

Suitable vitamins include Vitamins A, B-complex (such as B-1, B-2, B-6 and B-12), C, D, E and K, niacin, acid vitamins such as pantothenic acid and folic acid and biotin, or minerals comprising calcium, iron, zinc, magnesium, iodine, copper, phosphorus, manganese, potassium, chromium, molybdenum, selenium, nickel, tin, silicon, vanadium and boron, or any combination of any vitamin disclosed herein.

Suitable specific actives include, by way of example, caffeine, beta-glucan, isoflavones, lignans, lycopene, allicin, glucosinolates, limonoids, polyphenols, catechins (e.g. epigallocatechin-3-gallate, epigallocatechin, epicatechin-3-gallate, epicatechin), phenolics, omega fatty acids including EPA and DHA, conjugated linoleic acid, capsicum, ginseng, *Echinacea purpurea*, kola nut, passion flower, St. John's Wort, Ma Huang/guarana, kava and chamomile, or any combination thereof.

Natural Preservatives

In some aspects, the article, pellet, or pre-process mixture comprises one or more preservatives (e.g., natural preservatives). In some aspects, the preservative comprises an anti-oxidant such as a tocopherol. In some aspects, the preservative comprises citric acid. In some aspects, the preservative comprises lemon juice, lemon powder, ascorbic acid, tartaric acid, malic acid, sour salt, or any combination thereof. In some aspects, any combination of preservatives may be employed.

Coating

In some aspects, the article or pellet comprises a coating, for example, to enhance the waterproofing, to extend shelf life (e.g., acting as a preservative), or a combination thereof. In some aspects, the coating is edible. In some aspects coating improves gas and water vapor barrier properties of the article. In some aspects, the coating reduces the stickiness of the article and/or pellet. In some aspects, the coating (or coating component) comprises vegetable oils, including but not limited to coconut oil, palm oil, beechnut oil, castor oil, cottonseed oil, groundnut oil, hazelnut oil, olive oil, palm kernel oil, peanut oil, peel oil, poppy oil, black current seed oil, flaxseed oil, amaranth oil, apricot oil, raisin seed oil, rapeseed oil, rice bran oil, safflower oil, sesame oil, sunflower seed oil, tucum oil, soybean oil, almond oil, brazil nut oil, cashew oil, macadamia oil, mongongo nut oil, pine nut oil, pistachio oil, walnut oil, or any combination thereof; short or medium or long chain triglycerides, monoglycerides, diglycerides, or any combination thereof; confectioner's glaze; acetylated monoglycerides; waxes such as beeswax, soy wax, rice bran wax, shellac; or any combination of any coating material or coating component listed herein. In some aspects, the coating or coating component comprises a wax such as beeswax, rice bran wax, carnauba wax, soy wax, shellac or any combination of thereof. In some aspects, the wax is an edible wax. In some aspects, the coating is applied to an article or pellet by way of a coating solution comprising a coating component (e.g., the coating component is or comprises any of the coatings or coating materials described herein). For example, in some aspects the coating solution comprises a coating component (e.g., an oil, an edible wax, a combination of edible waxes, or a combination of one or more oils and one or more edible waxes) in an amount (wt. %) of 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, or 35, based on the total weight of the coating solution. Each of the foregoing numbers can be preceded by the word "about," "at least," "at least about," "less than," or "less than about," and any of the foregoing numbers can be used singly to describe a single point or an open-ended range, or can be used in combination to describe multiple single points or a close-ended range. For example, in some aspects, the coating solution comprises a coating component in an amount (wt. %) of 0 to 15, 10 to 20, less than 18, 30, 25 to 35, 28 to 33, about 5, or 2 to 8. In some aspects coating solution comprises a coating component (e.g., edible wax) dissolved in a 1:1, 1:2, 1:3, or 1:4 mixture of water:acetone. In some aspects, the coating (e.g., coating solution) is applied to the article after the article has been molded and dried, or extruded and dried. In some aspects, the coating (e.g., coating solution) is applied to the article during the drying process. In some aspects, the coating (e.g., coating solution) is applied by spraying, immersing, dipping, brushing, edible ink-jet printing, co-extrusion or any combination thereof, or otherwise applied to the inner and/or outer surfaces of the article. In some aspects, coating articles or pellets can be performed as known in the art to coat the articles (e.g., straws) using any known coating agent, such as those coating agents/materials/components described herein. In some aspects, a process comprises optionally applying a coating to the pellet by spraying, immersion, dipping, brushing, edible ink jet printing, co-extrusion, or any combination thereof, wherein the coating comprises an oil coating, a wax coating, confectioner's glaze, or any combination thereof, or any other coating disclosed herein.

In some aspects, a coated article has any suitable contact angle when measured using Rame-Hart Model 90 CA edition with DropImage software and using water as a liquid. For example, in some aspects, the static contact angle (°) is 95, 96, 97, 98, 99, 100, 101, 102, 103, 104, 105, 106, 107, 108, 109, 110, 111, 112, 113, 114, or 115. Each of the foregoing numbers can be preceded by the word "about," "at least," "at least about," "less than," or "less than about," and any of the foregoing numbers can be used singly to describe a single point or an open-ended range, or can be used in combination to describe multiple single points or a close-ended range. For example, in some aspects, the static contact angle is 95 to 115, 100, about 100, 98 to 105, 97 to 110, 100 to 115, 100 to 110, or 105 to 112. In some aspects, an article can have such static contact angles when any suitable coating disclosed herein is present on the article, including, for example, beeswax, a combination of beeswax and carnauba, carnauba, oil, confectioner's glaze, soy wax, and so forth, or any combination thereof.

In some aspects, the pellets and/or articles herein do not include a coating, e.g., a coating comprising rubber.

Cross-Linking

In some aspects, one or more components of the article, pellet, or pre-process mixture may be cross-linked. In some aspects, the hydrocolloid(s) or other components in the article, pre-process mixture, and/or pellet are cross-linked by the addition of a cross-linking agent (e.g., inorganic cross-linking agent) in the pre-process mixture. In some aspects, the article or pellet is cross-linked by immersion in a cross-linking bath after molding, extrusion, or otherwise forming the pellet or article. In some aspects, the cross-linking provides a final product (e.g., pellet or article) with improved properties such as stiffness, tensile strength, and water resistance as compared to a noncross-linked pellet or article. In some aspects, suitable cross-linking agents are non-toxic and/or may be substantially removed from the pellet or article, e.g., by rinsing, evaporating, or other suitable process. In some aspects, the cross-linking agent(s) do not affect the ability of the article to contain or otherwise contact a drinkable liquid or food product.

In some aspects, the cross-linking agent comprises a metal cation, particularly when the hydrocolloid is alginate, chitosan, guar gum, carrageenan (e.g., kappa- and/or iota-carrageenan), pectin, konjac gum, or any combination thereof. In some aspects, the cross-linking agent is added to the pre-process mixture containing the hydrocolloid prior to forming (e.g., by molding, casting, extruding, or any combination thereof) to its final shape (e.g., pellet or article), so long as the reaction with the cross-linker does not interfere with subsequent forming. In some aspects, the cross-linking agent is applied to the pellet or article after it has been processed into its final shape. In such aspects where the cross-linking agent is applied after forming the pellet or article, a solution of the cross-linker may be applied to the formed pellet or article by brushing, dipping, spraying, or any combination thereof a solution of the cross-linking agent onto one or more of the surfaces of the pellet or article. In some aspects, the pellet or article is immersed in a solution of the cross-linking agent, followed by subsequent optional rinsing.

In some aspects, the pellet or article may be cross-linked by exposure of the hydrocolloid (e.g., alginate, chitosan, guar gum, or a combination thereof) to a multivalent metal cation, such as metal cations having a 2+ or 3+ charge. In some aspects, suitable metal cations for cross-linking the hydrocolloid include $Ba^{2+}$, $Ca^{2+}$, $Mg^{2+}$, $Al^{3+}$, or any combination thereof. In some aspects, the counterion of the metal cation may be any acceptable non-toxic anion, such as a halide (e.g., chloride, bromide, fluoride, iodide, or any combination thereof), an organic anion, such as acetate or carboxylate, or any combination of anions. In some aspects, the metal cation is applied to the article as an aqueous solution of the metal salt. In some aspects, the metal salt solution is applied to the article by spraying, brushing, dipping, immersing, etc., or any combination thereof. In some aspects, the metal salt solution is left in contact with the article for a sufficient period of time for the metal cation to sufficiently diffuse into the pellet or article and provide cross-linking of the hydrocolloid(s) (e.g., alginate and/or kappa-carrageenan). In some aspects, the concentration of the metal salt in the aqueous solution ranges from 2% by weight to saturated, from about 5% to about 15% by weight, from about 5 wt. % to about 40 wt. %, or from about 20 wt. % to about 40 wt. %, based on the total weight of the aqueous solution.

Suitable cross-linking agents that can be included in the pre-process mixture, or that can be used in a cross-linking bath, include, for example, inorganic cross-linking agents. Suitable inorganic cross-linking agents include, for example, zirconium acetate, potassium zirconium carbonate (e.g., Zirmel™ 1000), ammonium zirconium carbonate (e.g., Bacote™ available from Luxfer MEL Technologies), alum (e.g., $KAl(SO_4)_2$), calcium chloride, or any combination thereof. Moreover, suitable inorganic cross-linking agents also include any of the humectants disclosed elsewhere herein.

In some aspects, such inorganic cross-linking agents may be disclosed elsewhere herein as having a different function, such as zirconium acetate as a humectant; however, such disclosures merely indicate that certain components can have different or multiple functions in the article, pellet, and/or pre-process mixture.

In some aspects, the inorganic cross-linking agent is added to, and mixed together with, the other components of the pre-process mixture to form the pre-process mixture, pellet, and article, and is therefore, in general, equally distributed throughout the pre-process mixture, pellet, and article. Such inorganic cross-linking agents generally contain ions that serve to ionically cross-link at least some of the various other components present in the compositions through electrostatic interactions, such as the hydrocolloid, filler, and/or plasticizer.

In some aspects, the pre-process mixture, pellet, and/or article comprises a cross-linking agent (e.g., inorganic cross-linking agent) in any suitable amount. For example, in some aspects, the pre-process mixture, pellet, and/or article comprises a cross-linking agent or combination of cross-linking agents in an amount (wt. %) of 0, 1, 2, 3, 4, 5, 6, 7, 8, 9, 10, 11, 12, 13, 14, 15, 16, 17, 18, 19, or 20, based on the total weight of the pre-process mixture, pellet, and/or article, as the case may be. Each of the foregoing numbers can be preceded by the word "about," "at least," "at least about," "less than," or "less than about," and any of the foregoing numbers can be used singly to describe a single point or an open-ended range, or can be used in combination to describe multiple single points or a close-ended range. For example, in some aspects, the pre-process mixture, pellet, and/or article comprises a cross-linking agent or combination of cross-linking agents in an amount (wt. %) of 0 to about 10, about 1 to about 10, 0 to 5, 1 to 5, 0 to 3, 1 to 3, 5 to 10, 3 to 11, 5 to 10, about 5 to about 10, about 5 to 15, 6 to 14, at least 3, at least 5, or less than 12.

In some aspects, the pre-process mixtures, pellets, and/or articles herein do not include a cross-linker, such as caramel, a wood smoke concentrate, a sugar aldehyde, a dialdehyde, a dicarboxylic acid, a dicarboxylic anhydride, a di- or triisocyanate, a di- or tri-epoxide, a polysaccharide aldehyde, or any combination thereof.

In some aspects, the article or pellet is immersed in cross-linking bath for a time period of about 1 to about 10 minutes, or about 3 minutes to about 8 minutes, at a temperature of about 20° C. to about 70° C., or about 25° C. to about 60° C., or about 40° C. to about 55° C. In some aspects, following cross-linking, the articles or pellets may be rinsed to remove excess cross-linker. For example, in some aspects, the rinsing is performed for a time period of about 1 to about 10 minutes, or about 3 minutes to about 8 minutes, or about 3 minutes to about 6 minutes, at a temperature of about 20° C. to about 70° C., or about 25° C. to about 60° C., or about 40° C. to about 55° C.

In some aspects, a cross-linking bath is not employed. In some aspects, a cross-linking bath is not employed and an inorganic cross-linking agent is included in the pre-process mixture, pellet, and/or article. In some aspects, a rinsing step is not employed. In some aspects, a cross-linking bath is not employed and a rinsing step is not employed. In some aspects, an organic cross-linking agent is included in the pre-process mixture, pellet, and/or article, and a rinsing step is not employed. In such aspects, where a cross-linking bath and/or rinsing step are/is not employed, the composition of the pre-process mixture, pellet, and article are the same or substantially similar (e.g., within 1 wt. %, within 5 wt. %, within 8 wt. %, or within 10 wt. %).

In some aspects, the pre-process mixture, the pellet produced therefrom, or the article produced therefrom (e.g., from the pre-process mixture or from the pellet) comprises any suitable combination of components. An article, pellet, or pre-process mixture can comprise any component described elsewhere herein in any of the amounts described elsewhere herein. The particular combinations described hereinbelow merely represent only few examples of suitable combinations, but are not intended to be limiting, since it is explicitly contemplated that the components described elsewhere herein can be combined in any manner and in any amount.

In some aspects, the pre-process mixture or pellet comprises about 5-40 wt. % of one or more hydrocolloids (e.g., 5-15 wt. % alginate, 0.5-10 wt. % chitosan, and 0.5-10 wt. % guar gum), 20-35 wt. % hydrophilic plasticizer (e.g., glycerol), 0.5-2 wt. % hydrophobic plasticizer (e.g., glycerol trioctanoate), 0.5-10 wt. % humectant (e.g., aluminum hydroxide or a hydrate thereof), 40-60 wt. % water, and optional ingredients (e.g., coloring agent, flavoring agent, etc.).

In some aspects, the article comprises about 5-70 wt. % hydrocolloid (e.g., 8-20 wt. % alginate, 2-10 wt. % chitosan, and 2-10 wt. % guar gum), 30-45 wt. % hydrophilic plasticizer (e.g., glycerol), 1.5-3.5 wt. % hydrophobic plasticizer (e.g., glycerol trioctanoate), 1-10 wt. % humectant (e.g., aluminum hydroxide or a hydrate thereof), 20-40 wt. % water, and optional ingredients (e.g., coloring agent, flavoring agent, etc.).

In some aspects, the pre-process mixture or pellet comprises 15-35 wt. % of one or more hydrocolloids (e.g., 10-20 wt. % kappa-carrageenan and 5-15 wt. % chitosan), 5-15 wt. % hydrophilic plasticizer (e.g., glycerol), 0.5-2 wt. % hydrophobic plasticizer (e.g., glycerol trioctanoate), 5-10 wt. % filler (e.g., calcium carbonate or a hydrate thereof), 40-60 wt. % water, and optional ingredients (e.g., coloring agent, flavoring agent, etc.).

Ratios of Components

Any amount of any component or combination of components disclosed herein can be readily converted to a weight ratio relative to the amount of any other component or combination of components disclosed herein. For example, in some aspects, the amount of any component or combination of components is expressed as a weight ratio relative to the total amount of hydrocolloid present or vice versa, or the amount of any component or combination of components is expressed as a weight ratio relative to the total amount of alginates present or vice versa, or the amount of kappa-carrageenan is expressed as a weight ratio relative to the total amount of any component or combination of components.

For example, in the pre-process mixture, suitable weight ratios of total alginate to total plasticizer that can be calculated from the amounts of these components disclosed elsewhere herein include X (total alginate) to 1 (total plasticizer), in which X is 0.07, 0.08, 0.09, 0.1, 0.15, 0.2, 0.25, 0.3, 0.35, 0.4, 0.45, 0.5, 0.55, 0.6, 0.65, 0.7, 0.75, or 0.8. Each of the foregoing numbers can be preceded by the word "about," "at least," "at least about," "less than," or "less than about," and any of the foregoing numbers can be used singly to describe a single point or an open-ended range, or can be used in combination to describe multiple single points or a close-ended range. For example, in some aspects, suitable weight ratio of total alginate (X) to total plasticizer (1) include where X is about 0.07 to about 0.8, about 0.08 to about 0.75, about 0.2 to about 0.5, about 0.3 to about 0.45, or at least about 0.3.

For example, in the pre-process mixture, suitable weight ratios of total alginate to hydrophilic plasticizer that can be calculated from the amounts of these components disclosed elsewhere herein include X (total alginate) to 1 (hydrophilic plasticizer), in which X is 0.1, 0.15, 0.2, 0.25, 0.3, 0.35, 0.4, 0.45, 0.5, 0.55, 0.6, 0.65, 0.7, 0.75, or 0.8. Each of the foregoing numbers can be preceded by the word "about," "at least," "at least about," "less than," or "less than about," and any of the foregoing numbers can be used singly to describe a single point or an open-ended range, or can be used in combination to describe multiple single points or a close-ended range. For example, in some aspects, suitable weight ratio of total alginate (X) to hydrophilic plasticizer (1) include where X is about 0.1 to about 0.8, about 0.15 to about 0.75, about 0.2 to about 0.5, about 0.3 to about 0.45, at least about 0.35, or less than about 0.6.

For example, in the pre-process mixture or the article, suitable weight ratios of total alginate to hydrophobic plasticizer that can be calculated from the amounts of these components disclosed elsewhere herein include X (total alginate) to 1 (hydrophobic plasticizer), in which X is 1, 2, 3, 4, 5, 6, 7, 8, 9, 10, 12, 14, 15, 16, 18, 20, 22, 24, 26, 28, 30, 32, 34, or 35. Each of the foregoing numbers can be preceded by the word "about," "at least," "at least about," "less than," or "less than about," and any of the foregoing numbers can be used singly to describe a single point or an open-ended range, or can be used in combination to describe multiple single points or a close-ended range. For example, in some aspects, suitable weight ratio of total alginate (X) to hydrophobic plasticizer (1) include where X is about 1 to about 35, about 1 to about 10, about 2 to about 9, about 3 to about 12, at least about 5, or less than about 15.

For example, in the pre-process mixture or the article, suitable weight ratios of total alginate to chitosan that can be calculated from the amounts of these components disclosed elsewhere herein include X (total alginate) to 1 (chitosan), in which X is 0.1, 0.15, 0.2, 0.25, 0.3, 0.35, 0.4, 0.45, 0.5, 0.55, 0.6, 0.65, 0.7, 0.75, 0.8, 1, 2, 3, 4, 5, 6, 7, 8, 9, 10, 12, 14, 15, 16, 18, 20, 22, 24, 26, 28, 30, 32, 34, or 35. Each of the foregoing numbers can be preceded by the word "about," "at least," "at least about," "less than," or "less than about," and any of the foregoing numbers can be used singly to describe a single point or an open-ended range, or can be used in combination to describe multiple single points or a close-ended range. For example, in some aspects, suitable weight ratio of total alginate (X) to chitosan (1) include where X is about 0.1 to about 30, about 1 to about 10, about 1 to about 8, about 3 to about 7, at least about 2, or less than about 20.

For example, in the pre-process mixture or the article, suitable weight ratios of total alginate to humectant that can be calculated from the amounts of these components disclosed elsewhere herein include X (total alginate) to 1 (humectant), in which X is 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1, 2, 3, 4, 5, 6, 7, 8, 9, 10, 12, 14, 15, 16, 18, 20, 22, 24, 26, 28, 30, 32, 34, or 35. Each of the foregoing numbers can be preceded by the word "about," "at least," "at least about," "less than," or "less than about," and any of the foregoing numbers can be used singly to describe a single point or an open-ended range, or can be used in combination to describe multiple single points or a close-ended range. For example, in some aspects, suitable weight ratio of total alginate (X) to humectant (1) include where X is about 0.1 to about 30, about 1 to about 10, about 1 to about 8, about 3 to about 7, about 4 to about 12, at least about 3, or less than about 10.

For example, in the pre-process mixture or the article, suitable weight ratios of total hydrocolloid to humectant that can be calculated from the amounts of these components disclosed elsewhere herein include X (total hydrocolloid) to 1 (humectant), in which X is 0.1, 0.2, 0.4, 0.5, 0.6, 0.8, 1, 2, 3, 4, 5, 6, 7, 8, 9, 10, 11, 12, 13, 14, 15, 16, 18, 20, 22, 24, 26, 28, 30, 32, 34, 35, 40, 45, 50, 55, 60, 65, 70, or 75. Each of the foregoing numbers can be preceded by the word "about," "at least," "at least about," "less than," or "less than about," and any of the foregoing numbers can be used singly to describe a single point or an open-ended range, or can be used in combination to describe multiple single points or a close-ended range. For example, in some aspects, suitable weight ratio of total hydrocolloid (X) to humectant (1) include where X is about 0.1 to about 75, about 1 to about 20, about 6 to about 25, about 3 to about 15, about 4 to about 12, at least about 7, about 5 to about 15, or less than about 18.

For example, in the pre-process mixture or the article, suitable weight ratios of total hydrocolloid to hydrophobic plasticizer that can be calculated from the amounts of these components disclosed elsewhere herein include X (total hydrocolloid) to 1 (hydrophobic plasticizer), in which X is 1, 2, 3, 4, 5, 6, 7, 8, 9, 10, 11, 12, 13, 14, 15, 16, 18, 20, 22, 24, 26, 28, 30, 32, 34, 35, 40, 45, 50, 55, 60, 65, 70, or 75. Each of the foregoing numbers can be preceded by the word "about," "at least," "at least about," "less than," or "less than about," and any of the foregoing numbers can be used singly to describe a single point or an open-ended range, or can be used in combination to describe multiple single points or a close-ended range. For example, in some aspects, suitable weight ratio of total hydrocolloid (X) to hydrophobic plasticizer (1) include where X is about 1 to about 75, about 1 to about 20, about 6 to about 25, about 3 to about 15, about 4 to about 12, at least about 7, or less than about 18.

For example, in the pre-process mixture, suitable weight ratios of total hydrocolloid to hydrophilic plasticizer that can be calculated from the amounts of these components disclosed elsewhere herein include X (total hydrocolloid) to 1 (hydrophilic plasticizer), in which X is 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1, 1.2, 1.4, 1.6, 1.8, 2, 2.2, 2.4, 2.6, 2.8, 3, 3.2, 3.4, 3.6, 3.8, 4, 4.2, 4.4, 4.6, 4.8, 5. Each of the foregoing numbers can be preceded by the word "about," "at least," "at least about," "less than," or "less than about," and any of the foregoing numbers can be used singly to describe a single point or an open-ended range, or can be used in combination to describe multiple single points or a close-ended range. For example, in some aspects, suitable weight ratio of total hydrocolloid (X) to hydrophilic plasticizer (1) include where X is about 0.1 to about 5, about 0.1 to about 2, about 0.2 to about 1, about 0.3 to about 3, about 0.44 to about 0.95, at least about 0.5, or less than about 3.

For example, in the pre-process mixture or the article, suitable weight ratios of total hydrocolloid to total plasticizer that can be calculated from the amounts of these components disclosed elsewhere herein include X (total hydrocolloid) to 1 (total plasticizer), in which X is 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1, 1.2, 1.4, 1.6, 1.8, 2, 2.2, 2.4, 2.6, 2.8, 3, 3.2, 3.4, 3.6, 3.8, 4, 4.2, 4.4, 4.6, 4.8, 5. Each of the foregoing numbers can be preceded by the word "about," "at least," "at least about," "less than," or "less than about," and any of the foregoing numbers can be used singly to describe a single point or an open-ended range, or can be used in combination to describe multiple single points or a close-ended range. For example, in some aspects, suitable weight ratio of total hydrocolloid (X) to total plasticizer (1) include where X is about 0.1 to about 5, about 0.1 to about 2, about 0.2 to about 1, about 0.3 to about 3, about 0.44 to about 0.95, at least about 0.5, or less than about 3.

For example, in the pre-process mixture, pellet, or article, suitable weight ratios of kappa-carrageenan (X) to total plasticizer (1) that can be calculated from the amounts of these components disclosed elsewhere herein include X (kappa-carrageenan) to 1 (total plasticizer), in which X is 0.1, 0.2, 0.3, 0.4, 0.5, 0.6, 0.7, 0.8, 0.9, 1, 1.2, 1.4, 1.6, 1.8, 2, 2.2, 2.4, 2.6, 2.8, 3, 3.2, 3.4, 3.6, 3.8, 4, 4.2, 4.4, 4.6, 4.8, 5, 5.2, 5.4, 5.6, 5.8, 6, 6.2, 6.4, 6.6, 6.8, 7, 7.2, 7.4, 7.6, 7.8, or 8. Each of the foregoing numbers can be preceded by the word "about," "at least," "at least about," "less than," or "less than about," and any of the foregoing numbers can be used singly to describe a single point or an open-ended range, or can be used in combination to describe multiple single points or a close-ended range. For example, in some aspects, suitable weight ratios of kappa-carrageenan (X) to total plasticizer (1) include where X is about 0.1 to 8, 1 to 6, 0.1 to 0.8, 0.1 to 0.6, 0.3 to 0.8, 0.3 to 3, 0.3 to 2, 0.3 to 1, 0.6 to 6, 0.6 to 5, 0.6 to 4, 0.6 to 3, or 0.8 to 4.

For example, in the pre-process mixture, pellet, or article, suitable weight ratios of kappa-carrageenan (X) to hydrophilic plasticizer (1) that can be calculated from the amounts of these components disclosed elsewhere herein include X (kappa-carrageenan) to 1 (hydrophilic plasticizer), in which X is 0.1, 0.2, 0.3, 0.4, 0.5, 0.6, 0.7, 0.8, 0.9, 1, 1.2, 1.4, 1.6, 1.8, 2, 2.2, 2.4, 2.6, 2.8, 3, 3.2, 3.4, 3.6, 3.8, 4, 4.2, 4.4, 4.6, 4.8, 5, 5.2, 5.4, 5.6, 5.8, 6, 6.2, 6.4, 6.6, 6.8, 7, 7.2, 7.4, 7.6, 7.8, or 8. Each of the foregoing numbers can be preceded by the word "about," "at least," "at least about," "less than," or "less than about," and any of the foregoing numbers can be used singly to describe a single point or an open-ended range, or can be used in combination to describe multiple single points or a close-ended range. For example, in some aspects, suitable weight ratios of kappa-carrageenan (X) to hydrophilic plasticizer (1) include where X is about 0.6 to 4, 0.7 to 4, 0.6 to 2, 0.1 to 5, 0.5 to 2.4, 1 to 2, 1 to 3, or 0.8 to 1.6.

For example, in the pre-process mixture, pellet, or article, suitable weight ratios of kappa-carrageenan (X) to hydrophobic plasticizer (1) that can be calculated from the amounts of these components disclosed elsewhere herein include X (kappa-carrageenan) to 1 (hydrophobic plasticizer), in which X is 2, 2.5, 3, 3.5, 4, 4.5, 5, 6, 7, 8, 9, 10, 12, 14, 16, 18, 20, 22, 24, 26, 28, 30, 32, 34, 36, 38, 40, 42, 44, 46, 48, or 50. Each of the foregoing numbers can be preceded by the word "about," "at least," "at least about," "less than," or "less than about," and any of the foregoing numbers can be used singly to describe a single point or an open-ended range, or can be used in combination to describe multiple single points or a close-ended range. For example, in some aspects, suitable weight ratios of kappa-carrageenan (X) to hydrophobic plasticizer (1) include where X is about 5 to 40, 2 to 10, 4.5 to 20, 10 to 30, 14 to 26, about 40, 34 to 44, or 4 to 8.

For example, in the pre-process mixture, pellet, or article, suitable weight ratios of kappa-carrageenan (X) to total filler (1) that can be calculated from the amounts of these components disclosed elsewhere herein include X (kappa-carrageenan) to 1 (total filler), in which X is 0.5, 0.6, 0.7, 0.8, 0.9, 1, 1.2, 1.4, 1.6, 1.8, 2, 2.2, 2.4, 2.6, 2.8, 3, 3.2, 3.4, 3.6, 3.8, 4, 4.2, 4.4, 4.6, 4.8, 5, 5.2, 5.4, 5.6, 5.8, 6, 6.2, 6.4, 6.6, 6.8, 7, 7.2, 7.4, 7.6, 7.8, 8, 8.2, 8.4, 8.6, 8.8, 9, 9.2, 9.4, 9.6, or 10. Each of the foregoing numbers can be preceded by the word "about," "at least," "at least about," "less than," or "less than about," and any of the foregoing numbers can be used singly to describe a single point or an open-ended range, or can be used in combination to describe multiple single points or a close-ended range. For example, in some aspects, suitable weight ratios of kappa-carrageenan (X) to total filler (1) include where X is about 0.8 to 5, 1 to 4, 1 to 3, 1.2 to 4.4, 0.6 to 3, 0.9 to 4.1, 2 to 3, about 2, 2 to 2.6, or 1.8 to 2.8.

For example, in the pre-process mixture, pellet, or article, suitable weight ratios of kappa-carrageenan (X) to total other hydrocolloid (1) that can be calculated from the amounts of these components disclosed elsewhere herein include X (kappa-carrageenan) to 1 (total other hydrocolloid), in which X is 0.1, 0.2, 0.3, 0.4, 0.5, 0.6, 0.7, 0.8, 0.9, 1, 1.2, 1.4, 1.6, 1.8, 2, 2.2, 2.4, 2.6, 2.8, 3, 3.2, 3.4, 3.6, 3.8, 4, 4.2, 4.4, 4.6, 4.8, 5, 5.2, 5.4, 5.6, 5.8, 6, 6.2, 6.4, 6.6, 6.8, 7, 7.2, 7.4, 7.6, 7.8, or 8. Each of the foregoing numbers can be preceded by the word "about," "at least," "at least about," "less than," or "less than about," and any of the foregoing numbers can be used singly to describe a single point or an open-ended range, or can be used in combination to describe multiple single points or a close-ended range. For example, in some aspects, suitable weight ratios of kappa-carrageenan (X) to total other hydrocolloid (1) include where X is about 0.6 to 4, 0.7 to 4, 0.6 to 2, 0.1 to 5, 0.5 to 2.4, 1 to 2, 1 to 3, or 0.8 to 1.6.

Process

In some aspects, the article is prepared, for example, by molding, casting, extruding (e.g., hot-melt extrusion), or any combination thereof, a pre-process mixture or pellet comprising one or more hydrocolloids, one or more plasticizers, one or more humectants, a water-based liquid, and optional ingredients. In some aspects, the article is prepared, for example, by molding, casting, extruding (e.g., hot-melt extrusion), or any combination thereof, a pre-process mixture or pellet comprising one or more hydrocolloids, one or more plasticizers, one or more fillers, a water-based liquid, and optional ingredients. In some aspects, the pellet is prepared, for example, by molding, casting, extruding (e.g., hot-melt extrusion), or any combination thereof, a pre-process mixture comprising one or more hydrocolloids, one or more plasticizers, one or more humectants, a water-based liquid, and optional ingredients. In some aspects, the pellet is prepared, for example, by molding, casting, extruding (e.g., hot-melt extrusion), or any combination thereof, a pre-process mixture comprising one or more hydrocolloids, one or more plasticizers, one or more fillers, a water-based liquid, and optional ingredients.

In some aspects, the article or pellet is prepared according to the steps provided below:

For heat activated hydrocolloids, a pre-process mixture is prepared as follows: (a) one or more hydrocolloids is added to water and/or water-based liquid to provide a mixture; (b) the mixture comprising the hydrocolloid(s) is heated to activate the hydrocolloid(s); (c) optionally the heated mixture is concentrated by the evaporation of water; (d) the mixture may be cooled to a pre-casting temperature; (e) optionally, additional ingredients are added either to the water or water-based liquid prior to the addition of the hydrocolloid(s), and/or prior to the heat activation of the hydrocolloid(s), and/or are added after the mixture is cooled to a pre-casting temperature to provide the pre-process mixture. If desired, such a pre-process mixture can be compounded into pellets using, e.g., a hot-melt extruder.

In some aspects, the pre-process mixture is prepared as follows: (a) one or more hydrocolloids, one or more plasticizers, and one or more humectants and/or fillers are added to water and/or water-based liquid to provide a mixture; (b) optional ingredients, including coloring, flavoring, etc. may be added either before or after the addition of the hydrocolloid(s); (c) the mixture may be cooled to a pre-processing temperature; to provide the pre-process mixture.

In some aspects, the article may be prepared from the pre-process mixture or pellets comprising the hydrocolloid(s) and other ingredients by: (i) forming the shape of the article by introducing the pre-process mixture or pellets of the hydrocolloid into a mold that comprises an inner form and an outer form; (ii) allowing the hydrocolloid(s) to set; (iii) removing an outer form; (iv) dehydrating the article while maintaining the article on the inner form; (v) removing the inner form; (vi) optionally, coating the article; (vii) optionally, applying a solution comprising a cross-linking agent to one or more surfaces of the article after one or more of the steps (iii), (iv) or (v).

In some aspects, an article is prepared from the pre-process mixture or pellet comprising the hydrocolloid(s) and other ingredients by: (i) extruding (e.g. hot-melt extruding) the pre-process mixture or pellets; (ii) optionally applying a solution comprising a cross-linking agent to one or more surfaces of the article; (iii) optionally rinsing, and (iii) optionally drying, dehydrating, or air-cooling the article.

In some aspects, disclosed is a process to make an article, the process comprising: combining at least one hydrocolloid, at least one plasticizer, at least one humectant and/or filler, water, and optionally at least one coloring agent, so as to make a pre-process mixture; forming the pre-process mixture into a shape (e.g., a pellet or an article); optionally, immersing the shape in a cross-linking bath to form a cross-linked shape; optionally, rinsing the cross-linked shape to remove excess cross-linker; and optionally drying the cross-linked shape to form the shape (e.g., article or pellet), optionally on a mandrel; wherein the at least one hydrocolloid, the at least one plasticizer, the at least one humectant and/or filler, water, and the optional coloring agent(s) are as defined elsewhere herein.

In some aspects, certain compositions are more amenable to certain processing steps, such as cold extrusion, hot-melt extrusion, cross-linking baths, and/or whether a pre-mixing step is employed prior to the extrusion. For example, in some aspects, cold extrusion generally is suitable for pre-process mixtures comprising alginate as the main hydrocolloid (excluding water) in combination with chitin and/or chitosan, and generally mixing is performed to prepare the pre-process mixture prior to adding to the extruder for cold extrusion. Also, immersion in a cross-linking bath generally is also performed on the articles prepared by cold extrusion.

In contrast, in some aspects, hot-melt extrusion generally is suitable for pre-process mixture comprising carrageenan (e.g., kappa-carrageenan) as the main hydrocolloid (excluding water) in combination with chitin and/or chitosan, and generally no mixing is necessary to prepare the pre-process mixture prior to adding to the extruder (i.e., mixing is performed directly in the extruder, e.g., screw extruder, for hot-melt extrusion). In some aspects, when alginate is the main hydrocolloid, such mixtures are not suitable for hot-melt extrusion. Also, articles prepared by hot-melt extrusion generally do not require, but may optionally include, immersion in a cross-linking bath. See also FIG. 2 for a flow chart depicting an aspect of hot-melt extrusion processes to prepare exemplary articles (e.g., straws).

In some aspects, two hydrocolloids (e.g., one or more alginates and chitosan/chitin, or kappa-carrageenan and chitosan/chitin, or kappa-carrageenan and alginate) are mixed together as powders, and the powder mixture is added to one or more plasticizers (e.g., glycerol and glycerol trioctanoate), followed by addition of a humectant (e.g., aluminum hydroxide or a hydrate thereof) and/or a filler (e.g., calcium carbonate). In some aspects, such a mixture is mixed, then water is added to make a dough, the dough hot blended, and then optionally cooled to below 50° C., additional optional ingredients can also be added before or after the optional cooling step (e.g., flavor, color, or both). In some aspects, such pre-process mixture is then extruded (e.g., hot or cold) into a pellet or article, optionally cross-linked, optionally rinsed, and optionally dried.

In some aspects, the extrusion comprises tube extrusion, for example to form a straw. In some aspects, the extrusion is onto a mandrel. When the extrusion is onto a mandrel, the extruded composition may optionally be dehydrated while still on the mandrel, prior to the article being released from the mandrel.

In some aspects, the hydrocolloid(s) is/are added to water and/or water-based liquid to provide a pre-process mixture comprising about 1 to about 6 percent of the hydrocolloid, and preferably comprising 1 to 5 percent of the hydrocolloid (e.g., for heat-activated hydrocolloids such as agar), in which the mixture is stirred optionally with heating. The heating, when performed, is typically performed until the mixture reaches a temperature of about 80° C. to about 100° C. In some aspects, the mixture may be heated until a boil is achieved. In some aspects, the temperature may be maintained for a sufficient time to activate the hydrocolloid(s), for example, for a time of from about 1 minute to about an hour, or about 5 minutes to about 45 minutes, or about 10 minutes to about 30 minutes.

In some aspects, the articles (e.g., straws) are prepared by a continuous hot-melt extrusion process. In some aspects, the pre-process mixtures are prepared into articles (e.g., straws) by a continuous hot-melt extrusion process. In some aspects, the pre-process mixture is compounded into pellets using hot-melt extrusion (e.g., with a twin-screw extruder). In some aspects, the pellets are prepared into articles (e.g., straws) by a continuous hot-melt extrusion process. In some aspects, the pre-process mixture is first compounded into pellets using a hot-melt extruder (e.g. twin-screw), and the pellets are then prepared into articles (e.g., straws) via a continuous hot-melt extrusion process, e.g., using a single screw extruder. In some aspects, pellet formation using an extruder (e.g., twin-screw extruder) is a cold extrusion process.

In some aspects, the compounding of pre-process mixture into pellets employs a twin-screw hot-melt extruder at a temperature (° C.) of 70, 75, 80, 85, 90, 95, 99, or 100. Each of the foregoing numbers can be preceded by the word "about," "at least," "at least about," "less than," or "less than about," and any of the foregoing numbers can be used singly to describe a single point or an open-ended range, or can be used in combination to describe multiple single points or a close-ended range. For example, in some aspects, the temperature (° C.) is 85 to 100, 85 to 99, 75 to 95, 70 to 100, 70 to 99, 75 to 99, 80 to 100, 80 to 95, or 80 to 99.

In some aspects, the compounding of pre-process mixture into pellets employs a twin-screw hot-melt extruder at a screw speed (rpm) of 150, 175, 200, 225, 250, 275, 300, 325, or 350. Each of the foregoing numbers can be preceded by the word "about," "at least," "at least about," "less than," or "less than about," and any of the foregoing numbers can be used singly to describe a single point or an open-ended range, or can be used in combination to describe multiple single points or a close-ended range. For example, in some aspects, the screw speed (rpm) is 200 to 300, 175 to 325, about 175 to about 350, at least 200, at least 225, less than 350, or 225 to 275.

In some aspects, the compounding of pre-process mixture into pellets employs a feeding weight ratio of solids (X) to liquids (1) where X is 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1, 1.1, 1.2, 1.3, 1.4, 1.5, 1.6, 1.7, 1.8, 1.9, or 2. Each of the foregoing numbers can be preceded by the word "about," "at least," "at least about," "less than," or "less than about," and any of the foregoing numbers can be used singly to describe a single point or an open-ended range, or can be used in combination to describe multiple single points or a close-ended range. For example, in some aspects, a feeding weight ratio of solids (X) to liquids (1) can be employed where X is about 1, about 1 to 2, 0.25 to 1, 0.2 to 1.2, 0.5 to 1, or 0.6 to 0.8.

In some aspects, the compounding of pre-process mixture into pellets employs any suitable combination of parameters, including a temperature of about 85° C. to about 100° C., a screw speed of about 200 rpm to about 300 rpm, and a feeding weight ratio of solids to liquids of 0.25:1 to 1:1.

In some aspects, preparing articles (e.g., straws) from a pre-process mixture or pellet employs any suitable process. For example, in some aspects, the process comprises extrusion. In some aspects, articles (e.g., straws) are prepared from a pre-process mixture or pellet using a single screw extruder with a general-purpose screw. In some aspects, articles (e.g., straws) are prepared from a pre-process mixture or pellet using a single screw extruder with a general-purpose screw and a tubular die.

In some aspects, articles (e.g., straws) are prepared from a pre-process mixture or pellet by a process comprising hot-melt extrusion and employing a single screw extruder with a general-purpose screw having a compression ratio of about 2:1, about 2.5:1, about 3:1, about 3.5:1, or about 4:1. In some aspects, articles (e.g., straws) are prepared from a pre-process mixture or pellet by employing a single screw extruder with a general-purpose screw and a tubular die at a temperature (° C.) of 70 to 100, 70 to 99, 70 95, 75 to 100, 75 to 99, 75 to 95, 80 to 100, 80 to 99, or 80 to 95. In some aspects, articles (e.g., straws) are prepared from a pre-process mixture or pellet by employing a single screw extruder with a general-purpose screw using a screw speed (rpm) of 5 to 60, 5 to 55, 5 to 50, 5 to 45, 10 to 60, 10 to 55, 10 to 50, 15 to 60, 15 to 55, 15 to 50, or 15 to 45. In some aspects, any combination of processing parameters can be employed when preparing articles (e.g., straws) from pre-process mixtures or pellets, such as any combination of compression ratio, temperature, and screw speed. For example, in some aspects, pre-process mixture or pellets are extruded into articles (e.g., straws) using a general purpose screw with a 3 to 1 compression ratio and a tubular die at temperatures of 75° C. to 95° C. and a screw speed of 5 to 50 rpm.

In some aspects, the articles (e.g., straws) obtained in the hot-melt extrusion process (e.g., from pre-process mixture or pellets) are cooled (e.g., air cooled) and cut to a desired length. Such final articles contain moisture in an amount (wt. %) of about 20 to about 40, about 15 to about 35, about 20 to about 35, about 25 to about 35, or about 15 to about 30. In some aspects, the pre-process mixture or pellet contains moisture in an amount (wt. %) of about 35 to about 50, about 35 to about 55, about 30 to about 50 about 30 to about 55, about 30 to about 45, about 35 to about 45, or about 30 to about 40. As described elsewhere herein, such articles need not be subjected to a cross-linking bath and/or rinsing, such that the amount of components in the article are the same or substantially the same as in the pre-process mixture and/or pellet, although moisture content can vary slightly (e.g., 35-50 wt. % in the pre-process mixture or pellet compared to 25-35 wt. % in the article), such that, accounting for this moisture difference, the composition of the components in the article can be recalculated accordingly.

In some aspects, during the process of making the pre-process mixture, pellet, and/or the article, water may be lost to evaporation (e.g., by cooking/boiling and/or by natural or forced drying). For example, if heating is employed, e.g., to activate the hydrocolloid(s), water may be evaporated from the mixture, thereby concentrating the hydrocolloid. Therefore, the water content by weight in the post-heating hydrocolloid mixture may be less than the initial hydrocolloid mixture by weight. In some embodiments, up to about 35 wt. %, or up to about 30 wt. %, or up to about 25 wt. % of the initial water is lost to evaporation. In some aspects, from about 5 wt. % to about 30 wt. %, about 5 wt. % to about 33 wt. %, about 10 to about 25 wt. %, or about 15 wt. % to about 25 wt. % of the initial water amount is lost.

In some aspects, if the hydrocolloid solution is activated at high temperature, and particularly if the hydrocolloid solution is activated by boiling, the resulting hydrocolloid solution may be cooled to a pre-forming (e.g., molding, extruding, etc.) temperature prior to the forming of the article or pellet. In such aspects, the temperature of the hydrocolloid mixture prior to forming of the article or pellet may be cooled to a temperature between about 60° C. to about 90° C., or from about 75° C. to about 85° C., or from about 20° C. to about 50° C.

In some aspects, and particularly for pre-process mixtures comprising alginate as a hydrocolloid, the pre-process mixture may be cooled prior to forming, e.g., by molding, casting, extruding, or any combination thereof. The pre-process mixture may be cooled to a temperature between about 0° C. to about 10° C. The pre-process mixture may be cooled and used immediately, or may stay in cooled form prior to forming for about 30 min to about 48 hours or more.

In some aspects, the additional ingredients for the article or pellet may be added to the hydrocolloid mixture at any point during the process for preparing the pre-process mixture. Additional ingredients are added either to the water or water-based liquid prior to the addition of the hydrocolloid, and/or prior to the heat activation of the hydrocolloid, and/or are added after the mixture is cooled to a pre-casting temperature to provide a final pre-process mixture. In some aspects, in the case of ingredients that may be degraded under the exposure to high temperatures (such as boiling water during the hydrocolloid activation), such ingredients typically are added to the hydrocolloid mixture after the heat activation, but prior to forming of the article or pellet.

In some aspects, once the pre-process mixture is prepared with all desired ingredients, it may be formed into a variety of shapes for the article or pellet by way of extrusion (e.g., hot-melt extrusion), molding, casting, or any combination thereof. In some aspects, the article may be molded, for example, using a polycarbonate or food-grade silicone mold. In some aspects, the molds may comprise at least one, and as many as three or more, separate parts. In some aspects, the mold will comprise at least one inner form, which defines the shape of the interior portion of the article. In some aspects, the mold comprises one or more outer forms, which define the shape of the outer surface of the article. In some aspects, other materials and molding processes may be utilized in making the articles or pellets.

In some aspects, the article is allowed to set (cure) in the mold. Once the article is set, the outer form(s) of the mold is removed. In some aspects, the article is preferably not removed from the inner form until after the subsequent dehydration of the article, to avoid deformation of the article shape. In some aspects, the mold is pre-treated with a releasing agent to facilitate the removal of the mold forms from the article. In some aspects, releasing agents comprise one or more vegetable oils.

In some aspects, the article is subject to dehydration while still on the inner form in order to maintain the size and shape of the article during dehydration. Dehydration helps to reinforce the structural integrity of the article by removing excess water to make the material more durable. Dehydration is typically applied to an article once the material has been molded and an outer mold form is removed. In some aspects, once the outer mold form(s) have been removed from the article, the articles on the inner mold form are placed onto metal trays and moved into a dehydrator to remove excess moisture.

In some aspects, the dehydrator is a commercial dehydrator, convection oven, vacuum dehydrator, or the like, or any combination thereof. In some aspects, the temperature of dehydration is from about 35° C. to about 70° C., or from about 40° C. to about 60° C. In some aspects, the articles may be left in the dehydrator for a period of about one hour to about twenty four hours until the article has the appropriate texture, moisture content, or combination thereof.

In some aspects, the article may have a net water loss approaching 100% of the water from the pre-processing mixture or pellet. In some aspects, water loss is up to 96% by weight of the article from dehydration. In some aspects, the article may have a net water loss of from about 80% to about 95% by weight of the article from dehydration, or from about 85% to about 95% by weight of the article. In some aspects, for the alginate-based article, the water loss may be between 90% to about 99.99% by weight from dehydration.

In some aspects, the final dehydrated article may have a moisture content of about 35% to about 70%, or any amount described elsewhere herein. In some aspects, the moisture content of the final article is from about 20% to about 35%, about 35% to about 65%, or from about 45% to about 65%; or from about 40% to about 55% by weight. In other embodiments, the moisture content is about 40% to about 50% by weight. In some aspects, such as for the alginate-based articles or kappa-carrageenan-based articles, the final water content may be between about 0% to 4% by weight.

In some aspects, the removal of water during dehydration may be monitored to ensure that the desired final moisture content is achieved. In some aspects, the weight of the article may be monitored to determine moisture content of the article during and/or after the dehydration.

In some aspects, the wall thickness of the article after dehydration may be from about 0.1 mm to about 3 mm. For articles such as cups, the wall thickness may be from about 0.5 to about 3 mm or from about 0.7 mm to about 2 mm. For drinking straws the wall thickness may be from about 0.1 mm to about 0.8 mm, about 0.1 mm to about 0.6 mm, about 0.3 mm to about 0.6 mm, about 0.4 mm to about 0.6 mm, about 0.2 mm to about 0.5 mm, about 0.2 mm to about 0.4 mm, or about 0.5 mm. The wall thickness is chosen based on the identity and intended use of the article.

In some aspects, once an article has been dehydrated, it may be coated to enhance the waterproofing, provide a flavor, specific color and/or to provide a smooth finish to the final product. The articles may be coated as described elsewhere herein, e.g., with a wax-based, edible coating. In some aspects, the articles may be coated with an edible coating that is used to give the articles a glossy, sheen finish, to reduce stickiness, or a combination thereof. In some aspects, the coating enhances the shelf life of the articles to 6 months, 8 months, 10 months, 12 months, 14 months, 16 months, 18 months, 20 months, 22 months, or 24 months without refrigeration. In some aspects, the coating is applied by any conventional method, including spraying, painting, rolling, dipping or co-extrusion, etc., or any combination thereof.

In some aspects, the coating is applied to the article through a spraying process. In some aspects, the articles may be placed on a spinning surface and the coating spray is applied to the outside surface of the containers as they are being spun. In some aspects, the inside surface is coated through spraying. In some aspects, the coated articles are dried, for example, with fans for up to twenty-four hours, though shorter or longer periods can be employed if desired. In some aspects, the coating adds about 0.1 grams to about 2 grams, or about 0.2 grams to about 1.2 grams, to the overall weight of the article. In some aspects, the edible coating facilitates use of the article to hold or be in contact with hot liquids such as coffee, tea, soups, hot chocolate, and other beverages ranging in temperature from 0° C. to 10° C. In some aspects, the edible coating may enable the article to hold or be in contact with liquids of about 71° C., over about an hour, or for about 2 or 3 or hours or more. In some aspects, the coating is present at thicknesses of about 0.5 mm to about 3 mm or about 1 mm.

In some aspects, the pre-process mixture or pellet may be formed into an article with different shapes, as described elsewhere herein. For example, in some aspects, the article is in the form of a cup that is suitable for holding beverages or other liquids (hot or cold). In some aspects, the cup is edible and contains low viscosity liquids such as water, fruit juice, milk, alcoholic beverages, coffees, teas, sports drinks, sodas, and other drinks for extended periods of time without degrading, preferably over an hour or more.

In some aspects, the processing steps are carried out with one or more automated steps that do not involved manual manipulation by a human worker. For example, in some aspects, the process comprises mixing components, forming (e.g., extruding), dipping the formed articles into a cross-linking bath, rinsing the cross-linked articles, and drying the rinsed cross-linked articles, in which one or more of such steps is performed in an automated fashion. For example, in some aspects, the process comprises a fully automated process whereby components are mixed, extruded, optionally cross-linked, optionally rinsed, and dried without intervention or manipulation by a human worker. However, automation can be employed for specific steps if desired, or not used at all, as desired.

In some aspects, the hydrocolloids in the pre-process mixtures, pellets, and articles herein are not foamed. In some aspects, the pre-process mixtures herein are not aerated. In some aspects, the articles or pellets herein are not made by a process comprising soaking or immersing seaweed in water and cutting the soaked/immersed seaweed into pieces (e.g., less than 1 cm). In some aspects, the process to produce an article (e.g., a straw) or pellet from the pre-process mixture does not include rolling the article (e.g., straw) or pellet from a pre-process mixture comprising rice flour, gluten flour, or a combination thereof. In some aspects, the pre-process mixtures, pellets, and/or articles are not produced using a process that extrudes alginate into a coagulation both of chitosan. In some aspects, the pre-process mixtures and/or articles are not produced using a process that extrudes chitosan into a coagulation both of alginate.

In certain aspects, addition of one or more hydrophobic additives to pre-process mixtures and pellets herein can improve processability of such compositions, particularly when processed by extrusion. In particular, addition of such additives can improve flowability of such composition during processing, particularly by extrusion. More specifically, addition of fatty acid salts and esters, or mixtures thereof, such as stearate salts, stearate esters, palm stearin and mixtures thereof, can improve flowability of such compositions, particularly during extrusion. In aspects, certain hydrophobic additives function, for example, as flow agents. In aspects, such hydrophobic additives can function, for example as release agents in processing of such compositions herein. In certain aspects, such additives can be included in pre-process mixtures and pellets herein in amounts ranging from 0.5 to 10 wt. %. In aspects, such additives can be included in compositions herein in amounts ranging from 1 to 10 wt. %, or 2 to 8 wt. % or 3 to 7 wt. %.

In certain aspects, one or more amphiphilic compounds, such a one or more phospholipids (e.g., lecithin or phosphotidyl choline), or combinations of phospholipids (e.g., soy phospholipids) can be included in preprocess mixtures and pellets herein, particularly those containing carrageenan and/or alginate. In certain aspects, such compounds can be present in compositions herein in amounts ranging from 1-10 wt. % or 4 to 8 wt. %.

In certain aspects, compositions (pre-process mixtures) herein can include kappa-carrageenan in combination with one or more of iota-carrageenan, alginate or chitosan. In aspects, compositions herein can include 10 to 15 wt. % of such combinations.

In certain aspects, compositions (pre-process mixtures) herein can include MCC, CMC, cellulose fiber or mixtures thereof. In aspects, compositions herein can include 1.5 to 3 wt. % or 2 to 3 wt. % of MCC, CMC, cellulose fiber or mixtures thereof.

In certain aspects, compositions (pre-process mixtures) herein can include glycerol or a combination of glycerol and glycerol trioctanoate, wherein glycerol is present in an amount ranging from 15 to 40 wt. % or 20 to 35 wt. % and glycerol trioctanoate, if present, is present in an amount ranging from 0.5 to 2.5 wt. %.

In certain aspects, compositions (pre-process mixtures) herein can include glycerol or a combination of glycerol and glycerol trioctanoate, wherein glycerol is present in an amount ranging from 5 to 10 wt. % and glycerol trioctanoate, if present, is present in an amount ranging from 0.5 to 2.5 wt. %.

In certain aspects, certain natural gums or mixtures thereof can be included in compositions (pre-process mixtures) herein. In aspects, natural gums are included generally in a range of 0.5 to 3% by weight or 1 to 3% by weight or 1.5 to 3% by weight. Natural gums include, among others, guar gum, konjac gum, locus bean gum or mixtures thereof.

In certain aspects, compositions (pre-process mixtures) herein can include kappa-carrageenan in combination with one or more of iota-carrageenan, alginate or chitosan and in further combination with MCC, CMC, cellulose fiber or mixtures thereof. In aspects, compositions herein can include 10 to 15 wt. % of kappa-carrageenan in combination with one or more of iota-carrageenan, alginate or chitosan and 1.5 to 3 wt. % or 2 to 3 wt. % of MCC, CMC, cellulose fiber or mixtures thereof and glycerol or a combination of glycerol and glycerol trioctanoate, wherein glycerol is present in an amount ranging from 15 to 40 wt. % or 20 to 35 wt. % and glycerol trioctanoate, if present, is present in an amount ranging from 0.5 to 2.5 wt.

In certain aspects, compositions (pre-process mixtures) herein can include kappa-carrageenan in combination with one or more of iota-carrageenan, RF6650 or chitosan and further contain MCC, CMC, cellulose fiber or mixtures thereof and further contain glycerol or a combination of glycerol and glycerol trioctanoate. In aspects, compositions herein can include 10 to 15 wt. % of kappa-carrageenan in combination with one or more of iota-carrageenan, RF6650 or chitosan and 1.5 to 3 wt. % or 2 to 3 wt. % of MCC, CMC, cellulose fiber or mixtures thereof and further glycerol or a combination of glycerol and glycerol trioctanoate, wherein glycerol is present in an amount ranging from 5 to 10 wt. % and glycerol trioctanoate, if present, is present in an amount ranging from 0.5 to 2.5 wt. %.

In certain aspects, compositions (pre-process mixture) herein can include kappa-carrageenan in combination with one or more of iota-carrageenan, alginate or chitosan and in further combination with MCC, CMC, cellulose fiber or mixtures thereof and in further combination with one or more natural gums. In certain aspects, compositions herein can include 10 to 15 wt. % of kappa-carrageenan in combination with one or more of iota-carrageenan, alginate or chitosan, 1.5 to 3 wt. % or 2 to 3 wt. % of MCC, CMC, cellulose fiber or mixtures thereof, and natural gums generally in a range of 0.5 to 3% by weight or 1 to 3% by weight or 1.5 to 3% by weight. In aspects, compositions herein can include 10 to 15 wt. % of kappa-carrageenan in combination with one or more of iota-carrageenan, RF6650 or chitosan, 1.5 to 3 wt. % or 2 to 3 wt. % of MCC, CMC, cellulose fiber or mixtures thereof, natural gums generally in a range of 0.5 to 3% by weight or 1 to 3% by weight or 1.5 to 3% by weight and glycerol or a combination of glycerol and glycerol trioctanoate, wherein glycerol is present in an amount ranging from 15 to 40 wt. % or 20 to 35 wt. % and glycerol trioctanoate, if present, is present in an amount ranging from 0.5 to 2.5 wt. %. In aspects, compositions herein can include 10 to 15 wt. % of kappa-carrageenan in combination with one or more of iota-carrageenan, RF6650 or chitosan, 1.5 to 3 wt. % or 2 to 3 wt. % of MCC, CMC, cellulose fiber or mixtures thereof, natural gums generally in a range of 0.5 to 3% by weight or 1 to 3% by weight or 1.5 to 3% by weight and glycerol or a combination of glycerol and glycerol trioctanoate, wherein glycerol is present in an amount ranging from 5 to 10 wt. % and glycerol trioctanoate, if present, is present in an amount ranging from 0.5 to 2.5 wt.

In certain aspects, compositions (pre-process mixtures) herein containing kappa-carrageenan in combination with one or more of iota-carrageenan, alginate or chitosan and in further combination with MCC, CMC, cellulose fiber or mixtures thereof can further contain one or more humectant, such as a salt (e.g., KCl or $MgSO_4$) in an amount ranging from 0.5 to 10 wt. % or from 0.8 to 8 wt. % or from 1 to 5 wt. %. In aspects, compositions herein include kappa-carrageenan in combination with one or more of iota-carrageenan, alginate or chitosan, MCC, CMC, cellulose fiber or mixtures thereof and humectant, such as a salt (e.g., KCl or $MgSO_4$) in an amount ranging from 0.5 to 10 wt. % or from 0.8 to 8 wt. % or from 1 to 5 wt. % and glycerol or a combination of glycerol and glycerol trioctanoate, wherein glycerol is present in an amount ranging from 15 to 40 wt. % or 20 to 35 wt. % and glycerol trioctanoate, if present, is present in an amount ranging from 0.5 to 2.5 wt. %.

In certain aspects, compositions (pre-process mixture) herein containing kappa-carrageenan in combination with one or more of iota-carrageenan, alginate or chitosan and in further combination with MCC, CMC, cellulose fiber or mixtures thereof can further contain one or more humectant, such as a salt (e.g., KCl or $MgSO_4$) in an amount ranging from 0.5 to 10 wt. % or from 0.8 to 8 wt. % or from 1 to 5 wt. %. In aspects, compositions herein include kappa-carrageenan in combination with one or more of iota-carrageenan, alginate or chitosan, MCC, CMC, cellulose fiber or mixtures thereof and humectant, such as a salt (e.g., KCl or $MgSO_4$) in an amount ranging from 0.5 to 10 wt. % or from 0.8 to 8 wt. % or from 1 to 5 wt. % and glycerol or a combination of glycerol and glycerol trioctanoate, wherein glycerol is present in an amount ranging from 5 to 10 wt. % and glycerol trioctanoate, if present, is present in an amount ranging from 0.5 to 2.5 wt. %.

In certain aspects, compositions (pre-process mixtures) herein containing kappa-carrageenan in combination with one or more of iota-carrageenan, RF6650 or chitosan and in further combination with MCC, CMC, cellulose fiber or mixtures thereof can further contain one or more filler, such as $CaCO_3$ present in an amount ranging from 1 to 10 wt. %, or 2 to 6 wt. %. In aspects, compositions herein containing kappa-carrageenan in combination with one or more of iota-carrageenan, RF6650 or chitosan and in further combination with MCC, CMC, cellulose fiber or mixtures thereof can further contain one or more filler, such as CaCO₃ present in an amount ranging from 1 to 10 wt. %, or 2 to 6 wt. %. In aspects, compositions herein containing kappa-carrageenan in combination with one or more of iota-carrageenan, RF6650 or chitosan and in further combination with MCC, CMC, cellulose fiber or mixtures thereof and one or more filler, such as CaCO₃ present in an amount ranging from 1 to 10 wt. %, or 2 to 6 wt. % can further contain glycerol or a combination of glycerol and glycerol trioctanoate, wherein glycerol is present in an amount ranging from 15 to 40 wt. % or 20 to 35 wt. % and glycerol trioctanoate, if present, is present in an amount ranging from 0.5 to 2.5 wt. %.

In certain aspects, compositions (pre-process mixtures) herein containing kappa-carrageenan in optional combination with one or more of iota-carrageenan, RF6650 or chitosan and in further combination with MCC, CMC, cellulose fiber or mixtures thereof can further contain one or more filler, such as CaCO₃ present in an amount ranging from 1 to 10 wt. %, or 2 to 6 wt. %. In aspects, compositions herein containing kappa-carrageenan in optional combination with one or more of iota-carrageenan, alginate or chitosan, and one or more of MCC, CMC, cellulose fiber or mixtures thereof can further contain one or more filler, such as CaCO₃ present in an amount ranging from 1 to 10 wt. %, or 2 to 6 wt. %. In aspects, compositions herein containing kappa-carrageenan in optional combination with one or more of iota-carrageenan, alginate or chitosan and in further combination with one or more of MCC, CMC, cellulose fiber or mixtures thereof and one or more filler, such as CaCO₃, present in an amount ranging from 1 to 10 wt. %, or 2 to 6 wt. % can further contain glycerol or a combination of glycerol and glycerol trioctanoate, wherein glycerol is present in an amount ranging from 5 to 10 wt. % and glycerol trioctanoate, if present, is present in an amount ranging from 0.5 to 2.5 wt. %.

In certain aspects for direct production of articles, particularly straws, by directly processing pre-process mixture using a twin-screw extruder, pre-process mixture compositions can contain kappa-carrageenan in optional combination with one or more of iota-carrageenan, alginate or chitosan, one or more of MCC, CMC, or cellulose fiber, one or more filler (such as CaCO₃), glycerol or a combination of glycerol and glycerol trioctanoate, optional humectant and optional natural gum. In aspects, for such direct production of articles, compositions can contain kappa-carrageenan in optional combination with one or more of iota-carrageenan, alginate or chitosan, wherein the total amount of these components ranges from 10 to 15 wt. % or 12 to 14 wt. %, one or more of MCC, CMC, or cellulose fiber, where the total amount of these components is 1.5 to 3 wt. % or 2 to 3 wt. %, one or more filler, where the total amount of filler is 1 to 5 wt. % or 2 to 4 wt. %, and glycerol or a combination of glycerol and glycerol trioctanoate, wherein glycerol is present in an amount ranging from 5 to 10 wt. % and glycerol trioctanoate, if present, is present in an amount ranging from 0.5 to 2.5 wt. %.

In the forgoing aspects of compositions (e.g., pre-process mixtures) containing kappa-carrageenan in optional combination with one or more of iota-carrageenan, alginate or chitosan and in further combination with MCC, CMC, cellulose fiber or mixtures thereof, the ratio of liquid to solid for processing in a twin-screw extruder ranges from 40:60 to 80:20, or from 50:50 to 70:30 or is 50:50. 60:40 or 70:30. In the forgoing aspects of compositions, the liquid can be water.

In more specific aspects of compositions herein containing kappa-carrageenan in combination with chitosan, chitin or mixtures thereof, the weight ratio of kappa-carrageenan to chitosan, chitin or combinations of chitosan and chitin ranges from 2:1 to 2:1. In more specific aspects of compositions herein containing kappa-carrageenan in combination with chitosan, chitin or mixtures thereof, the weight ratio of kappa-carrageenan to chitosan, chitin or combinations of chitosan and chitin ranges from 1.5 to 1 to 1 to 1.5. In more specific aspects of compositions herein containing kappa-carrageenan in combination with chitosan, chitin or mixtures thereof, the weight ratio of kappa-carrageenan to chitosan, chitin or combinations of chitosan and chitin ranges from 0.9 to 1 to 1 to 0.9. In more specific aspects of compositions herein containing kappa-carrageenan in combination with chitosan, chitin or mixtures thereof, the weight ratio of kappa-carrageenan to chitosan, chitin or combinations of chitosan and chitin is 1.

In more specific aspects of compositions herein containing kappa-carrageenan in combination with chitosan, chitin or mixtures thereof, the composition comprises 9-13 wt. % hydrophilic plasticizer, 0.5 to 3 wt % hydrophobic plasticizer, a total of 20-40 wt. % hydrocolloid, 10-15 wt % filler, up to 1% of optional components (color, flavor etc.) and water up to 100 wt %. In this aspect, the weight ratio of kappa-carrageenan to chitosan, chitin or combinations of chitosan and chitin ranges from 2:1 to 2:1 or 1.5 to 1 to 1 to 1.5 or 0.9 to 1 to 1 to 0.9 or is 1. In additional aspects, compositions as hereinabove described no not contain a flow agent. In additional aspects, compositions as hereinabove described no not contain a cross-linking agent. In additional aspects, compositions as hereinabove described no not contain either a flow agent or a cross-linking agent.

FIG. 1 depicts the carbon dioxide produced when making a single straw from plastic (1.47 g), paper (4.11 g), and polylactic acid (PLA) (4.57 g). FIG. 1 also shows that the technology disclosed herein to make the compositions and articles of the present disclosure has a net sequestration of 1.39 g per straw produced when using formulations comprising alginate as the main component (excluding water).

Figure 2:
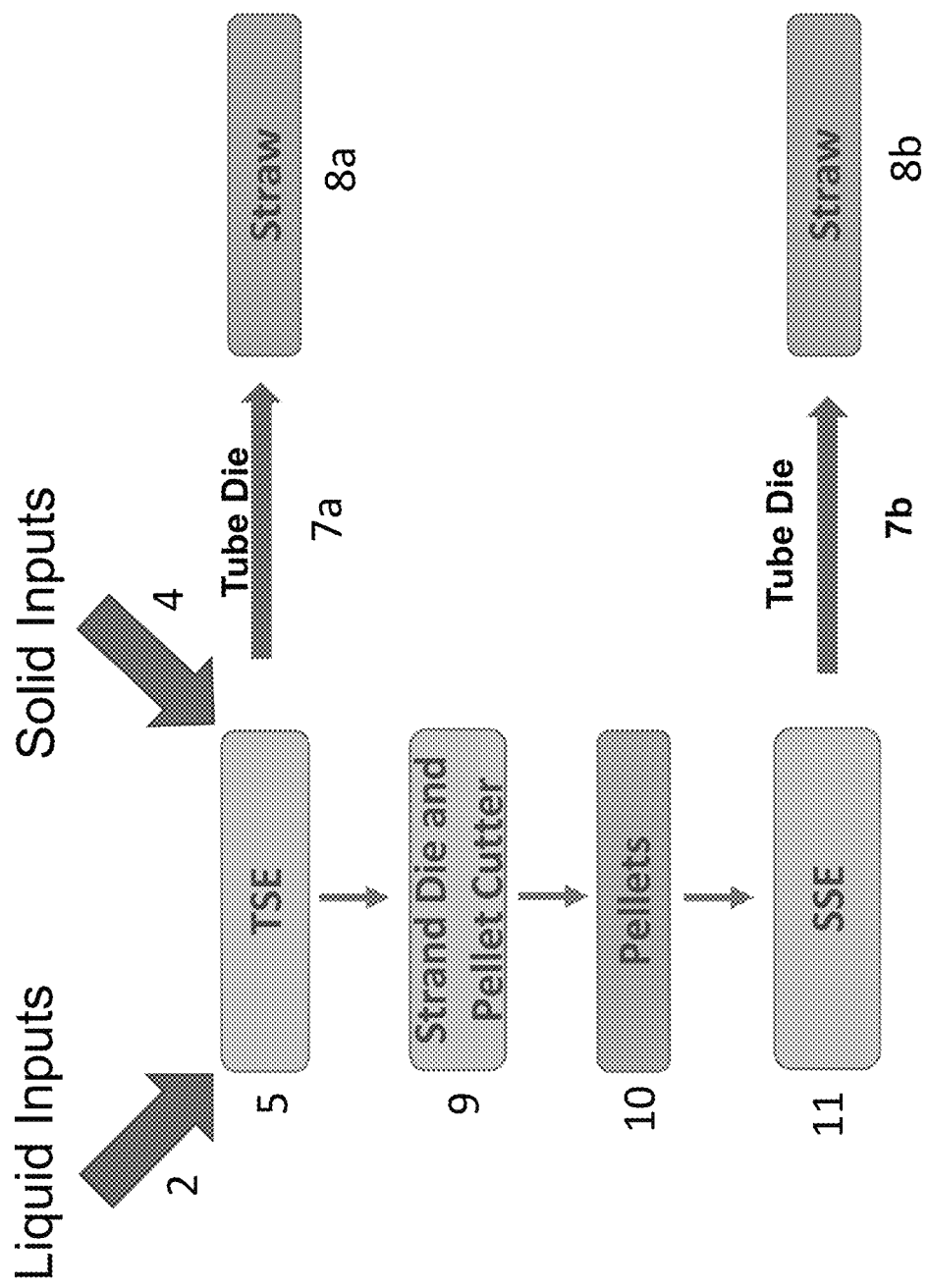
FIG. 2 is a flow chart illustrating exemplary methods of the present disclosure for forming exemplary articles, particularly drinking straws.

FIG. 2 is a flow chart illustrating exemplary methods of the present disclosure for forming exemplary articles. The flow chart exemplifies a method for making straws by extrusion methods. Liquid (2) and solid (4) inputs (components) of the pre-process mixture are introduced into a twin-screw extruder (TSE, 5). The liquid and solid components are shown added separately to the TSE, but can alternatively be pre-mixed prior to introduction into the TSE (5). In some aspects, liquid and solid components are extruded thorough tube die (7a) to form a straw (8a) of selected diameter and wall thickness. In some aspects, the liquid and solid components are introduced into the TSE (5) and then passed through a strand die and pellet cutter (9) to from pellets (10). In some aspects, pellet formation using the TSE is a hot-melt extrusion process. In some aspects, pellets are introduced into a single screw extruder (SSE, 11) and then extruded through tube die (7b) to form a straw of selected diameter and wall thickness. In some aspects, pellets are extruded using hot-melt extrusion.

The invention can be further understood by the following non-limiting examples.

EXAMPLES

Example 1

This example compares the properties of two inventive straws with straws made of plastic and paper.

Several properties of two inventive straws versus straws made of plastic and paper were compared, the results of which are set forth in Table 2. Properties were measured as described elsewhere herein. Inventive straw #1 contains alginate as the main component, humectant, and plasticizer, and inventive straw #2 contains kappa-carrageenan, filler, and plasticizer. Both inventive straws were generally prepared as described herein. Plastic and paper straws were purchased commercially.

TABLE 2

| Properties | Inventive Straw #1 | Inventive Straw #2 | Plastic Straw | Paper Straw |
|---|---|---|---|---|
| Tensile Strength, MPa | 14 | 18 | 27 | 11 |
| Compressive Strength, MPa [a] | 10 | 12 | 13 | 9 |
| Young's Modulus, MPa | 187 | 215 | 260 | 500 |
| Color Stability, Pigment leaching | stable, no pigment leaching | stable, no pigment leaching | stable | fading, pigment leaching [b] |
| Material transfer to liquid (turbidity, FNU) | no | no | no | 0.5-0.6 |
| Neutral Smell | yes | yes | yes | yes |
| Neutral Taste | yes | yes | yes | yes |
| Degradation time | <6 months | <6 months | ~1000 years | ~1 month |
| Carbon negative | yes | N/D | no | no |
| Wall thickness | 0.5 mm | 0.5 mm | 0.3 mm | 0.5 mm |
| Stability in RT water, % wt. swelling | 65 wt. % | 48 wt. % | N/A | 60 wt. % |
| Stability in hot water, % wt. swelling | 80 wt. % | 80 wt. % | N/A | 90 wt. % |
| Stability in cold water, % wt. swelling | 55 wt. % | 30 wt. % | N/A | 50 wt. % |
| Stability in cold carbonated beverages, % wt. swelling | 60 wt. % | 45 wt. % | N/A | 70 wt. % |
| Stable in cold alcoholic beverages (20% vol. alc.), % wt. swelling | 60 wt. % | 40 wt. % | N/A | 70 wt. % |

N/D: not determined
N/A: not applicable
[a] axial, at 1000N applied force
[b] for colored paper straw

Example 2

This example compares the composition of a pre-process mixture with the expected composition of an article produced by a process comprising cross-linking, rinsing, and drying, considering that the processing steps affect the amount of hydrophilic plasticizer and water present in the article. The results are shown in Table 3.

TABLE 3

| Component | Pre-Process Mixture (wt. %) | Article (wt. %) |
|---|---|---|
| Hydrophilic plasticizer | 20-35 | 15-25 |
| Hydrophobic plasticizer | 0.5-2 | 1-4 |
| Alginates | 5-15 | 10-30 |
| Chitosan | 0.5-10 | 1-20 |
| Other Hydrocolloid | 0.5-10 | 1-20 |
| Humectant | 0.5-10 | 1-20 |
| Colorant (aq. soln.) | 0.1-0.3 | 0.2-0.6 |
| Deionized Water | 40-60 | 30-40 |

As shown in Table 3, the water content of the final article is decreased due to drying, the hydrophilic plasticizer content is reduced by about two-thirds, and the remaining amounts are roughly doubled. The amounts for the article are calculated by assuming that the amount (g) of hydrophilic plasticizer is reduced by about one-third (which has been experimentally verified), and the amount of water is set at about 30-40 wt. %, and then the remaining weight percents are recalculated based on these set amounts. A similar calculation can be performed, if the amount of water in the article is set at a different amount, such as 20 wt. %.

Example 3

This example compares the composition of a pre-process mixture (or pellet) with the expected composition of an article (prepared from the pre-process mixture or pellet) or pellet (prepared from the pre-process mixture) produced by a process that does not include cross-linking and/or rinsing. Excluding such cross-linking and/or rinsing steps results in an article or pellet that has not had hydrophilic components (e.g., hydrophilic plasticizer) leached therefrom. The results are shown in Table 4.

TABLE 4

| Component | Pre-Process Mixture (or Pellet) (wt. %) | Article (or Pellet) (wt. %) |
|---|---|---|
| Hydrophilic plasticizer | 15 | 18 |
| Hydrophobic plasticizer | 1.2 | 1.4 |
| Kappa-Carrageenan | 20 | 24 |
| Chitosan | 15 | 18 |
| Filler | 7 | 8 |
| Colorant (aq. soln.) | 0.2 | 0.24 |
| Deionized Water | 42 | 30 |

As shown in Table 4, the water content of the final article is decreased due to drying (whether active or passive) from 42 wt. % to 30 wt. %. While the absolute amounts of the other components do not change (since no components are leached or otherwise removed), the decrease in water content results in a relative increase in the amounts of the other components. In general, the decrease in water content of about 12 wt. % results in an increase in the weight percents of the other components by a factor of about 1.2. The amounts for the article or pellet are calculated by assuming that the amount (g) of water is reduced from 42 to 30 wt. %, and then the remaining weight percents are recalculated based on this set amount. A similar calculation can be performed for any other water content.

Example 4

This example compares straws produced using different pre-process mixtures or pellets comprising various components.

Straws were produced using the processes described herein using pre-process mixtures or pellets within the general ranges disclosed herein. Assessments of bendability and compressibility were made empirically. The flexibility of a straw was evaluated by bending it three times in the middle and compressing at the ends. Swelling experiments were performed by immersing a piece of straw in water at room temperature (RT) and recording the weight change after 1 hour. Classifications are as follows: "Brittle": the straw broke into sharp pieces upon bending or compression; "Break": the straw broke upon bending/compressing, but did not fall apart (i.e., shatter); "Rigid": some cracks were produced upon bending/compressing, no breaking; "Flexible": straw bends in the middle; "Compressible": straw can be compressed/pinched without cracking. The results are set forth in Table 5.

TABLE 5

| | Pre-Process Mixture | Bendable in the middle | Compressible at the ends | Swelling in water %, 1 h at RT |
|---|---|---|---|---|
| 1 | Alginate Protanal ™ 6650, Glycerol, Water (straw formulation in U.S.20200214484) | Brittle | Brittle | 40-45% |
| 2 | Alginate Protanal ™ 6650 (10-15 wt. %) Chitosan* (3-7 wt. %) Glycerol (32-38 wt. %) Water (40-50 wt. %) | Break | Rigid | 40-45% |
| 3 | Alginate Protanal ™ 6650 (11-16%) Chitosan (bacterial) (4-9%) Glycerol (29-35%) Water (45-52%) | Brittle | Break | 40-45% |
| 4 | Alginate Protanal ™ 8223 (9-13) Chitosan* (5-10%) Glycerol (31-36%) Water (46-53%) | Flexible | Compressible | 85-90% |
| 5 | Alginate Protanal ™ 8223 (11-17%) Chitosan* (3-9%) Glycerol (29-34%) Guar Gum (0.5-3%) Water (45-50%) | Flexible | Compressible | 100%-120% |
| 6 | Alginate Protanal ™ 6650 (8-13%) Chitosan* (3-6%) Glycerol (30-35%) Guar Gum (1-4%) Water (40-50%) | Flexible | Rigid | 75-90% |
| 7 | Alginate Protanal ™ 6650 (1-6%) Alginate Protanal ™ 8223 (7-12%) Chitosan* (3-7%) Glycerol (31-37%) Guar Gum (1-4%) Water (45-52%) | Flexible | Rigid | 80-100% |
| 8 | Alginate Protanal ™ 6650 (0.5-5%) Alginate Protanal ™ 8223 (9-14%) Chitosan* (4-9%) Glycerol (33-39%) Guar Gum (0.1-2%) Water (48-55%) | Flexible | Rigid | 100% |

TABLE 5-continued

| | Pre-Process Mixture | Bendable in the middle | Compressible at the ends | Swelling in water %, 1 h at RT |
|---|---|---|---|---|
| 9 | Alginate Protanal™ 6650 (0.5-4%) Alginate Protanal™ 8223 (9-14%) Chitosan* (1-5%) Glycerol (30-36%) Guar Gum (0.2-2.3%) Glycerol Trioctanoate (0.5-4%) Water (45-55%) | Flexible | Rigid | 100-120% |
| 10 | Alginate Protanal™ 6650 (1-5%) Alginate Protanal™ 8223 (9-13%) Chitosan* (2-6%) Glycerol (28-34%) Guar Gum (0.8-3.1%) Glycerol Trioctanoate (1-4%) Aluminum Hydroxide Hydrate (0.2-3.4%) Water (40-50%) | Flexible | Rigid | 75-80% |
| 11 | Alginate Protanal™ 6650 (0.5-2.2%) Alginate Protanal™ 8223 (10-16%) Chitosan (1-5%) Glycerol (28-33%) Glycerol Trioctanoate (0.5-2.5%) Aluminum Hydroxide Hydrate (0.1-1.5%) Water (48-55%) | Flexible | Rigid | 65-70% |
| 12 | Alginate Protanal™ 6650 (13.25%) Chitosan* (3-8%) Glycerol (27-32%) Glycerol Trioctanoate (0.5-3%) Aluminum Hydroxide Hydrate (0.5-1.8%) Water (47-52%) | Rigid | Rigid | 60-65% |
| 13 | Alginate Protanal™ 6650 (8-13%) Alginate Protanal™ 8223 (1-3.2%) Chitosan* (2-7%) Glycerol (28-31%) Glycerol Trioctanoate (1-4%) Aluminum Hydroxide Hydrate (0.3-1.7%) Water (48-52%) | Flexible | Rigid | 55-60% |
| 14 | Alginate Protanal™ 6650 (9-14%) Alginate Protanal™ 8223 (1.5-3.5%) Chitosan* (3-7%) Glycerol (29-35%) Glycerol Trioctanoate (1-3%) Aluminum Hydroxide Hydrate (0.8-2.6%) Water (45-50%) | Flexible | Rigid | 53-65% |
| 15 | Alginate Protanal™ 6650 (6-11%) Alginate Protanal™ 8223 (2-7%) Chitosan* (0.5-4%) Glycerol (28-33%) Glycerol Trioctanoate (1-4%) Aluminum Hydroxide Hydrate (0.5-2.5%) Guar Gum (0.8-3%) Water (45-52%) | Flexible | Compressible | 48-65% |

*Chitosan: low molecular weight, crustacean

Example 5

This example demonstrates that straws containing alginate as the main component (excluding water) made from a pre-process mixture or pellet comprising particular humectants produce a brittle straw that shatters on bending.

In particular, straws were produced from a pre-process mixture comprising hydrocolloid (alginate as main component), plasticizer, humectant, and water, in the general amounts disclosed elsewhere herein, in which the humectant is Ludox™ LS colloidal silica (DuPont), hydrotalcite, or magnesium sulfate. Upon testing the straws for bendability and compressibility as described in Example 4, the straws shattered. This indicates that certain humectants do not produce straws having the desired mechanical properties in straws containing alginate as the main component (excluding water).

Example 6

This example compares straws produced using different pre-process mixtures comprising various components. Pre-process compositions were processed to form pellets employing a twin-screw hot melt extruder at a temperature of 85-100° C. and screw speed of 200-300 rpm with a feed ratio of liquid to solid as indicated.

Straws were produced using the pellets within the general ranges disclosed herein. Straws were produced on a 1.5" single screw hot-melt extruder (93 to 107° C.), general purpose screw, 3 to 1 compression ratio); The force at break (psi) of an article was measured based on ASTM D882-12 (2012) using a Universal Tester (34SC-1, Instron, Norwood, MA, USA) equipped with 1 kN load cell) and initial gap of 25 mm. The elongation at break (%) of an article was measured using a Universal Tester (34-SC-1, Instron, Norwood, MA, USA) equipped with 1 kN load cell and initial gap of 25 mm. Elongation at break was determined according to the formula: %=(final gage length−initial gage length)/initial gage length*100.

To evaluate the water absorption profile (swelling), 2-inch straw samples were weighed before and after immersion in DI water for 1 hour at RT. Swelling (wt. %) was estimated according to the equation [(Wf−Wo)/Wo]*100, where Wf is weight of the sample after immersion in room temperature DI water for 1 hour, and Wo is the weight of the sample before such immersion. The results are set forth in Table 6, where the properties listed are representative of those of the range of compositions in the table entries. In general, increased force at break and increased elongation at break result in articles with increased mechanical strength. The compositions in Table 6 except for the composition of entry 8 are generally useful for making straws.

TABLE 6

| Entry | Components | Amount, wt. % | Force at Break, psi | Elongation at Break, % | Swelling in water wt. %, 1 h at RT |
|---|---|---|---|---|---|
| 1 | kappa-Carrageenan | 5-15 | 182 | 7.8 | 200 |
|  | Microcrystalline Cellulose | 0-5 |  |  |  |
|  | Alginate Protanal 6650 | 0-5 |  |  |  |
|  | Chitosan (low Mw) | 3-10 |  |  |  |
|  | Glycerol | 20-40 |  |  |  |
|  | Aluminum Hydroxide Hydrate | 0-5 |  |  |  |
|  | Guar Gum | 0-3 |  |  |  |
|  | Glycerol Trioctanoate | 0-5 |  |  |  |
|  | Water | 35-60 |  |  |  |
| 2 | kappa-Carrageenan | 10-20 | 225 | 7 | 150 |
|  | Microcrystalline Cellulose | 0-5 |  |  |  |
|  | Chitosan (low Mw) | 3-10 |  |  |  |
|  | Glycerol | 20-40 |  |  |  |
|  | Aluminum Hydroxide Hydrate | 0-5 |  |  |  |
|  | Guar Gum | 0-3 |  |  |  |
|  | Glycerol Trioctanoate | 0-5 |  |  |  |
|  | Water | 35-65 |  |  |  |
| 3 | kappa-Carrageenan | 5-15 | 224 | 3.5 | 170 |
|  | iota-Carrageenan | 5-15 |  |  |  |
|  | Alginate Protanal 6550 | 10-20 |  |  |  |
|  | Microcrystalline Cellulose | 0-5 |  |  |  |
|  | Chitosan (low Mw) | 3-10 |  |  |  |
|  | Glycerol | 20-40 |  |  |  |
|  | Aluminum Hydroxide Hydrate | 0-5 |  |  |  |
|  | Guar Gum | 0-3 |  |  |  |
|  | Glycerol Trioctanoate | 0-5 |  |  |  |
|  | Water | 35-65 |  |  |  |
| 4 | kappa-Carrageenan | 10-20 | 310 | 220 | 160 |
|  | iota-Carrageenan | 0-5 |  |  |  |
|  | Microcrystalline Cellulose | 0-5 |  |  |  |
|  | Glycerol | 20-40 |  |  |  |
|  | Aluminum Hydroxide Hydrate | 0-5 |  |  |  |
|  | Guar Gum | 0-3 |  |  |  |
|  | Glycerol Trioctanoate | 0-5 |  |  |  |
|  | Water | 35-65 |  |  |  |
| 5 | kappa-Carrageenan | 10-20 | 215 | 258 | 200 |
|  | Microcrystalline Cellulose | 0-5 |  |  |  |
|  | Chitosan (low Mw) | 3-10 |  |  |  |
|  | Glycerol | 20-40 |  |  |  |
|  | Aluminum Hydroxide Hydrate | 0-5 |  |  |  |
|  | Locus Bean Gum | 0-3 |  |  |  |
|  | Glycerol Trioctanoate | 0-5 |  |  |  |
|  | Water | 35-65 |  |  |  |

TABLE 6-continued

| Entry | Components | Amount, wt. % | Force at Break, psi | Elongation at Break, % | Swelling in water wt. %, 1 h at RT |
|---|---|---|---|---|---|
| 6 | kappa-Carrageenan | 10-20 | 436 | 60 | 180 |
|  | Microcrystalline Cellulose | 0-5 |  |  |  |
|  | Glycerol | 20-40 |  |  |  |
|  | Aluminum Hydroxide Hydrate | 0-5 |  |  |  |
|  | Konjac Gum | 0-3 |  |  |  |
|  | Glycerol Trioctanoate | 0-5 |  |  |  |
|  | Water | 35-65 |  |  |  |
| 7 | kappa-Carrageenan | 10-30 | 210 | 7.2 | 250 |
|  | Microcrystalline Cellulose | 0-5 |  |  |  |
|  | Glycerol | 25-40 |  |  |  |
|  | Konjac Gum | 0-5 |  |  |  |
|  | Palm Stearin | 5-15 |  |  |  |
|  | Glycerol Trioctanoate | 0-5 |  |  |  |
|  | Water | 30-50 |  |  |  |
| 8 | kappa-Carrageenan | 10-30 | 50 | 0.4 | dissolved |
|  | Microcrystalline Cellulose | 0-5 |  |  |  |
|  | Glycerol | 25-40 |  |  |  |
|  | Konjac Gum | 0-5 |  |  |  |
|  | Carnauba Wax | 5-15 |  |  |  |
|  | Glycerol Trioctanoate | 0-5 |  |  |  |
|  | Water | 30-50 |  |  |  |
| 9 | kappa-Carrageenan | 10-30 | 70 | 2 | 175 |
|  | Microcrystalline Cellulose | 0-5 |  |  |  |
|  | Glycerol | 25-40 |  |  |  |
|  | Konjac Gum | 0-5 |  |  |  |
|  | Zein | 0-3 |  |  |  |
|  | Glycerol Trioctanoate | 0-5 |  |  |  |
|  | Water | 30-60 |  |  |  |
| 10 | kappa-Carrageenan | 10-30 | 180 | 320 | 115 |
|  | Microcrystalline Cellulose | 0-5 |  |  |  |
|  | Glycerol | 10-25 |  |  |  |
|  | Konjac Gum | 0-5 |  |  |  |
|  | Calcium Carbonate | 0-10 |  |  |  |
|  | Glycerol Trioctanoate | 0-5 |  |  |  |
|  | Water | 20-80 |  |  |  |
| 11 | kappa-Carrageenan | 15-30 | 177 | 65 | 120 |
|  | Microcrystalline Cellulose | 0-5 |  |  |  |
|  | Glycerol | 5-20 |  |  |  |
|  | Konjac Gum | 0-10 |  |  |  |
|  | Calcium Carbonate | 0-10 |  |  |  |
|  | Zirmel 1000 | 0-5 |  |  |  |
|  | Glycerol Trioctanoate | 0-5 |  |  |  |
|  | Water | 30-80 |  |  |  |
| 12 | kappa-Carrageenan | 10-30 | 130 | 95 | 135 |
|  | Microcrystalline Cellulose | 0-5 |  |  |  |
|  | Glycerol | 5-20 |  |  |  |
|  | Konjac Gum | 0-10 |  |  |  |
|  | Calcium Carbonate | 0-10 |  |  |  |
|  | Alum | 0-3 |  |  |  |
|  | Glycerol Trioctanoate | 0-5 |  |  |  |
|  | Water | 40-80 |  |  |  |
| 13 | kappa-Carrageenan | 10-30 | 150 | 80 | 150 |
|  | Microcrystalline Cellulose | 0-5 |  |  |  |
|  | Glycerol | 5-20 |  |  |  |
|  | Konjac Gum | 0-10 |  |  |  |
|  | Calcium Carbonate | 0-10 |  |  |  |
|  | Zirconium Acetate | 0-3 |  |  |  |
|  | Glycerol Trioctanoate | 0-5 |  |  |  |
|  | Water | 40-80 |  |  |  |
| 14 | kappa-Carrageenan | 10-30 | 140 | 50 | 130 |
|  | Glycerol | 5-20 |  |  |  |
|  | Konjac Gum | 0-10 |  |  |  |
|  | Calcium Carbonate | 5-15 |  |  |  |
|  | Glycerol Trioctanoate | 0-5 |  |  |  |
|  | Water | 40-80 |  |  |  |
| 15 | kappa-Carrageenan | 10-30 | 180 | 20 | 120 |
|  | Glycerol | 5-20 |  |  |  |
|  | Chitosan (low Mw) | 0-10 |  |  |  |
|  | Konjac Gum | 0-10 |  |  |  |
|  | Calcium Carbonate | 5-15 |  |  |  |
|  | Glycerol Trioctanoate | 0-5 |  |  |  |
|  | Water | 40-80 |  |  |  |

TABLE 6-continued

| Entry | Components | Amount, wt. % | Force at Break, psi | Elongation at Break, % | Swelling in water wt. %, 1 h at RT |
|---|---|---|---|---|---|
| 16 | kappa-Carrageenan | 10-30 | 130 | 15 | 190 |
|  | Lignin powder | 0-10 |  |  |  |
|  | Glycerol | 5-20 |  |  |  |
|  | Konjac Gum | 0-10 |  |  |  |
|  | Calcium Carbonate | 0-10 |  |  |  |
|  | Water | 40-70 |  |  |  |

Example 7

This example provides additional pre-process mixtures comprising various components which are useful to form pellets and articles. The pre-process mixtures are compounded into pellets employing a twin-screw extruder with co-rotating screws at a temperature of 85-100° C. and screw speeds of 300-600 rpm. The listed components 1-5 (Table 7) are added together with water (D.I.) introduced at a second port. The compounding proceeds at a rate of 60-80 lbs/h. The pellets are then processed in a multi-zone general screw extruder at screw speed of 50 to 60 rpm, melt pressure of 500-600 psi, puller speed of 20-40 ft/min and temperatures ranging from 85 to 100° C. to form desired articles, e.g., straws. Articles were dried for 10-20 minutes at temperatures of 120 to 205° C.

TABLE 7

Pre-Process Mixtures for Preparation of Exemplary Pellets*

| | |
|---|---|
| Kappa-carrageenan | 10-30 wt. % |
| Chitosan and/or Chitin (low molecular weight Crustacean) | 10-30 wt. % |
| Hydrophilic plasticizer | 7-25 wt. % |
| Hydrophobic plasticizer | 0.5 to 3 wt. % |
| Filler | 10-15 wt. % |
| Optional components (dye, flavoring, etc.) | Less than 1 wt. % |
| Water | 30 to 70 wt. % |

*The amount of each listed component is adjusted within the given range such that the total amount of components is 100 wt. %

Pellets prepared as described in this example are useful for preparation of various articles, including drinking straws.

Example 8

This example demonstrates a process for coating articles (e.g., drinking straws) with a wax-based coating, and a comparison of the properties of the coated articles with uncoated articles.

The straw from Example 6, entry 15, was used in this example.

A wax solution was prepared by first melting the wax (2-30 g) and then slowly adding 50 g of acetone. The wax solution was further stirred with heating to form a uniform solution (no wax particles visible). To this uniform solution water 50 g was added under vigorous stirring in an amount sufficient to achieve a 1:1 ratio by weight relative to the acetone. In the solutions that used both carnauba wax and beeswax, a 1:1 ratio by weight of the waxes was used. The amount of wax employed in the coating solution is shown in Table 8.

A 2-inch long piece of straw was submerged in the coating solution where it was soaked for about 5 seconds. The soaked straw was removed from the coating solution and slowly turned on its axis while air drying to ensure the coating was uniform on the straw and did not drip down the sides. The dried coated straw was weighed and then subjected to absorption testing by immersion in a room temperature water bath and recording the weight change after 1 hour. The swelling percentage is the percent increase in the straw's weight due to absorbing water. Static contact angle was measured using Rame-Hart Model 90 CA edition with DropImage software and using water as a liquid. The results are reported in Table 7.

TABLE 8

| Coating* | Swelling % | Average Swelling % | Uncoated Straw Swelling % | Drying Time (Room Temperature) | Static Contact Angle |
|---|---|---|---|---|---|
| Beeswax/Carnauba (1:1 ratio)-20 wt. % | 11.76 34.67 | 23.22 | 48 | <10 sec | 110° |
| Beeswax-30 wt. % | 24.71 | 24.76 | 48 | <10 sec | 106° |
| Beeswax-2 wt. % | 27.27 | 27.27 | 45 | <2 sec | 100° |
| Beeswax-30 wt. % | 27 31.11 | 29.06 | 47 | <10 sec | 110° |
| Beeswax-30 wt. % | 20.75 41.82 | 31.29 | 48 | <10 sec | 109° |

* solvent:water:acetone (1:1 by weight)

Statements Regarding Incorporation by Reference and Variations

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

As used herein and in the appended claims, the singular forms "a", "an", and "the" include plural reference unless the context clearly dictates otherwise. Thus, for example, reference to "a cell" includes a plurality of such cells and equivalents thereof known to those skilled in the art. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

When a group of substituents is disclosed herein, it is understood that all individual members of that group and all subgroups, including any isomers, enantiomers, and diastereomers of the group members, are disclosed separately. When a Markush group or other grouping is used herein, all individual members of the group and all combinations and sub combinations possible of the group are intended to be individually included in the disclosure. When a compound is described herein such that a particular isomer, enantiomer or diastereomer of the compound is not specified, for example, in a formula or in a chemical name, that description is intended to include each isomers and enantiomer of the compound described individual or in any combination. Additionally, unless otherwise specified, all isotopic variants of compounds disclosed herein are intended to be encompassed by the disclosure. For example, it will be understood that any one or more hydrogens in a molecule disclosed can be replaced with deuterium or tritium. Isotopic variants of a molecule are generally useful as standards in assays for the molecule and in chemical and biological research related to the molecule or its use. Methods for making such isotopic variants are known in the art. Specific names of compounds are intended to be exemplary, as it is known that one of ordinary skill in the art can name the same compounds differently.

Certain molecules disclosed herein may contain one or more ionizable groups [groups from which a proton can be removed (e.g., —COOH) or added (e.g., amines) or which can be quaternized (e.g., amines)]. All possible ionic forms of such molecules and salts thereof are intended to be included individually in the disclosure herein. With regard to salts of the compounds herein, one of ordinary skill in the art can select from among a wide variety of available counterions that are appropriate for preparation of salts of this invention for a given application. In specific applications, the selection of a given anion or cation for preparation of a salt may result in increased or decreased solubility of that salt.

Every device, system, formulation, combination of components, or method described or exemplified herein can be used to practice the invention, unless otherwise stated.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. With respect to pre-process mixtures herein, "consisting essentially of" does not exclude component(s) present in amounts that do not affect the mechanical properties of articles formed therefrom nor the processability of forming the articles from the pre-process mixtures. With respect to articles herein, "consisting essentially of" does not exclude component(s) present in amounts that do not detrimentally affect the desirable mechanical and physical properties of the articles, in particular flexibility, shelf-life, neutral taste and smell, and wt. % swelling in aqueous solutions. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. A process to make a biodegradable pellet, the process comprising:
   combining (i) a hydrocolloid, wherein the hydrocolloid comprises carrageenan present in an amount of 10-20% based on total weight of the mixture, and chitosan present in amount of 10-20% based on total weight of the mixture, (ii) a plasticizer, wherein the plasticizer is a glycerol present in an amount of 5-20% based on the total weight of the mixture, (iii) a filler, wherein the filler is a $CaCO_3$ present in an amount of 5-20% based on the total weight of the mixture, and (iv) water, so as to make a mixture; and
   subjecting the mixture to a hot-melt extrusion to form the biodegradable pellet.

2. The process of claim 1, further comprising the step of forming the pellet into a shape.

3. The method of claim 1, wherein the carrageenan comprises kappa-carrageenan.

4. The method of claim 1, wherein the plasticizer comprises a combination of glycerol, and esterified or alkylated glycerol, wherein the esterified or alkylated glycerol has 4 to 20 carbon atoms in the ester or alkyl group.

5. The method of claim 1, further comprising the step of applying a coating to the biodegradable pellet.

6. The method of claim 5, wherein the coating is a hydrophobic coating.

7. The method of claim 6, wherein the coating ranges in thickness from 10 nm to 100 micron.

8. The method of claim 1, wherein an article comprising the mixture exhibits a tensile strength of 10 to 50 MPa.

9. The method of claim 1, wherein an article comprising the mixture exhibits a Young's modulus of 50 to 500 MPa.

10. The method of claim 1, wherein an article comprising the mixture exhibits a compressive strength of 10 to 100 MPa.

11. The method of claim 1, wherein an article comprising the mixture exhibits swelling in room temperature water of less than 50% by weight.

12. The method of claim 2, wherein the hot-melt extrusion is performed with a screw extruder.

13. The method of claim 11, wherein the screw extruder is a twin-screw hot-melt extruder.

14. The method of claim 12, wherein the hot-melt extruder is operated at a temperature of 70-100° C.

15. The method of claim 13, wherein the hot-melt extruder is operated at a temperature of 70-100° C.

16. The method of claim 12, wherein the hot-melt extruder has a feeding weight ratio of solids to liquids of 1:6 to 1:1.

17. The method of claim 13, wherein the hot-melt extruder has a feeding weight ratio of solids to liquids of 1:6 to 1:1.

18. The method of any one of claim 16, wherein the solids comprise a mixture of the carrageenan, the chitosan, and the $CaCO_3$.

19. The method of any one of claim 17, wherein the solids comprise a mixture of the carrageenan, the chitosan, and the $CaCO_3$.

* * * * *